US006627015B1

(12) United States Patent
Takemoto et al.

(10) Patent No.: US 6,627,015 B1
(45) Date of Patent: *Sep. 30, 2003

(54) STRUCTURE AND METHOD FOR MOUNTING AN INK JET HEAD

(75) Inventors: Hiroshi Takemoto, Machida (JP); Yoshihiro Morii, Atsugi (JP); Seiji Hoshino, Atsugi (JP); Shigeru Fujita, Atsugi (JP)

(73) Assignee: Ricoh Company, Ltd., Toyko (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/400,202

(22) Filed: Sep. 17, 1999

Related U.S. Application Data

(62) Division of application No. 09/037,844, filed on Mar. 10, 1998, now Pat. No. 6,000,784.

(30) Foreign Application Priority Data

| | | |
|---|---|---|
| Mar. 11, 1997 | (JP) | 9-55645 |
| Aug. 27, 1997 | (JP) | 9-230154 |
| Jul. 18, 1997 | (JP) | 9-193440 |
| Jul. 18, 1997 | (JP) | 9-193441 |
| Jul. 18, 1997 | (JP) | 9-193442 |
| Jul. 18, 1997 | (JP) | 9-193443 |
| Jul. 19, 1997 | (JP) | 9-193444 |

(51) Int. Cl.[7] .......................... B32B 31/10; B32B 31/24

(52) U.S. Cl. .................. 156/64; 156/275.5; 156/275.7; 156/351

(58) Field of Search ............................... 156/64, 275.5, 156/275.7, 297, 378, 379, 351, 356, 359, 360; 29/832, 833, 834, 836, 720, 721, 757, 759, 890.1

(56) References Cited

U.S. PATENT DOCUMENTS

| | | | | |
|---|---|---|---|---|
| 5,074,036 A | * 12/1991 | Dunaway et al. | ........... | 156/299 |
| 5,148,194 A | 9/1992 | Asai et al. | | |
| 5,764,254 A | 6/1998 | Nicoloff et al. | | |
| 5,782,184 A | 7/1998 | Albertalli et al. | | |
| 5,818,482 A | 10/1998 | Ohta et al. | | |
| 5,930,895 A | 8/1999 | Orikasa et al. | | |
| 5,964,032 A | * 10/1999 | Orikasa et al. | ............... | 156/64 |
| 6,224,709 B1 | * 5/2001 | Takemoto et al. | ....... | 156/275.5 |
| 6,435,241 B1 | * 8/2002 | Morii et al. | ................ | 156/351 |
| 6,471,801 B2 | * 10/2002 | Takemoto et al. | ............ | 156/60 |

FOREIGN PATENT DOCUMENTS

| | | |
|---|---|---|
| JP | 7089185 | 4/1995 |

OTHER PUBLICATIONS

US 2001/0011578 A1(A U.S. patent application Publication, published Aug. 9, 2001, application No. 09/756,786, file Jan. 10, 2001, Takemoto et al, US, all pages, especially claims.*

* cited by examiner

*Primary Examiner*—Richard Crispino
*Assistant Examiner*—George R. Koch, III
(74) *Attorney, Agent, or Firm*—Cooper & Dunham LLP

(57) ABSTRACT

A structure and a method for mounting an ink jet head assembly to an ink jet printer are disclosed. The assembly includes a plurality of ink jet heads each being filled with ink of particular color. Intermediate members are positioned between each head and a head holder. The intermediate members are fixed to the head by adhesive and also fixed to the head holder by the adhesive.

8 Claims, 45 Drawing Sheets

STRUCTURE AND METHOD FOR MOUNTING AN INK JET HEAD

This is a continuation divisional of application Ser. No. 09/037,844 filed Mar. 10, 1998, now U.S. Pat. No. 6,000, 784.

BACKGROUND OF THE INVENTION

The present invention relates to an ink jet head for use in an ink jet printer and capable of ejecting ink of particular color for forming a color image in combination with other ink jet heads, and more particularly to a structure and a method for mounting an ink jet head. Also, the present invention is concerned with a method and an apparatus for producing an ink jet head assembly.

Today, an ink jet printer capable of forming an image by ejecting ink drops via ejection ports is extensively used because of its low noise, small size configuration. An ink jet printer may be loaded with four ink jet heads each being filled with with one of cyan ink, magenta ink, yellow ink and black ink in order to form a full-color image. Specifically, to form a color image, the ink jet heads are arranged on the printer in an array, and each ejects ink of particular color toward a preselected position of a paper or similar recording medium. The prerequisite with this type of printer is that the four heads be accurately mounted to the printer in order to insure high image quality. If any one of the ink jet heads is deviated from a preselected position in each direction then the ink drop ejected from the head cannot hit a desired position on a paper. This results in color misregister or the deviation of an image with respect to the contour of the paper and thereby deteriorates image quality.

To protect image quality from deterioration ascribable to the positional deviation of the heads, it is necessary that the relative position between the four heads themselves and the relative position between the heads and the paper be fixed with a deviation smaller than preselected one.

While screws are predominant as means for fixing the heads 1*a*–1*d* in place, they bring about positional deviation as great as several ten microns to several hundred microns and fail to implement the required accuracy. Although the required accuracy may be available with screws, screws lower the yield and thereby increase the production cost. For this reason, adhesives expected to reduce the deviation, compared to screws, are being tested, as stated earlier. Specifically, adhesive is filled in a gap formed between two objects for positional adjustment (sometimes referred to as fill adhesion). The gap is greater than an adjustment margin.

This kind of approach is taught in, e.g., Japanese Patent Laid-Open Publication No. 7-89185. Specifically, a gap between desired objects is selected such that the objects do not contact each other despite the accuracy of their configurations, and adhesive is filled in such a gap. It has also been proposed to mount an ink jet head to a head holder by using ultraviolet (UV) ray curable adhesive.

However, the conventional fill adhesion schemes are likely to fail to maintain the required positional accuracy of the ink jet head. This reduces the yield and causes the objects with low accuracy to be simply discarded, resulting an increase in production cost. In addition, when the adhesive peels off after the production, the force fixing the head in place decreases and causes the printer to lose its fundamental function.

SUMMARY OF THE INVENTION

It is therefore an object of the present invention to provide a structure and a method for mounting an ink jet head capable of mounting the head to an ink jet printer with unprecedented accuracy, increasing yield, and preventing a force fixing the head in place from decreasing after production, and a method and an apparatus for producing an ink jet head assembly.

In accordance with the present invention, a device for ejecting a substance to a desired object includes a plurality of ejecting members for ejecting the substance. A a base holds the plurality of ejecting members. A holding member holds, after the plurality of ejecting members and base each has been adjusted to a respective preselected position, the ejecting members and base between the ejecting members and the base with adhesive.

Also, in accordance with the present invention, a method of fixing to a base an ejection device for ejecting a substance toward a desired object begins with the step of locating the ejection device at a preselected position relative to the base. A fixing device including a first and a second adhering surface applied with adhesive beforehand is positioned such that the first and second adhering surfaces respectively face a mounting surface of the ejection device and a fixing surface of the base. The adhesive is brought into contact with the mounting surface and fixing surface. Then, the adhesive is cured.

Further, in accordance with the present invention, a method of producing an ink jet head assembly including an ink jet head for ejecting ink drops via ejection ports, and a head holder on which the ink jet head is mounted via an intermediate member, the intermediate member being fixed to the ink jet head and head holder by adhesive begins with the steps of chucking the ink jet head, intermediate member and head holder, applying the adhesive to adhering surfaces of at least one of the ink jet head, intermediate member and head holder, and moving each of the ink jet head, intermediate member and head holder to a respective initial adhering position. Each of the ink jet head, intermediate member and head holder brought to the initial adhering positions is adjusted to a respective final adhering position. The intermediate member brought to the final adhering position is released. Then, the adhesive is cured. Finally, the ink jet head is released after curing of the adhesive.

Moreover, in accordance with the present invention, an apparatus for producing an ink jet head assembly includes a head moving mechanism capable of selectively chucking or releasing an ink jet head, for moving the ink jet head to an adhering position and adjusting the position of the head. An intermediate member moving mechanism is capable of selectively chucking or releasing an intermediate member, for moving the intermediate member to the adhering position and adjusting the position of the intermediate member. A head holder moving mechanism is capable of selectively chucking or releasing a head holder, for moving the head holder to the adhering position and adjusting the position of the head holder. An applying device applies adhesive to the adhering surfaces of one of the ink jet head, intermediate member, said head holder. A curing device cures the adhesive. A first sensing device determines that the ink jet head, intermediate member and head holder have been positioned at the adhering position after application of the adhesive. A first releasing device releases the intermediate member moving mechanism from the intermediate member in response to information received from the first sensing device. A second sensing device determines that the curing device has cured the adhesive. A second releasing device releases the head holder moving mechanism from the head holder in response in formation received from the second sensing device.

BRIEF DESCRIPTION OF THE DRAWINGS

The above and other objects, features and advantages of the present invention will become apparent from the following detailed description taken with the accompanying drawings in which.

DESCRIPTION OF THE PREFERRED EMBODIMENTS

To better understand the present invention, brief reference will be made to the conventional arrangement of ink jet heads included in a conventional color ink jet printer, shown in FIGS. 1A–1C. As shown, four ink jet heads 1*a*, 1*b*, 1*c* and 1*d* each being filled with ink of particular color are arranged in an array, constituting a four-head unit. The four-head unit is moved in a direction X while ejecting ink drops 3*a*–3*d* toward a paper or similar recording medium 2. At the same time, the paper 2 is conveyed in a direction Y. As a result, a color image is formed on the entire paper 2.

Figure 1A:
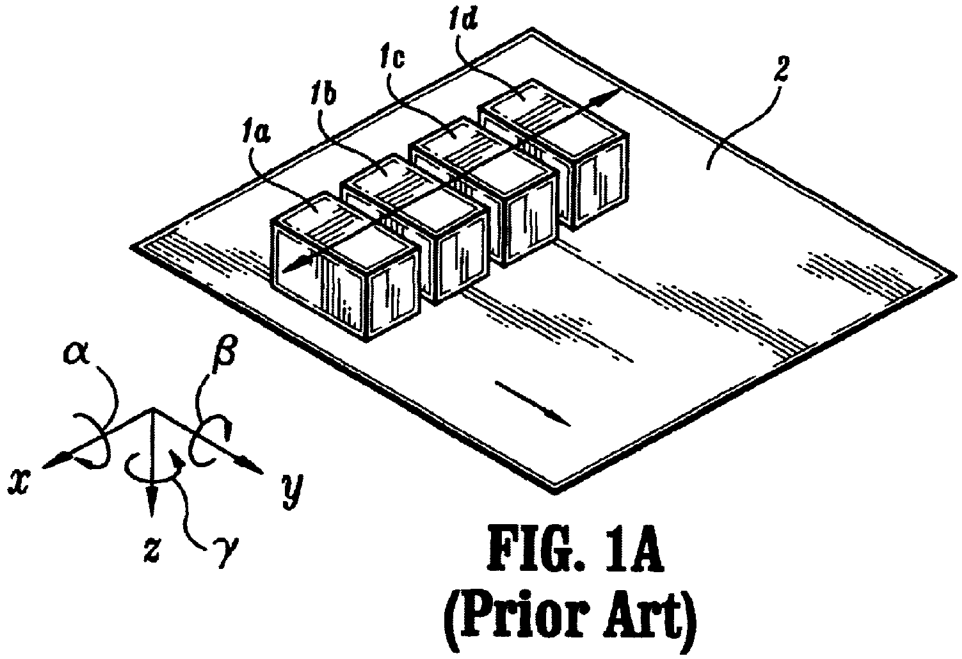
FIG. 1A (Prior Art)
FIG. 1A is a perspective view showing a conventional arrangement of ink jet heads and a paper or similar recording medium.
Figure 1B:
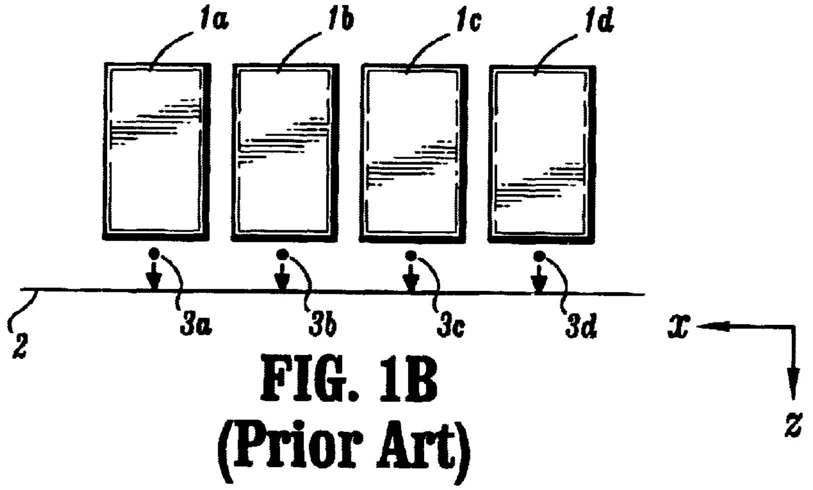
FIG. 1B (Prior Art)
FIG. 1B is a side elevation as seen in a direction Y of FIG. 1A.
Figure 1C:
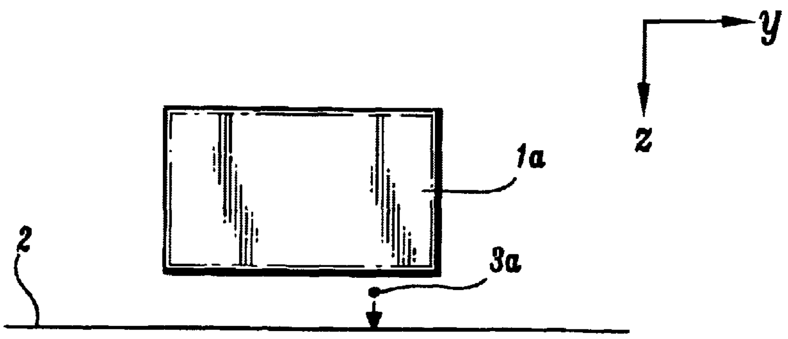
FIG. 1C (Prior Art)
FIG. 1C is a side elevation as seen in a direction X.

FIGS. 1B and 1C are respectively side elevations as viewed in directions Y and X of FIG. 1A. If any one of the ink jet heads 1*a*–1*d* is deviated from a preselected position in the direction X or Y, then the ink drop ejected from the head cannot hit a desired position on the paper 2. This results in color misregister or the deviation of an image with respect to the contour of the paper 2 and thereby deteriorates image quality. Further, if any one of the heads 1*a*–1*d* is deviated in a direction Z, then the ink drop ejected from the head fails to reach the paper 2 in a preselected period of time, also bringing about the above problem. This is also true with deviation in any one of directions α, β and γ which are rotational components about the axes X, Y and Z, respectively.

To protect image quality from deterioration ascribable to the positional deviation of the heads 1*a*–1*d*, it is necessary that the relative position between the heads 1*a*–1*d* themselves and the relative position between the heads 1*a*–1*d* and the paper 2 be fixed with a deviation smaller than preselected one.

Usually, a positional accuracy of several microns to several ten microns is required of the above relative positions. The key to such a positional accuracy is a technology for fixing the four heads 1*a*–1*d* in place while maintaining the required accuracy as to the relative position between the heads 1*a*–1*d*. How high the accuracy may be at the time of adjustment, any displacement occurred at the time of fixation results in the need for readjustment or, in the case of an inseparable structure, results in the discarding of the defective portion. This undesirably increases the time and cost for adjustment.

While screws are predominant as means for fixing the heads 1*a*–1*d* in place, they bring about positional deviation as great as several ten microns to several hundred microns and fail to implement the required accuracy. Although the required accuracy may be available with screws, screws lower the yield and thereby increase the production cost. For this reason, adhesives expected to reduce the deviation, compared to screws, are being tested, as stated earlier. Specifically, adhesive is filled in a gap formed between two objects for positional adjustment. The gap is greater than an adjustment margin.

Figure 2A:
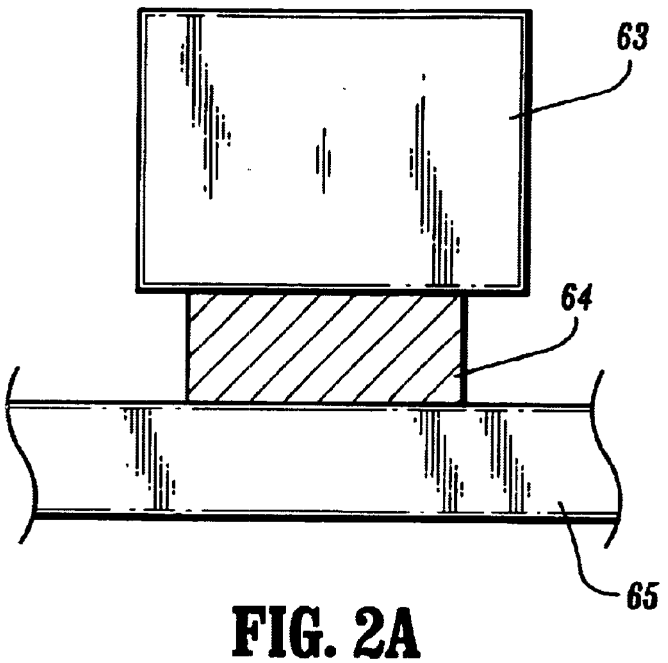
FIG. 2A (Prior Art)
FIGS. 2A and 2B show a conventional procedure for mounting an ink jet head.
Figure 2B:
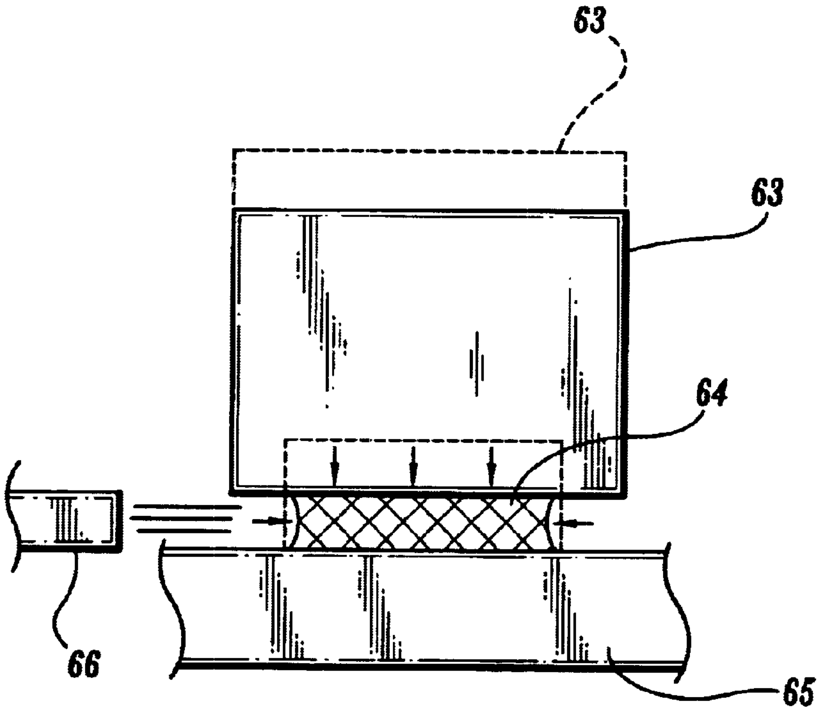
FIG. 2B (Prior Art)

FIGS. 2A and 2B show another conventional scheme for fixing an ink jet head to a head holder. As shown in FIG. 2A, ultraviolet (UV) ray curable adhesive 64 is applied to one side of a head 63, and then the head 63 is positioned on a head holder 65. Subsequently, as shown in FIG. 2B, UV rays are radiated to the adhesive 64 via a light guide 66 and a gap between the head 63 and the head holder 65. As a result, the adhesive 64 is cured and fixes the head 63 to the head holder 65. If either the head 63 or the head holder 65 is transparent for UV rays, then UV rays will be radiated to the adhesive 64 via the head 63 or the head holder 65.

Figure 3A:
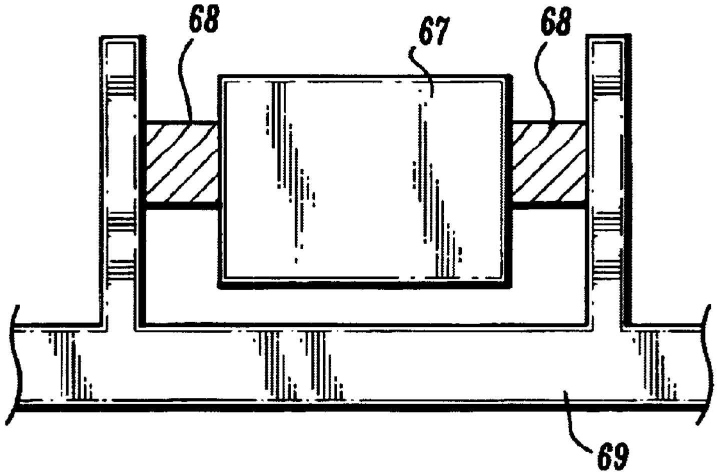
FIG. 3A (Prior Art)
FIGS. 3A–3C show another conventional procedure for mounting an ink jet head.
Figure 3B:
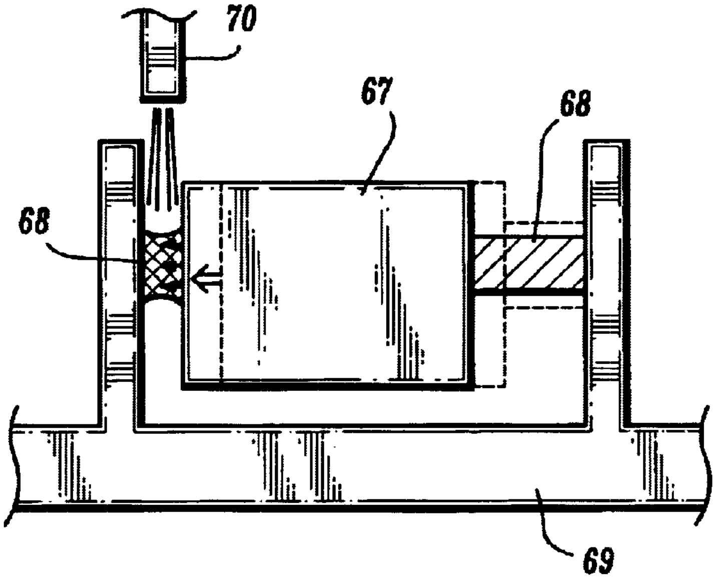
FIG. 3B (Prior Art)
Figure 3C:
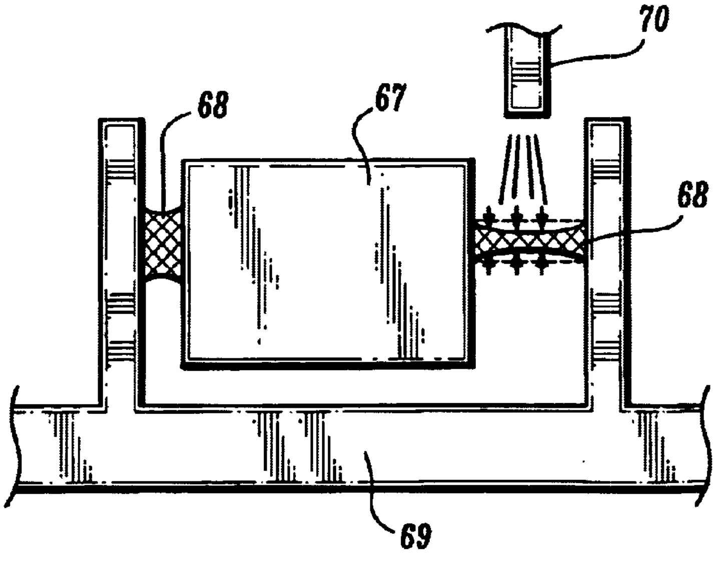
FIG. 3C (Prior Art)

FIGS. 3A–3C demonstrate still another conventional scheme using UV ray curable adhesive. As shown in FIG. 3A, UV ray curable adhesive 68 is applied to two opposite sides of a head 67 symmetrical to each other. The head 67 with the adhesive 68 is positioned relative to a head holder 69. Subsequently, as shown in FIG. 3B, UV rays are radiated to the adhesive 68 on one side of the head 67 via a light guide 70 and a gap between the head 67 and the head holder 68, causing the adhesive 68 to set. Thereafter, as shown in FIG. 3C, UV rays are radiated to the adhesive 68 on the other side of the head 67 via the light guide 70 and a gap between the head 67 and the head holder 68, causing the adhesive 68 to set. As a result, the head 68 is fixed to the head holder 68 at both sides thereof.

Figure 4A:
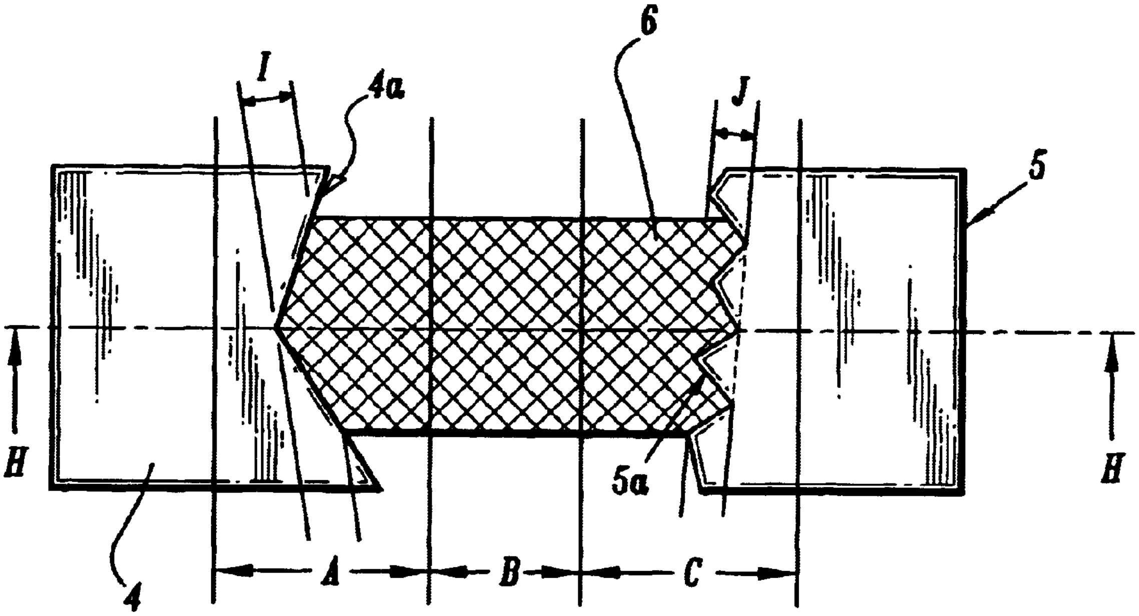
FIG. 4A (Prior Art)
FIG. 4A is a plan view modeling a conventional fill adhesion method.
Figure 4B:
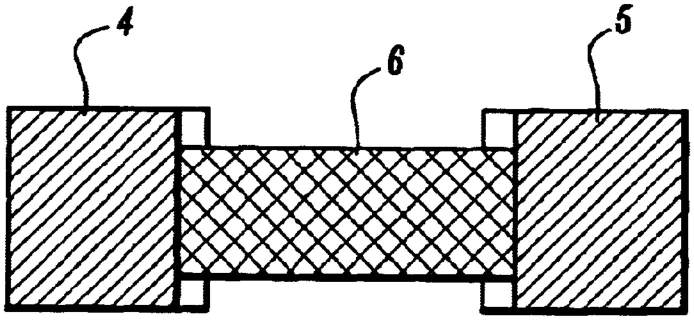
FIG. 4B (Prior Art)
FIG. 4B is a section along line H—H of FIG. 4A.

However, the conventional schemes described above have the following problems because they fill adhesive in a gap between objects which is so selected as to prevent the objects from contacting each other. As shown in FIGS. 4A and 4B, assume that a head 4 is fixed to a head holder 5 by adhesive 6 filling a gap between them, that the head 4 has an adhering surface 4*a* having a positional scatter A (adjustment margin), and that the head holder 5 has an adhering surface Sa having a positional scatter C. Then, it is necessary to provide a gap B for preventing the adhering surfaces 4*a* and 5*a* from contacting each other and guaranteeing a clearance to be filled with the adhesive 6. Consequently, the adhesive 6 has a thickness which is at least B or A+B+C in the worst case. In this manner, the thickness of the adhesive has a scatter of A+C. In addition, the thickness of the adhesive 6 sometimes has a scatter of I+J due to the surface accuracy of the adhering surfaces 4*a* and 5*a*.

Figure 5A:
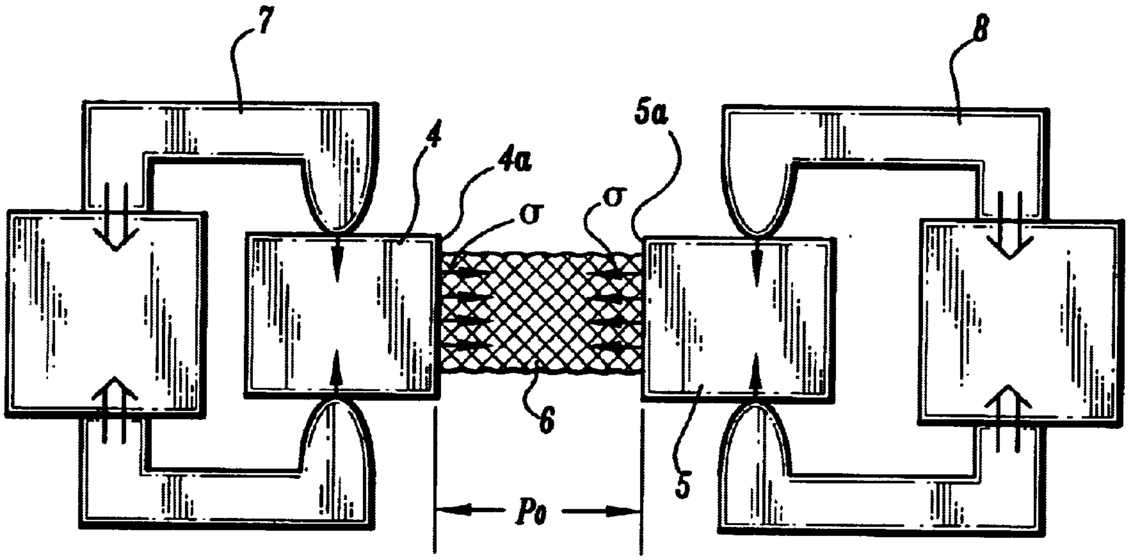
FIG. 5A (Prior Art)
FIG. 5A shows adhesive cured between a head and a head holder by the conventional adhesion method.
Figure 5B:
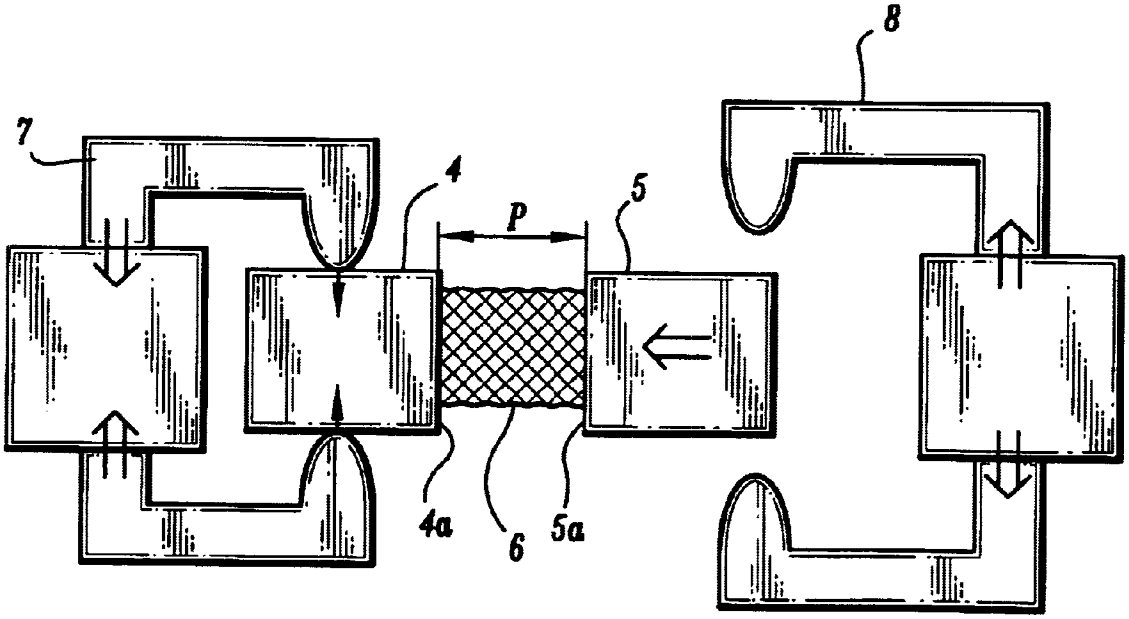
FIG. 5B (Prior Art)
FIG. 5B is a view similar to FIG. 5B, showing the head holder released from a clamper.

Adhesives in general shrink when they set. For example, as shown in FIG. 5A, assume that the head 4 and head holder 5 are respectively clamped by campers 7 and 8, and then the adhesive 6 filling the gap between the adhering surfaces 4*a* and 5*a* is cured. Then, stresses a are generated in the adhesive 6, head 4 and head holder 5, so that the head 4 and head holder 5 are elastically or plastically deformed after the setting of the adhesive 6. Consequently, as shown in FIG. 5B, when the damper 8 is released from the head holder 5, the adhesive 6, head 4 and head holder 5 are deformed in the direction in which the stresses a are cancelled. This reduces a gap $P_0$ between the head 4 and the head holder 5 to a gap P after the adhesion and prevents a desired accuracy from being achieved.

To obviate the displacement of the objects after the setting of the adhesive, it is important to reduce the amount of the adhesive as far as possible. However, with the above conventional schemes, the thickness of the adhesive cannot be reduced below B, FIG. 4A. Therefore, when the displacement ascribable to the setting of the adhesive having the thickness B exceeds an allowable value, it sometimes cannot be coped with by the variation of the thickness of the adhesive, preventing the displacement from being reduced after fixation.

Further, during the transport or the actual operation of the ink jet printer, it is likely that temperature around the adhesive rises and causes the adhesive or the adhered objects to expand. As a result, the adhered portions are apt to peel off due to a difference in the coefficient of linear expansion between the adhesive and the adhered objects. While this occurrence may also be effectively coped with if the thickness of the adhesive and therefore the dimensional variation is reduced, the thickness of the adhesive cannot be reduced below B, as stated above.

The scatter of A+C in the thickness of the adhesive directly translates into a scatter in the amount of shrinkage of the adhesive ascribable to setting. This is apt to cause the position of the head to scatter after fixation and prevent the required accuracy from being achieved. Usually, the UV rays curable adhesive shrinks with a volumetric shrinkage of about 5% to 10% in the event of setting. Assume that the adhesive has a volumetric shrinkage of 7% and has a cubic shape when cured. Then, the adhesive shrinks by about 2% in each of the tridimensional directions. It follows that an error of about 0.5 mm in the thickness of the adhesive results in an error of about 10 $\mu$m in the amount of shrinkage in each of the tridimensional directions. When the objects to be adhered are produced by the injection molding of resin, the scatter A+C is likely to exceed 0.5 mm and make the displacement after fixation critical.

Moreover, when the damper 8 is released from the head holder 5, as shown in FIG. 5B, the adhesive 6, head 4 and head holder 5 deform due to the stresses a with the result that the head 4 is displaced. However, some stresses remain in the adhesive 6, head 4, and head holder 5 even after the displacement of the head 4. As a result, during the transport of the actual operation of the ink jet printer, the adhesive 6, head 4 and head holder 5 are apt to deform and peel off due to shocks or thermal shocks.

As stated above, the conventional adhesive schemes are likely to fail to maintain the required positional accuracy of the ink jet head. This reduces the yield and causes the objects with low accuracy to be simply discarded, resulting an increase in production cost. In addition, when the adhesive peels off after the production, the force fixing the head in place decreases and causes the printer to lose its fundamental function.

In the procedure shown in FIGS. 2A and 2B, the adhesive 64 shrinks when the adhesive 64 is fully cured. Consequently, as shown in FIG. 2B, the head 63 is pulled by the head holder 65 and displaced thereby.

Figure 6A:
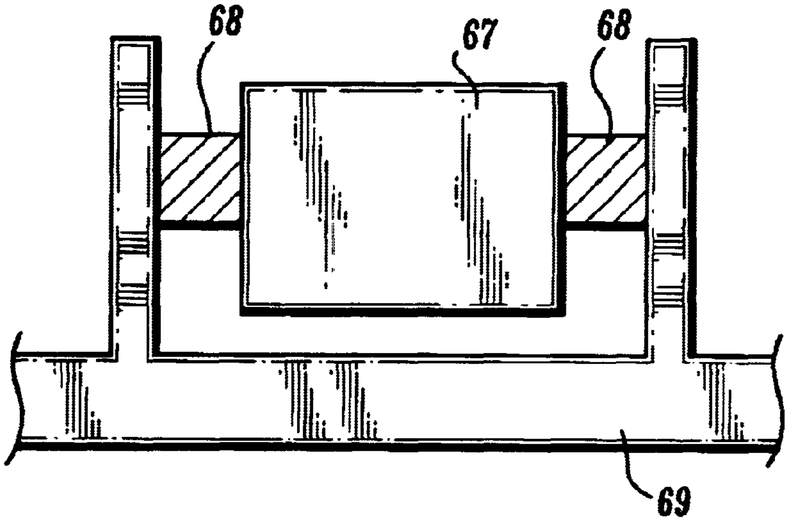
FIG. 6A (Prior Art)
FIGS. 6A and 6B demonstrates another conventional method of mounting an ink jet head.
Figure 6B:
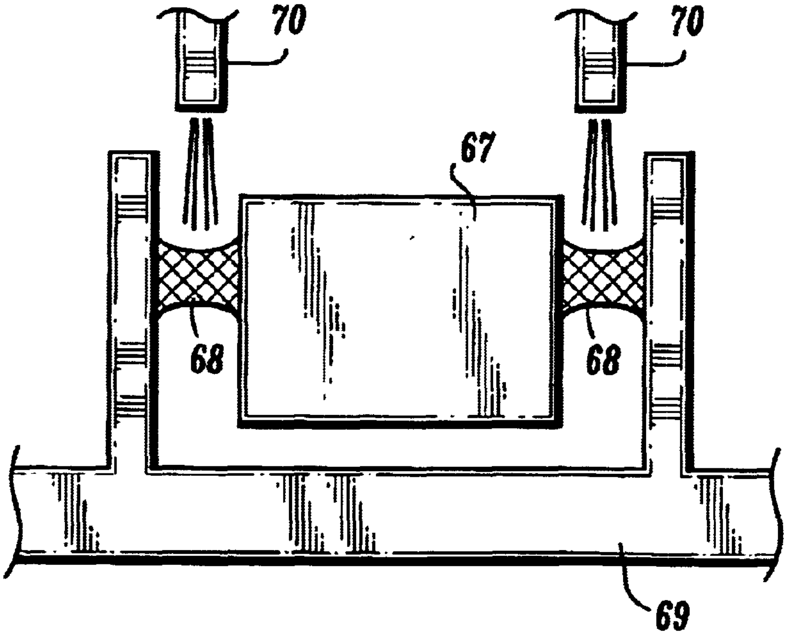
FIG. 6B (Prior Art)

In the procedure shown in FIGS. 3A–3C, the adhesive 68 on one side of the head 67 is cured, and then the adhesive 68 on the other side of the head 67 is cured. Consequently, as shown in FIG. 3B, the adhesive 68 cured first shrinks and causes one side of the head 67 to be pulled by the head holder 68. Because the other side of the head 67 is not displaced, the adhesive 68 on the other side of the head 67 simply shrinks in the up-and-down direction, also resulting in the displacement of the head 67. FIGS. 6A and 6B show a specific implementation for solving this problem. As shown, the adhesive 68 is applied to both sides of the head 67, i.e., two symmetrical positions at both sides of the head 67. After the head 67 has been positioned relative to the head holder 69, UV rays are radiated to the adhesive 68 on both sides at the same time via the light guides 70. With this scheme, it is possible to cause the stresses ascribable to the shrinkage of the adhesive 68 to cancel each other.

Figure 7A:
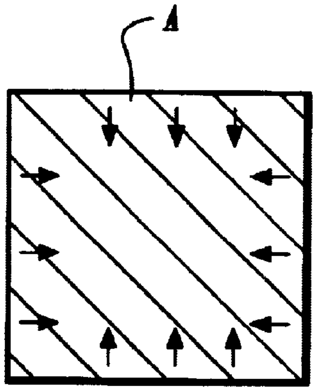
FIG. 7A (Prior Art)
FIGS. 7A and 7B show how adhesive sets.
Figure 7B:
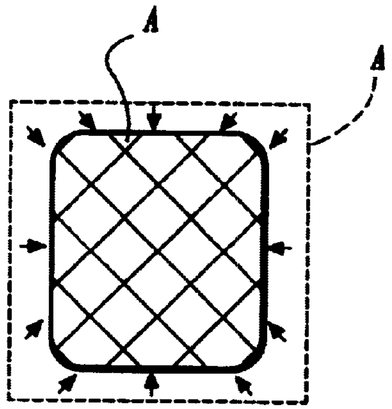
FIG. 7B (Prior Art)

FIGS. 7A and 7B show how adhesive A sets. As shown in FIG. 7A, UV rays are radiated to the adhesive A. As a result, as shown in FIG. 7B, the adhesive A shrinks due to stress vectors acting inward.

Figure 8A:
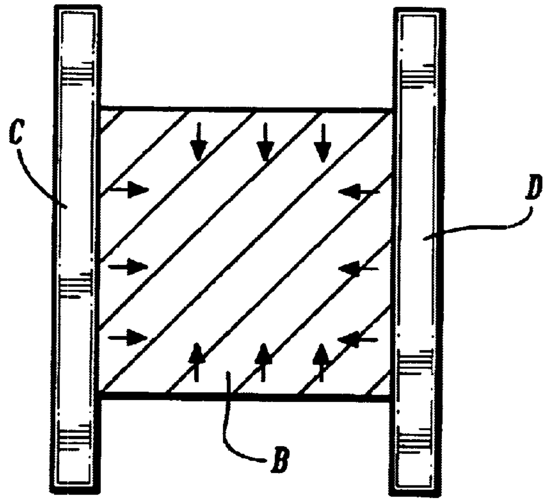
FIG. 8A (Prior Art)
FIGS. 8A and 8B show how adhesive intervening between two objects sets.
Figure 8B:
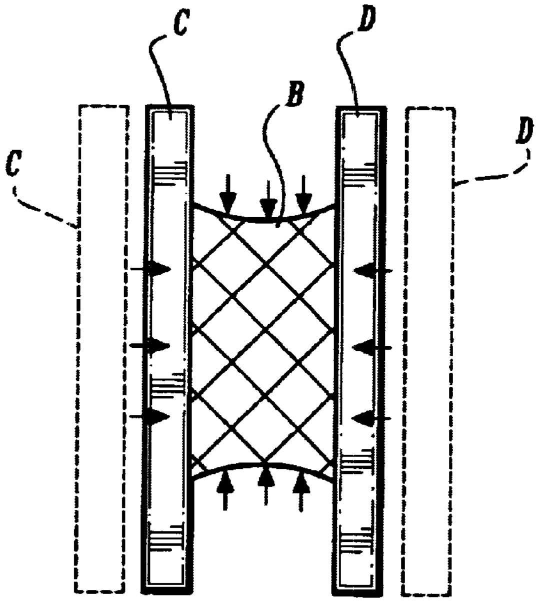
FIG. 8B (Prior Art)

As shown in FIG. 8A, assume that adhesive B is applied to two objects C and D and then subjected to UV radiation. Then, stress vectors act inward in the adhesive B, as stated above. As shown in FIG. 8B, because the adhesive B is applied to both of the adhesives C and D, stress vectors opposite in direction to each other act in the objects C and D, respectively. As a result, the objects C and D are displaced toward each other.

Figure 9A:
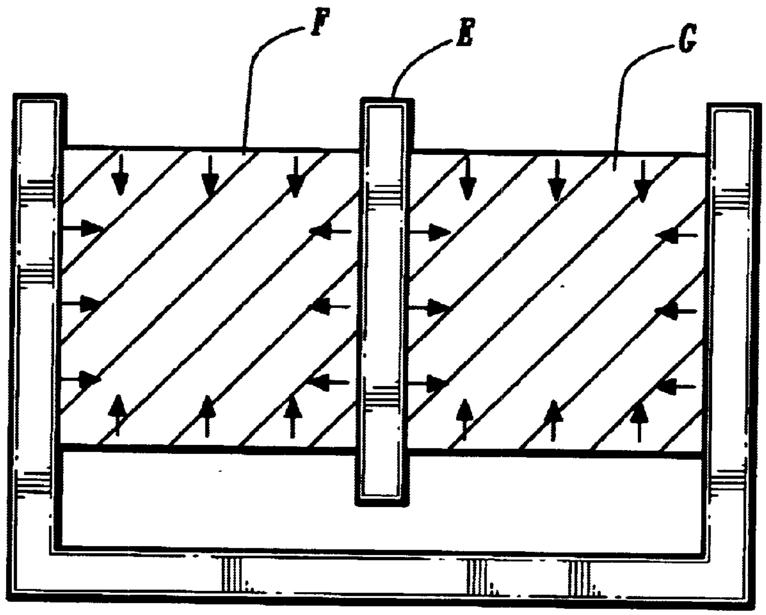
FIG. 9A (Prior Art)
FIGS. 9A and 9B show how adhesive sets between the symmetrical surfaces of an object and another object.
Figure 9B:
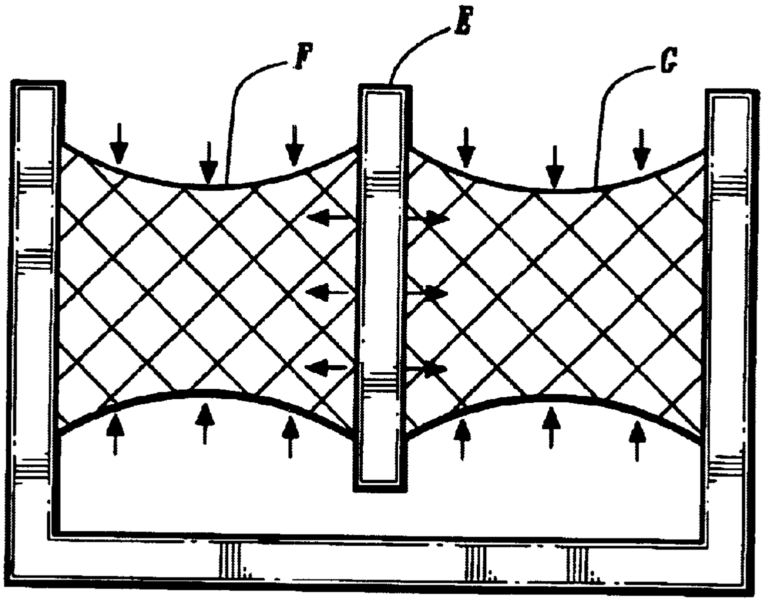
FIG. 9B (Prior Art)

FIG. 9A shows adhering surfaces symmetrical to each other with respect to an object E. As shown in FIG. 9B, when adhesives F and G are cured under the same conditions, they each shrinks inward with the result that stress vectors act in the two adhering surfaces in the same direction, but away from each other.

It will be seen from the above that when the two adhesive layers 68 are simultaneously subjected to UV radiation from the above via the light guides 70 under the same conditions, they start setting at the same time. In this case, the two adhesive layers 68 shrink in the same direction, but away from each other, so that their shrinking motions cancel each other. That is, stress vectors acting in the same direction, but away from each other, are generated in the two adhering surfaces of the head 67 at the same time and therefore balanced with each other. Therefore, when the adhesives 68 are cured to fix the head 67 to the head holder 69, the head 67 is prevented from being displaced and can be accurately mounted to the head holder 69.

However, when the head 67 is directly mounted to the head holder 69 via the adhesive layers 68, and then the adhesive layers 68 are subjected to UV radiation under the same conditions, an adjustment margin for positional adjustment is necessary and prevents the adhesive layers 68 from being reduced in thickness. This not only prevents the inside stresses of the adhesive 68 from being sufficiently reduced, but also prevents the head 67 from being accurately positioned relative to the head holder 69. Should the head 67 be displaced toward either one of the adhering surfaces of the head holder 69, the right and left adhesive layers 68 would fail to have the same thickness and would prevent the stresses from cancelling each other despite the radiation of UV rays effected under the same conditions.

Preferred embodiments of the present invention free from the above problems will be described with reference to the accompanying drawings.

1st Embodiment

Referring to FIGS. 10–17, a structure for mounting ink jet heads embodying the present invention will be described. First, reference will be made to FIGS. 10–12 for describing the construction of the illustrative embodiment. As shown, decahedral ink jet heads 11*a*–11*d* are respectively filled with cyan ink, magenta ink, yellow ink, and black ink. The heads 11*a*–11*d* each ejects ink drops via a plurality of ejection ports 12 thereof.

The heads 11*a*–11*d* each is mounted on a head holder 14 via four generally L-shaped intermediate members 13*a*–13*d*. The intermediate members 13*a*–13*d* are fixed to the heads 11*a*–11*d* by UV ray curable adhesive 15 and also fixed to the head holder 14 by the adhesive 15. The intermediate members 13*a*–13*d* are formed of a material transparent for UV rays.

The head holder 14 has compartments formed by partitions 14*a* in order to accommodate each of the heads 11*a*–11*d* in the respective compartment. A fixing portion, not shown, is provided on the underside of the head holder 14 and mounted to a printer body. The printer body is mounted on a printer, facsimile apparatus, copier or similar machine.

Figure 13:
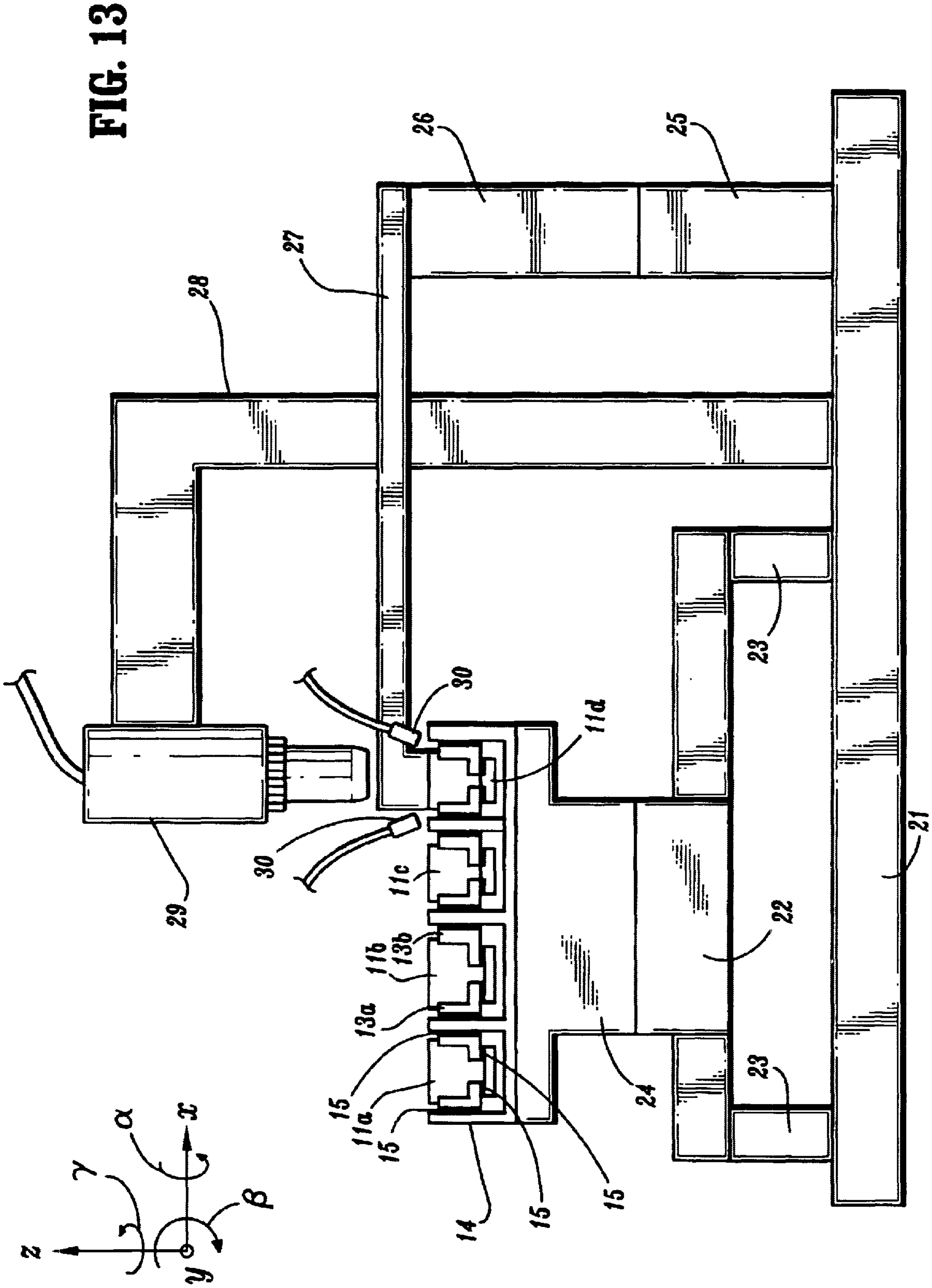
FIG. 13 shows the general construction of an apparatus for mounting the assembly shown in FIG. 10.

FIG. 13 shows an apparatus for mounting the heads 11*a*–11*d* to the head holder 14. As shown, the apparatus includes a board 21. A table 22 for moving the head holder 14 is fixed to the top of the board 21 by fixing members 23 and has a single-axis moving mechanism thereinside. A chuck 24 is mounted on the table 22 in order to position and fix the head holder 14. Specifically, the table 22 is movable in a direction X (right-and-left direction as viewed in FIG. 13) while holding the head holder 14 with the chuck 24.

A six-axis moving mechanism 26 is mounted on the board 21 via a fixing member 25 and has a chuck 27 at its free end. The chuck 27 is capable of chucking the heads 11*a*–11*d* one by one. The six-axis moving mechanism 26 is movable in directions X, Y and Z and directions α, β and γ which are rotational components about the X, Y and Z axes, respectively, while holding any one of the heads 11*a*–11*d* with the chuck 27.

A CCD (Charge Coupled Device) camera 29 is mounted on the board 21 via a fixing member 28 in order to shoot the ejection ports 12 of each of the heads 11*a*–11*d*. A control and calculation 40 (see FIG. 23) performs calculation with an image picked up by the camera 29 and causes, based on the result of calculation, the moving mechanism 26 to move the head which it is holding. As a result, the head is positioned relative to the head holder 14.

Also mounted on the board 21 is a mechanism for chucking the intermediate members 13*a*–13*d* and moving them in the three directions X, Y and Z. There are also shown in FIG. 13 light guides 30 for radiating UV rays.

A procedure for mounting the heads 11*a*–11*d* to the head holder 14 is as follows. First, the table 22 is moved while holding the had holder 14 with the chuck 24, until the right end of the head holder 14, as viewed in FIG. 13, has been positioned beneath the camera 29. Next, the chuck 27 chucks the head 11*d* and moves it to a position above the right end of the head holder 14. While the camera 29 shoots the ejection ports 12 of the head 11*d*, the control and calculation 40, FIG. 23, calculates the center of gravity of the image of the ports 12 and thereby determines the position of the head 11*d* in the directions X and Y. As for the direction Z, the control and calculation 40 determines the position of the head 11*d* on the basis of data output from an autofocus device, not shown, built in the camera 29 and relating to the amount of defocus in the direction Z.

The control and calculation 40 calculates distances to a target position on the basis of the results of the above measurement. Then, the control and calculation 40 causes the six-axis moving mechanism 26 to move the head 11*d* to the target position. Subsequently, the mechanism, not shown, moves the intermediate members 13*a*–13*d* toward the head 11*d* by holding them with the chuck. Thereafter, the UV ray curable adhesive 15 is applied to the adhering surfaces of the head 11*a* and those of the head holder 14 to a preselected thickness. The thickness of the adhesive 15 is monitored via the camera 29.

After the intermediate members 13*a*–13*d* have been positioned between the head 11*d* and the head holder 14, UV rays are radiated to the adhesive 15 via the light guides 30 in order to cause the it to set. Then, the chuck of the moving mechanism assigned to the intermediate members 13*a*–13*d* and the chuck 27 of the moving mechanism 26 are released. Subsequently, the table 22 is moved in the direction X until the portion of the head holder 14 adjoining the head 11*d* has been positioned below the camera 29. In this condition, the chuck 27 chucks the next head 11*b* and mounts it to the head holder 14 via another group of intermediate members 13*a*–13*d*. Such a procedure is repeated until the other heads 11*a* and 11*b* have been mounted to the head holder 14 via the respective intermediate members 13*a*–13*d*.

As stated above, the intermediate members 13*a*–13*d* intervening between the heads 11*a*–11*d* and the head holder 14 are fixed to the heads 11*a*–11*d* by the adhesive 15 and also fixed to the head holder 14 by the adhesive 15. It therefore suffices to provide the adhesive 15 between the adhering surfaces of the heads 11*a*–11*d* and those of the intermediate members 13*a*–13*d* and provide the adhesive 15 between the adhering surfaces of the head holder 14 and those of the intermediate members 13*a*–13*d* with a constant and minimum necessary thickness. This allows the heads 11*a*–11*d* to be accurately mounted without resorting to strict control over the positional accuracy of the portions where the heads 11*a*–11*d* are adhered or the portions where the head holder 14 is adhered. Therefore, the above procedure increases the yield and prevents the force fixing the heads 11*a*–11*d* from decreasing after the production.

Because the adhesive 15 is UV ray curable and because the intermediate members 13*a*–13*d* are transparent for UV rays, UV rays can be radiated to the adhesive 15 via the members 13*a*–13*d*, i.e., onto all of the desired portions at the same time perpendicularly to the adhering surfaces. This successfully reduces the curing time of the adhesive 15 and thereby enhances productivity.

If importance is not attached to the curing time of the adhesive 15, the intermediate members 13*a*–13*d* may be formed of a material opaque for UV rays. In the illustrative embodiment, the material transparent for UV rays is desirable because the material opaque to UV rays would require UV rays to be radiated via the gaps between the objects. Another advantage achievable with such a material is that it facilitates control over the heads 11*a*–11*d* against shrinkage and control over the displacements of the heads 11*a*–11*d* after fixation.

FIGS. 14–17 respectively show cubic heads 31–34 which may be substituted for the decahedral heads 11*a*–11*d*. The crux is that each head has at least one adhering surface. In addition, the adhering surfaces facing each other may even be curved or spherical so long as they are parallel to each other.

Figure 15:
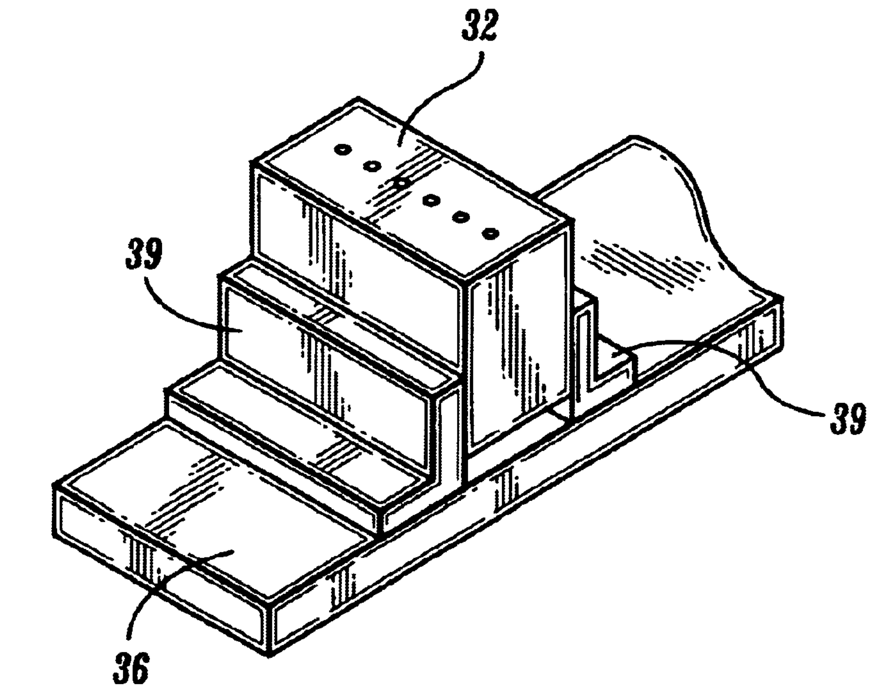
Figure 16:
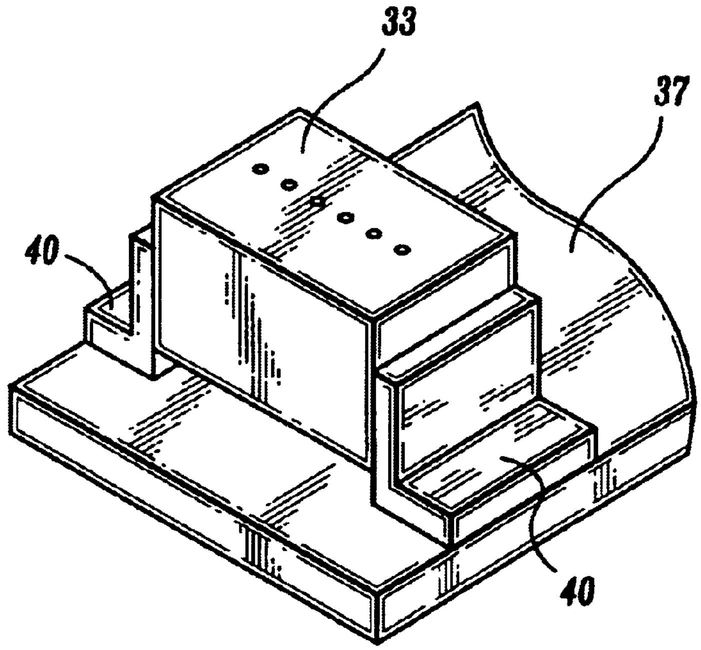
Figure 17:
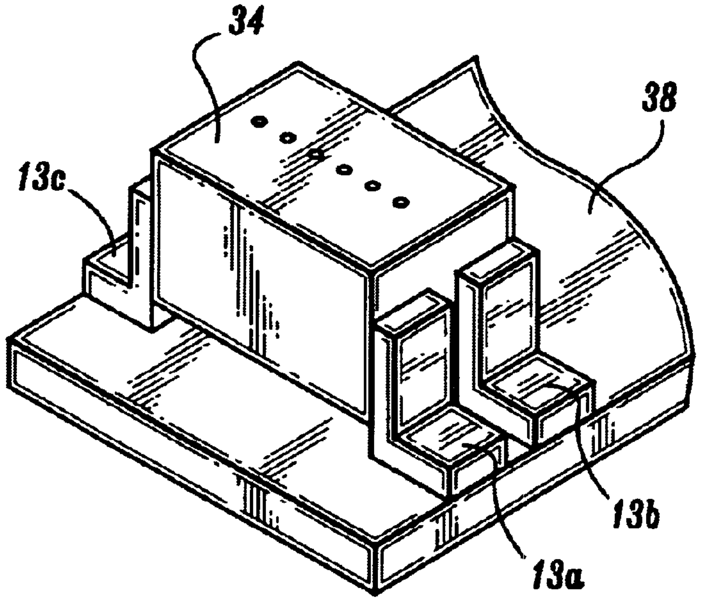

As shown in FIGS. 15 and 16, only two intermediate members 39 and 40 may be assigned to each head. The crux is that one or more intermediate members are assigned to each head.

The head holder 14 having the partitions 14*a* may be replaced with any one of flat head holders 35–38 shown in FIGS. 14–17, respectively.

In the illustrative embodiment and its modifications shown in FIGS. 14–17, two or more intermediate members 13*a*–13*d*, 39 or 40 are assigned to each of the heads 11*a*–11*d*. The prerequisite is that the same number of members 13*a*–13*d*, 39 or 40 be located symmetrically at both sides of the center line of each head for the following reason. When the adhesive shrinks during setting, forces act on the heads 11*a*–11*d* or 31–34 and are apt to displace them. Although the heads 11*a*–11*d* or 31–34 may not be displaced, residual stresses sometimes accumulate in the adhesive and act on the heads after adhesion due to, e.g., a thermal shock, displacing the heads or causing the adhered portions to peel off. When the same number of intermediate members 13*a*–13*d*, 39 or 40 are located symmetrically at both sides of the center line of each head, forces ascribable to shrinkage or the residual stresses act in the same amount in the direction in which they cancel each other. This obviates the above occurrence and further enhances the accurate mounting of the heads as well as high yield, and in addition prevents the fixing force from decreasing after production more positively.

In the illustrative embodiment, the heads 11*a*–11*d*, intermediate members 13*a*–13*d* and head holder 14 may be formed of materials whose coefficients of linear expansion are identical or close to each other. Specifically, temperature around the adhered portions often rises by several ten degrees centigrade when the heads 11*a*–11*d* are operated in an ink jet printer or when the printer with the heads 11*a*–11*d* is transported. In such a case, if the heads 11*a*–11*d*, intermediate members 13*a*–13*d* and head holder 14 each has a particular coefficient of linear expansion, the adhered portions are likely to peel off. This problem will be obviated if the heads 11*a*–11*d*, intermediate members 13*a*–13*d* and head holder 14 have the same or substantially the same coefficient of linear expansion. If desired, even the adhesive 15 may have the same or substantially the same coefficient of linear expansion as the heads 11*a*–11*d*, intermediate members 13*a*–13*d* and head holder 14 when cured.

2nd Embodiment

Figure 18:
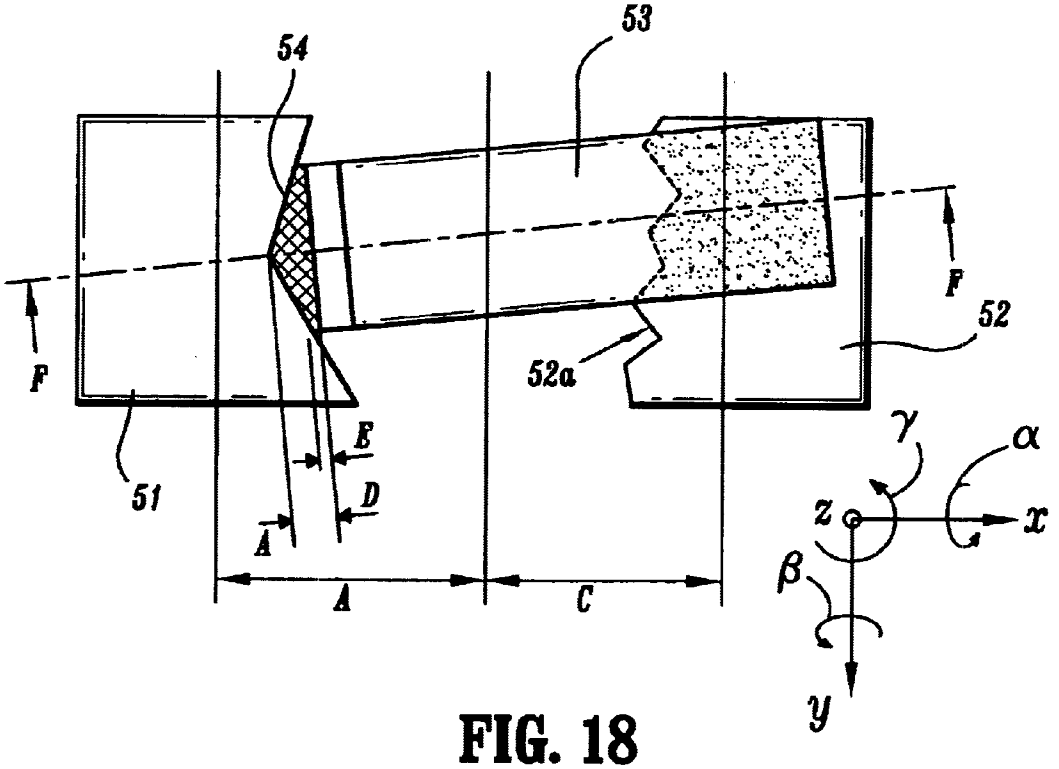
FIG. 18 is a top plan view showing a second embodiment of the present invention.
Figure 19:
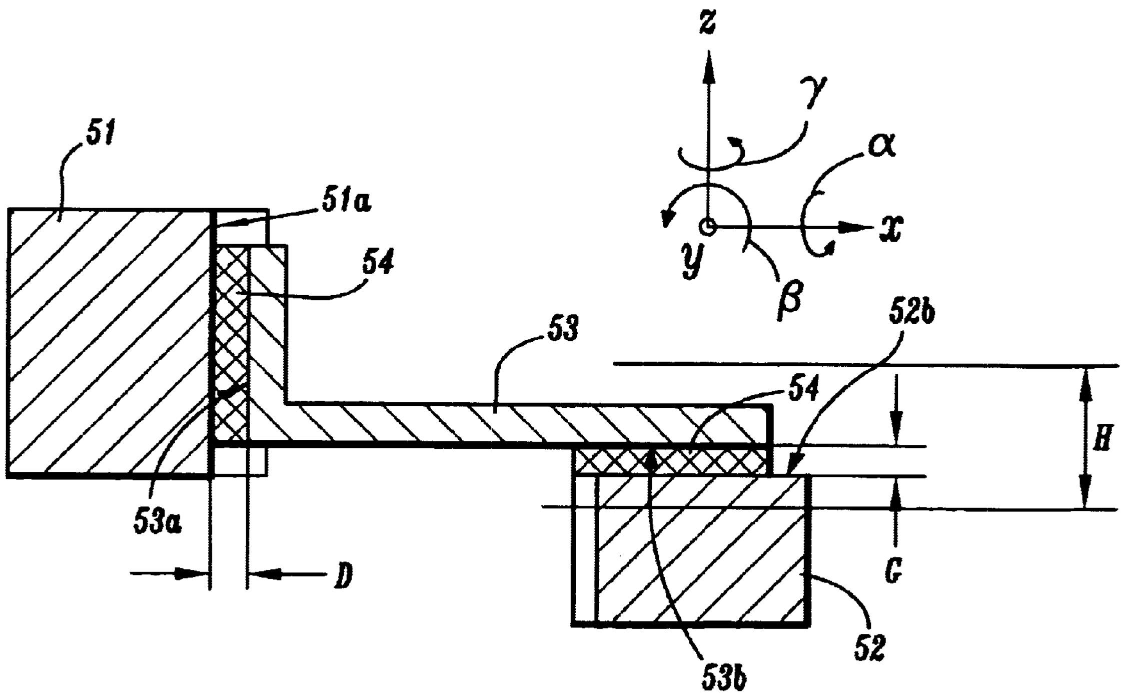
FIG. 19 is a section along line F—F of FIG. 18.
Figure 20:
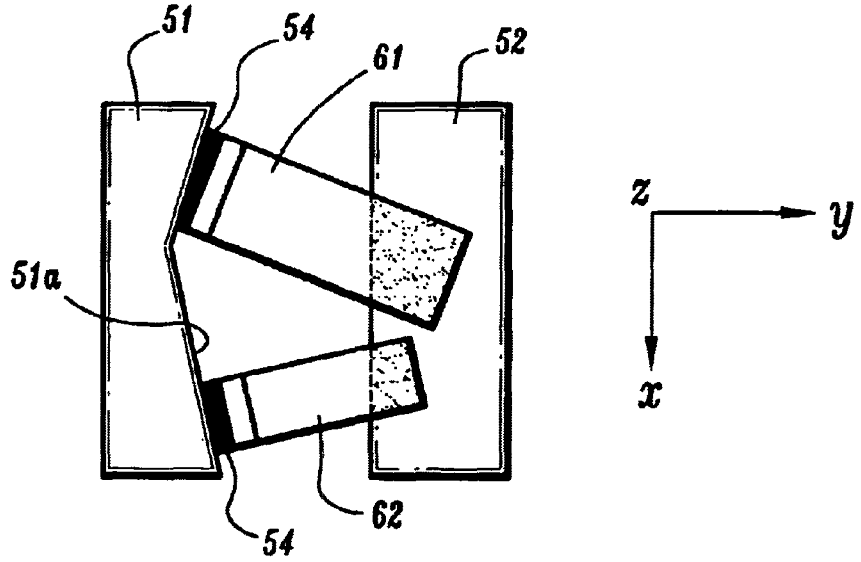
FIG. 20 shows a modification of the second embodiment.

Reference will be made to FIGS. 18–20 for describing a second embodiment of the present invention in which a single intermediate member is assigned to each ink jet head. This embodiment is identical with the first embodiment as to the materials of the intermediate members and adhesive and the method and apparatus for mounting the heads. In this embodiment, the adhering portions are not shown in detail.

There are shown in FIGS. 18–20 an ink jet head 51, a head holder 52, an intermediate member 53, and adhesive 54. The intermediate member 53 has two flat adhering surfaces 53*a* and 53*b* perpendicular to each other. The adhering surfaces 53*a* and 53*b* are respectively fixed to the head 51 and head holder 52 by the adhesive 54.

The head 51 is mounted to the head holder 52 by the apparatus shown in FIG. 13. Assume that after the head 51 has been mounted to the head holder 52, the adhering surface 51*a* of the head 51 is scattered in position by A due to the amount of adjustment of the head 51 and the configuration of the head 51. Then, in the illustrative embodiment, the intermediate member 53 can be moved in the directions X and γ in order to control the adhesive 54 to a preselected thickness. While the the adhesive 54 is shown has having a preselected thickness E, the thickness may be D, depending on the parallelism between the surface 51*a* of the head 51 and the surface 53*a* of the intermediate member 53.

Because the surface 52*a* of the head holder 52 facing the surface 51*a* of the head 51 is not an adhering surface, the limitation on the thickness of the adhesive and ascribable to the scatter C of the surface 52*a* does not matter at all. When the position of the adhering surface 52*b* of the head holder 52 has a scatter of H, the intermediate member 53 will be moved in the directions Z and α while the thickness of the adhesive on the head 51 is maintained constant. This allows the adhesive between the intermediate member 53 and the head holder 52 to be controlled to a preselected thickness. Again, the thickness of the adhesive between the intermediate member 53 and the head holder 52 may vary, depending on the parallelism between the surface 52*b* of the head 52 and the surface 53*b* of the intermediate member 35.

It is to be noted that when any one of the surface 51*a* of the head 51, the surface 52*b* of the head holder 52 and the surfaces 53*a* and 53*b* of the intermediate member 53 is inclined in the direction β, the resulting variation in the thickness of the adhesive 54 cannot be absorbed.

As stated above, the illustrative embodiment reduces the variation in the thickness of the adhesive layers ascribable to the amount of adjustment of the head 51, the positional accuracy of the surface 51*a* of the head 51, the positional accuracy of the surface 52*b* of the head holder 52 and the positional accuracy of the surface 52*b* of the head holder 52 relating to the directions X, Y, Z, α and γ. The only factor that influences the thickness of the adhesive 54 is the parallelism between the adhering surfaces, so that the thickness can be close to the minimum necessary thickness.

The second embodiment achieves the same advantages as the first embodiment. If desired, as shown in FIG. 20, the intermediate member 53 may be replaced with two intermediate members 61 and 62 in order to reduce the variation in the thickness of the adhesive layers ascribable to the accuracy of the adhering surface 51*a* of the head 51.

3rd Embodiment

Figure 21:
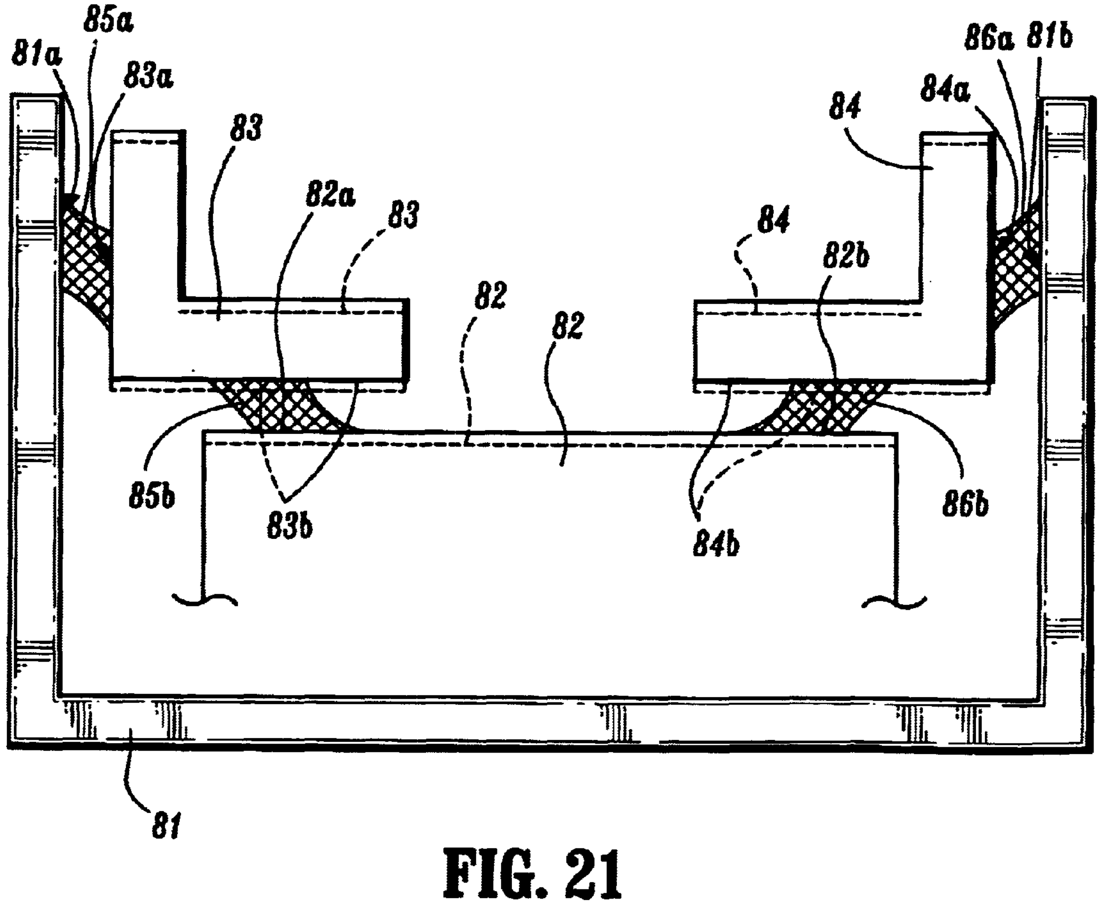
FIG. 21 shows a third embodiment of the present invention, particularly an ink jet head mounted to a head holder via adhesive.

FIGS. 21 and 22A–22C show a third embodiment of the present invention. There are shown in FIG. 21 a head holder 81 constituting the frame of an ink jet printer, an ink jet head 82, intermediate members 83 and 84 intervening between the head 82 and the head holder 81, UV ray curable adhesive layers 85*a* and 86a respectively intervening between adhering surfaces 83*a* and 84*a* of the intermediate members 83 and 84 and adhering surfaces 81*a* and 81*b* of the head holder 81, and adhesive layers 85*b* and 86*b* respectively intervening between adhering surfaces 83*b* and 84*b* of the intermediate members 83 and 84 and adhering surfaces 82*a* and 82*b* of the head 82. As shown, the adhering surfaces 83*a* and 83*b* of the intermediate member 83 and the adhering surfaces 84*a* and 84*b* of the intermediate member 84 are positioned symmetrically at both sides of the head 82, i.e., the center line of the head 82.

The intermediate members 83 and 84 function in the same manner as in the first embodiment. While only one head 82 is shown in FIGS. 21 and 22A–22C, this embodiment is also applicable to a color ink jet printer having four heads each being filled with ink of particular color; the heads each is mounted to a head holder via a respective intermediate member.

Figure 22A:
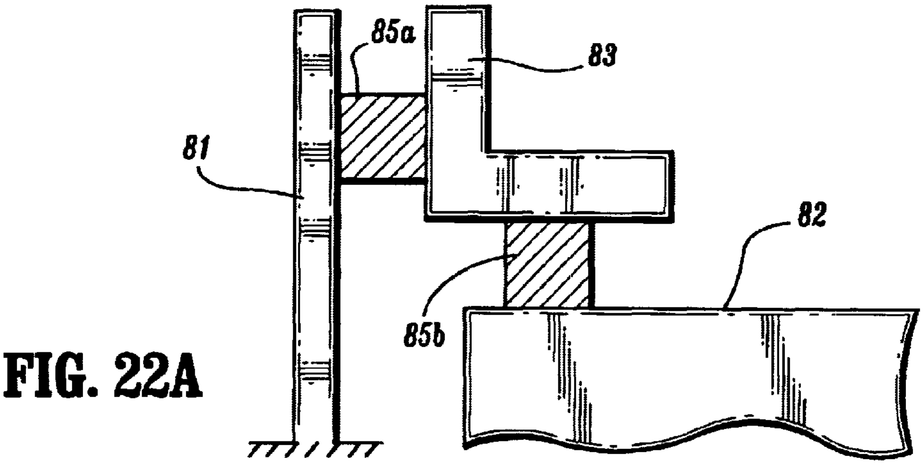
FIG. 22A shows the third embodiment in a condition wherein the adhesive is not cured.
Figure 22B:
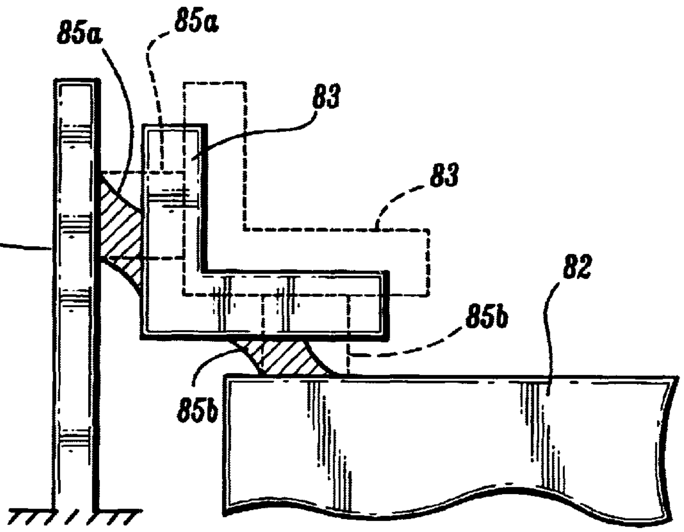
FIG. 22B is a view similar to FIG. 22A, showing a condition wherein the adhesive is cured.
Figure 22C:
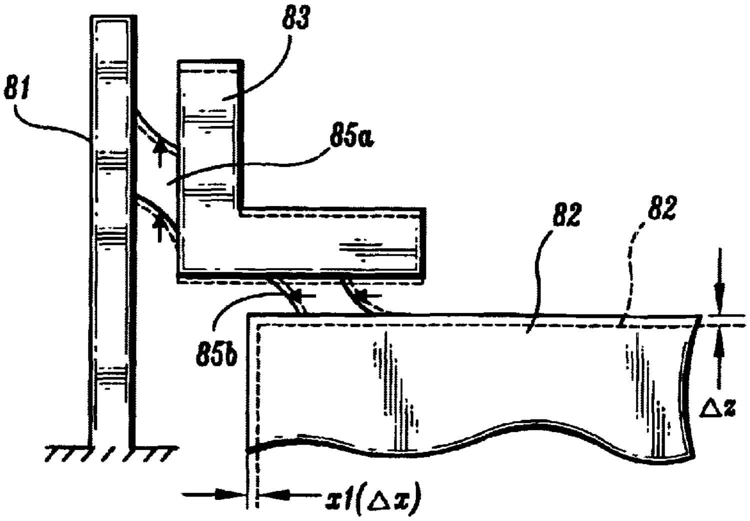
FIG. 22C shows the displacements of the ink jet head.

The intermediate members 83 and 84 are formed of a material transparent for UV rays. UV rays are radiated to the adhesive layers 85*a*, 85*b*, 86*a* and 86*b* via light guides, not shown, under the same conditions. Specifically, UV rays are caused to start and end illuminating the adhesives 85*a*–86*b* at the same timing with the same illuminance in the same direction (from the above in this embodiment), as shown in FIG. 22A. As a result, as shown in FIG. 22B, the adhesive layers 85*a* and 85*b* (as well as the adhesive layers 86*a* and 86*b*) are caused to shrink. At this instant, the intermediate member 83 is pulled toward the head holder 81 due to the shrinkage of the adhesive layers 85*a* and 85*b*, so that the head 82 is displaced toward the intermediate member 83. Consequently, as shown in FIG. 22C, the head 82 is displaced from its initial position by ΔX and ΔZ in the directions X and Z, respectively. However, because the adhesive layers 85*a* and 85*b* and adhesive layers 86*a* and 86*b* are symmetrical with respect to the center line of the head 82, the layers 85*a* and 86*a* shrink in the same direction, but away from each other. Therefore, the shrinkage of the adhesive layer 85*a* and that of the adhesive layer 86*a* cancel each other.

As stated above, with the intermediate members 83 and 84 intervening between the head 82 and the head holder 81, the illustrative embodiment should only control the adhesive layers 85*b* and 86*b* respectively provided between the adhering surfaces 82*a* and 82*b* of the head 82 and the adhering surfaces 83*b* and 84*b* of the intermediate members 83 and 84 and the adhesive layers 85*a* and 86*b* respectively provided between the adhering surfaces 81*a* and 81*b* of the head holder 81 and the adhering surfaces 83*a* and 84*a* of the members 83 and 84 to a constant minimum necessary thickness. This successfully prevents the thickness of the adhesive layers 85*a*, 85*b*, 86*a* and 86*b* from increasing.

Further, when the head 82 is positioned relative to the head holder 81 via the intermediate members 83 and 84, the thickness of the adhesive layers 85*a*–86*b* is prevented from varying without regard to the position of the head 82 relative to the head holder 81.

The thickness of the adhesive layers 85*a*–86*b* does not vary, as stated above. Therefore, when the adhesive layers 85*a*–86*b* are subjected to UV radiation under the same conditions in the same direction, they shrink in the same direction, but away from each other, so that the shrinking motions cancel each other. It follows that when the adhesive layers 85*a*–86*b* set and fix the head 82 to the head holder 81, the head 82 is prevented from being displaced and can be accurately mounted to the head holder 81.

The first to third embodiments shown and described have various advantages enumerated below.

(1) Because intermediate members intervene between heads and a head holder, it suffices to provide adhesive between the adhering surfaces of the heads and those of the intermediate members and between the adhering surfaces of the head holder and those of the intermediate members with a constant and minimum necessary thickness. This allows the heads to be accurately mounted without resorting to strict control over the positional accuracy of the portions where the heads are adhered or the portions where the head holder is adhered. Therefore, the yield is increased, and the force fixing the heads in place is prevented from decreasing after production.

(2) UV rays can be radiated to the adhesive via the intermediate members, i.e., onto all of the desired portions at the same time perpendicularly to the adhering surfaces. This successfully reduces the curing time of the adhesive and thereby enhances productivity.

(3) Forces ascribable to shrinkage or residual stresses act in the same amount in the direction in which they cancel each other. This further enhances the accurate mounting of the heads as well as high yield, and in addition prevents the fixing force from decreasing after production more positively.

(4) When temperature around the adhered portions rises after the mounting of the heads, the adhered portions are prevented from peeling off. The heads can therefore be used over a long period of time.

(5) With the intermediate members intervening between the head and the head holder, the embodiments each should only control the adhesive provided between the adhering surfaces of the head and the adhering surfaces of the intermediate members and the adhesive respectively provided between the adhering surfaces of the head holder and the adhering surfaces of the members to a constant minimum necessary thickness. This successfully prevents the thickness of the adhesive from increasing. In addition, when the head is positioned relative to the head holder via the intermediate members, the thickness of the adhesive is prevented from varying without regard to the position of the head relative to the head holder.

(6) The thickness of the adhesive does not vary. Therefore, when the adhesive layers are subjected to UV radiation under the same conditions in the same direction, they shrink in the same direction, but away from each other, so that the shrinking motions cancel each other. It follows that when the adhesive layers set and fix the head to the head holder, the head is prevented from being displaced and can be accurately mounted to the head holder.

4th Embodiment

Figure 10:
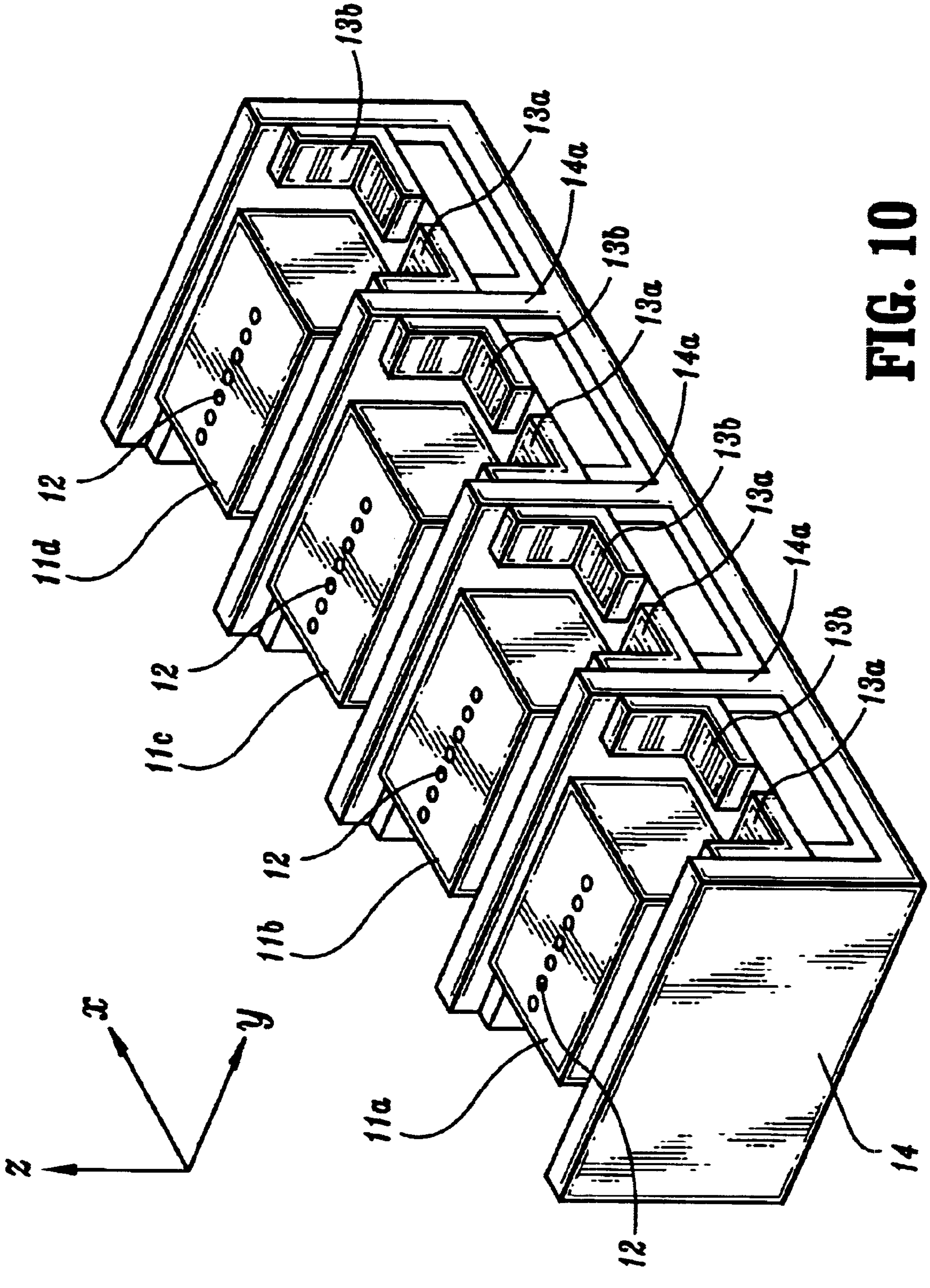
FIG. 10 is a perspective view showing an ink jet head assembly representative of a first embodiment of the present invention.
Figure 11:
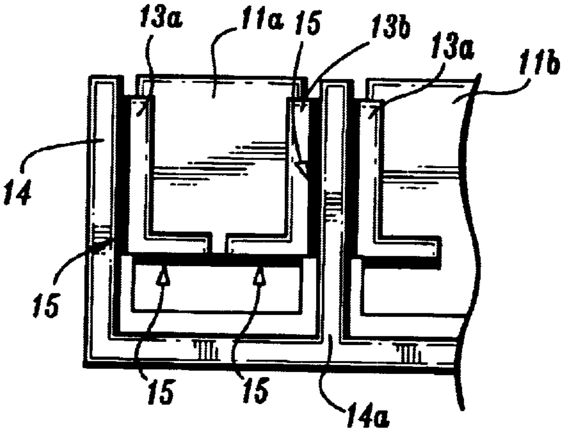
FIG. 11 is a fragmentary front view of the first embodiment.
Figure 12:
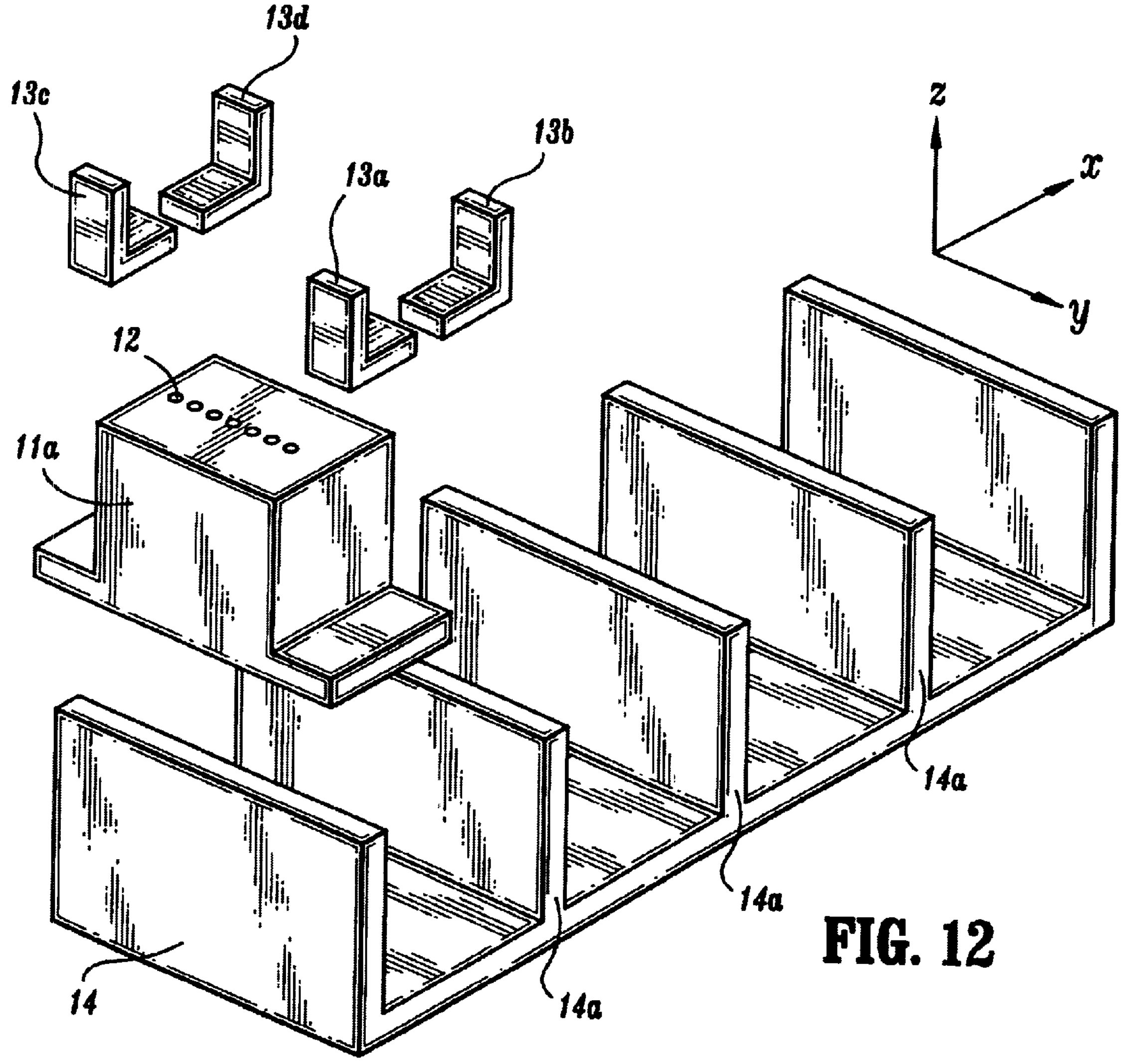
FIG. 12 is a fragmentary exploded view of the first embodiment.
Figure 23:
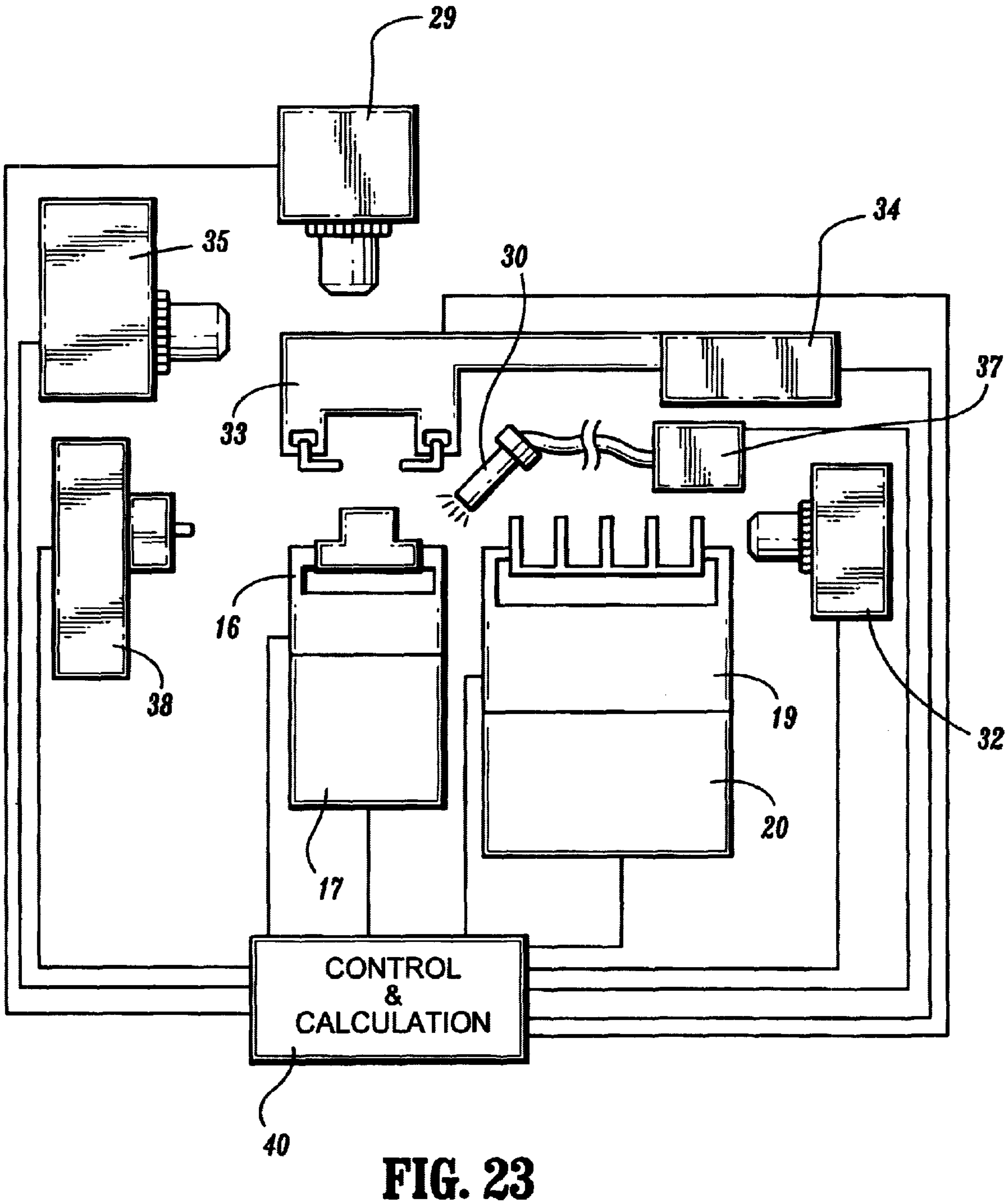
FIG. 23 shows an ink jet head mounting apparatus representative of a fourth embodiment of the present invention.

This embodiment also pertains to a method and an apparatus for producing the ink jet head assembly shown in FIGS. 10–12. As shown in FIG. 23, the apparatus includes a head clamping portion 16, a head position adjusting mechanism 17, a head holder clamping portion 19, and a head holder position adjusting mechanism 20. Referring also to FIG. 13, in the fourth embodiment, the chuck 27 corresponds to the head clamping portion 16 while the six-axis moving mechanism 26 corresponds to the head position adjusting mechanism 17. The portion 16 and mechanism 17 constitute head moving means. Further the chuck 24 and table 22 correspond to the head holder clamping portion 19 and head holder position adjusting mechanism 20, respectively. The portion 19 and mechanism 20 constitute head holder moving means.

The chuck 24 should preferably chuck the head holder 14 with a force greater than stresses ascribable to the shrinkage of the adhesive 15, but smaller than a force which would cause the head holder 14 to deform.

As shown in FIG. 23, a CCD camera 32 is positioned at one side of the chuck 24 in order to shoot the head holder 14. The control and calculation 40 performs calculation with the image of the head holder 14 picked up. The control and calculation 40 causes, based on the result of calculation, the table 22 to move until the head holder 14 reaches a preselected position.

An intermediate member clamping portion 33 is mounted on the board 21 and has a clamp for chucking the intermediate members 13*a*–13*d* one at a time. A intermediate member position adjusting mechanism 34 is constituted by a six-axis moving mechanism and allows the clamping portion 33 to move in the directions X, Y and Z and directions $\alpha$, $\beta$ and $\gamma$. In this embodiment, the clamping portion 33 and adjusting mechanism 34 constitute intermediate member moving means.

A CCD camera 35 is mounted on the board 21 via a fixing member, not shown, in order to shoot the intermediate members 13*a*–13*d*. The control and calculation 40 performs calculation with the image of the intermediate members 13*a*–13*d* picked up and causes, based on the result of calculation, the position adjusting mechanism 34 to move the members 13*a*–13*d*. As a result, the intermediate members 13*a*–13*d* are positioned relative to the head holder 14.

The clamping portion 33 should preferably clamp the intermediate members 13*a*–13*d* with a force which would not cause the members 13*a*–13*d* to deform.

UV rays issuing from a UV ray source 37 are propagated through a light guide 30. The control and calculation 40 controls the light guide 30 and UV ray source 37 such that UV rays illuminate the adhesive 15 for a desired period of time. The light guide 30 and UV ray source 37 constitute curing means.

An adhesive applying portion or applying means 38 is located in the vicinity of the clamping portion 33 and applies the adhesive 15 to the intermediate members 13*a*–13*d* in response to a control signal output from the control and calculation 40. For the application of the adhesive 15, the adjusting mechanism 34 may move the clamping portion 33 such that the intermediate members 13*a*–13*d* approach the applying portion 38 fixed in place, or the applying portion 38 may be moved toward the members 13*a*–13*d* by an exclusive adjusting mechanism not shown. While the adhesive 15 may be applied to the heads 11*a*–11*d* or the head holder 14, the illustrative embodiment is assumed to apply it to the intermediate members 13*a*–13*d*.

The control and calculation 40 controls, in response to data available with the cameras 29, 32 and 35, the six-axis moving mechanism 26, table 22 and position adjusting mechanism 34 such that the heads 11*a*–11*d*, intermediate members 13*a*–13*d* and head holder 14 are brought to the adhering position. The control and calculation 40 constitute first sensing means in combination with the cameras 29, 32 and 35.

After the applying portion 38 has applied the adhesive 15 to the intermediate members 13*a*–13*d*, the heads 11*a*–11*d* and so forth are brought to the adhering position. At this time, the control and calculation 40 causes the clamping portion 33 to release the intermediate members 13*a*–13*d*. In this sense, the control and calculation 40 plays the role of first releasing means at the same time.

Further, the control and calculation 37 activates the UV ray source 37 and then deactivates it on determining that UV rays have been radiated to the adhesive via the light guide 30 for a preselected period of time (until curing completes). In this sense, the control and calculation 37 plays the role of second sensing means at the same time.

In addition, the control and calculation 40 causes the chuck 24 to release the head holder 14 when the radiation of UV rays completes. In this sense, the control and calculation 40 plays the role of second releasing means at the same time.

Figure 24:
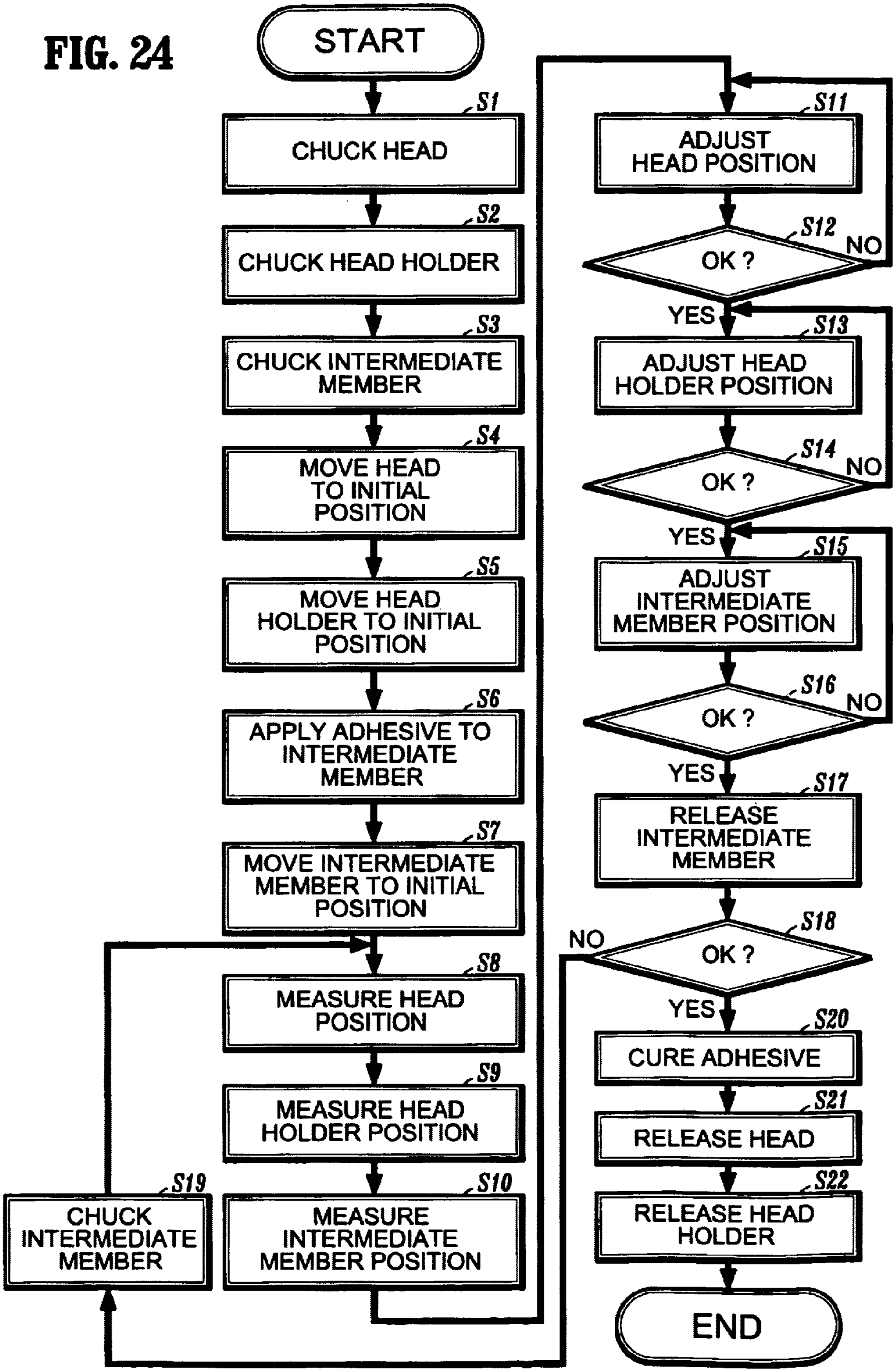
FIG. 24 is a flowchart demonstrating the operation of the fourth embodiment.
Figure 25:
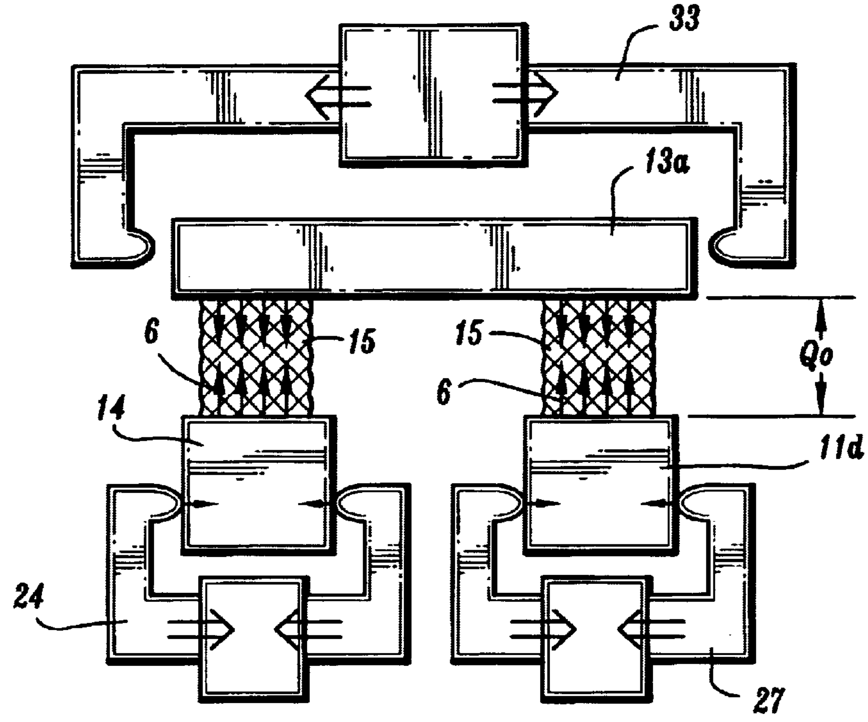
FIG. 25 shows the fourth embodiment in a condition wherein a chuck is released from an intermediate member.
Figure 26:
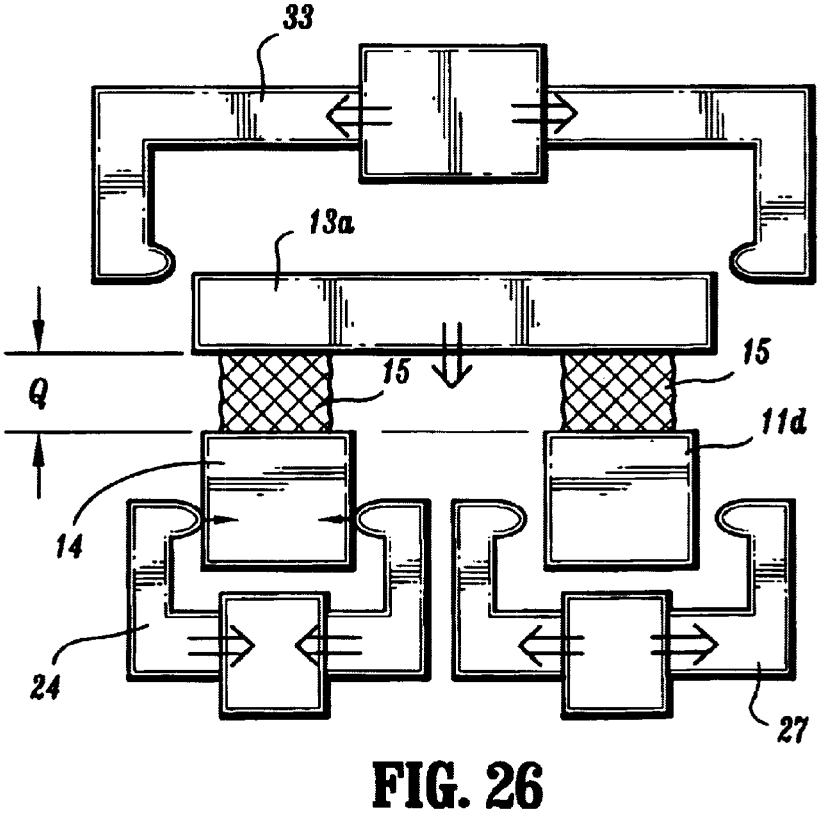
FIG. 26 is a view similar to FIG. 25, showing a condition wherein a chuck is released from an ink jet head.

Reference will be made to FIGS. 24–26 for describing how the head assembly of the illustrative embodiment is produced. First, the chucks 27 and 24 respectively chuck the head 11*d* and head holder 14 while the clamping portion 33 clamps the intermediate members 13*a*–13*d* (steps S1–S3).

Then, the table 22 and six-axis moving mechanism 26 are driven to respectively move the head 11*d* and head holder 14 to the initial position for adhesion (steps S4 and S5).

Subsequently, the position adjusting mechanism 34 is moved to the applying portion 38 in order to apply the adhesive to the intermediate members 13*a*–13*d* to a preselected thickness (step S6). At this instant, the thickness of the adhesive 15 is monitored via the camera 29.

Thereafter, the clamping portion 33 chucks the intermediate members 13*a*–13*d* and moves them to the initial position for adhesion (step S7). The positions of the head 11*d*, head holder 14 and intermediate members 13*a*–13*d* are respectively shot by the cameras 29, 32 and 35 in order to measure their positions (step S8–S10). Specifically, while the camera 29 shoots the ejection ports 12 of the head 11*d*, the control and calculation 40 calculates the center of gravity of the image of the ports 12 and thereby determines the position of the head 11*d* in the directions X and Y. As for the direction Z, the control and calculation 40 determines the position of the head 11*d* on the basis of data output from an autofocus device, not shown, built in the camera 29 and relating to the amount of defocus in the direction Z.

The camera 32 shoots the reference position of the head holder 14 while the control and calculation 40 calculates the center of gravity of the image of the holder 14 and thereby determines the position of the holder 14 in the directions X and Y. As for the direction Z, the control and calculation 40 determines the position of the holder 14 on the basis of data output from an autofocus device, not shown, built in the camera 32 and relating to the amount of defocus in the direction Z. Further, the camera 35 shoots the reference position of the intermediate members 13*a*–13*d* while the control and calculation 40 calculates the center of gravity of the image of the members 13*a*–13*d* and thereby determines the position of the members 13*a*–13*d* in the directions X and Y. Again, as for the direction Z, the control and calculation 40 determines the position of the intermediate members 13*a*–13*d* on the basis of data output from an autofocus device, not shown, built in the camera 35 and relating to the amount of defocus in the direction Z.

The control and calculation 40 calculates the distances of the head 11*d*, head holder 14 and intermediate members 13*a*–13*d* to the respective target positions on the basis of the results of the above measurement. Then, the control and calculation 40 causes the six-axis moving mechanism 26 to move the head 11*d* to its target position, causes the table 22 to move the head holder 14 to its target position, and causes the adjusting mechanism 34 to move the intermediate members 13*a*–13*d* to their target position. As a result, the head 11*d*, head holder 14 and intermediate members 13*a*–13*d* are adjusted in position (steps S11, S13 and S15). When all these components are fully adjusted in position (YES, steps S12, S14 and S16), the control and calculation 40 causes the clamping portion 33 to release the intermediate members 13*a*–13*d* (step S17), as shown in FIG. 25.

Assume that the intermediate members 13*a*–13*d* released from the clamping portion 33 are displaced out of an allowable range, as determined via the camera 35 (NO, step S18). Then, the control and calculation 40 causes the clamping portion 33 to again chuck the intermediate members 13*a*–13*d* (step S19) and repeats the step S8 and successive steps. If the answer of the step S18 is YES, the control and calculation 40 causes the UV ray source 37 to radiate UV rays toward the adhesive 15 via the light guide 36, thereby causing the adhesive 15 to start setting (step S20). As a result, stresses a are generated in the adhesive 15, head 11, head holder 14 and intermediate members 13*a*–13*d*, as indicated by arrows in FIG. 25. The stresses a displace the intermediate members 13*a*–13*d* in the direction of shrinkage of the adhesive 15 because the members 13*a*–13*d* are free from restriction ascribable to external forces. Such a behavior of the intermediate members 13*a*–13*d* continues until the adhesive 15 fully sets.

When the adhesive 15 is fully cured, the control and calculation 40 causes the chuck 27 to release the head 11*d* (step S21), as shown in FIG. 26. It follows that the above stresses a are scarcely left in the head 11*d*, head holder 14 and intermediate members 13*a*–13*d* because the members 13*a*–13*d* are free from restriction. Therefore, even when the head 11*d* is unclamped after the setting of the adhesive 15, the positional relation between the head 11*d* and the head holder 14 remains the same as before adhesion. It is to be noted that the positional relation between the intermediate members 13*a*–13*d* and the head 11*d* and head holder 14 varies from $Q_0$ shown in FIG. 25 to Q shown in FIG. 26.

Subsequently, the control and calculation 40 causes the chuck 24 to release the head holder 14 (step S22) and then interrupts the mounting operation. The control and calculation 40 moves the table 22 in the direction X and causes the chuck 27 to chuck the next head 11*c* and mount it to the head holder 14 via other intermediate members 13*a*–13*d* in the same manner. The control and calculation 40 repeats the above procedure to sequentially mount the other heads 11*b* and 11*a* to the head holder 14 via other intermediate members 13*a*–13*d*.

As stated above, the illustrative embodiment releases the intermediate members 13*a*–13*d* while the cure of the adhesive 15 is under way, thereby rendering them free from restriction. This obviates an occurrence that the intermediate members 13*a*–13*d* move due to the stresses a ascribable to the shrinkage of the adhesive 15 and obstruct the shrinkage. Therefore, the stresses $\alpha$ are prevented from remaining in the adhesive, heads 11–11*d*, intermediate members 13*a*–13*d* and head holder 14. It follows that when the heads 11*a*–11*d* each is released after the cure of the adhesive 15, the relation between it and the head holder 14 remains the same as before adhesion. With this embodiment, therefore, it is possible to mount the heads 11*a*–11*d* with accuracy, to prevent the yield from being lowered due to the short accuracy of the adhered portions, and to prevent the force fixing the heads 11*a*–11*d* in place from decreasing after production.

Further, because the adhesive 15 is UV ray curable and because the intermediate members 13*a*–13*d* are transparent for UV rays, UV rays can be radiated to the adhesive 15 via the members 13*a*–13*d*, i.e., onto all of the desired portions at the same time perpendicularly to the adhering surfaces. This successfully reduces the curing time of the adhesive 15 and thereby enhances productivity.

If importance is not attached to the curing time of the adhesive 15, the intermediate members 13*a*–13*d* may be formed of a material opaque to UV rays. However, the material transparent for UV rays is desirable because the material opaque for UV rays require UV rays to be radiated via the gaps between the objects. Another advantage achievable with such a material is that it facilitates control over the heads 11*a*–11*d* against shrinkage and control over the displacement of the heads 11*a*–11*d* after fixation.

While the above embodiment applies the adhesive 15 to the intermediate members 13*a*–13*d*, the adhesive 15 may be applied to the head holder 14 and heads 11*a*–11*d* beforehand. In addition, the application of the adhesive 15 may be effected after the heads 11*a*–11*d*, intermediate members 13*a*–13*d* and head holder 14 have been moved to the preselected position.

It is to be noted that the various modifications relating to the first embodiment are applicable to the second embodiment also.

5th Embodiment

Figure 27:
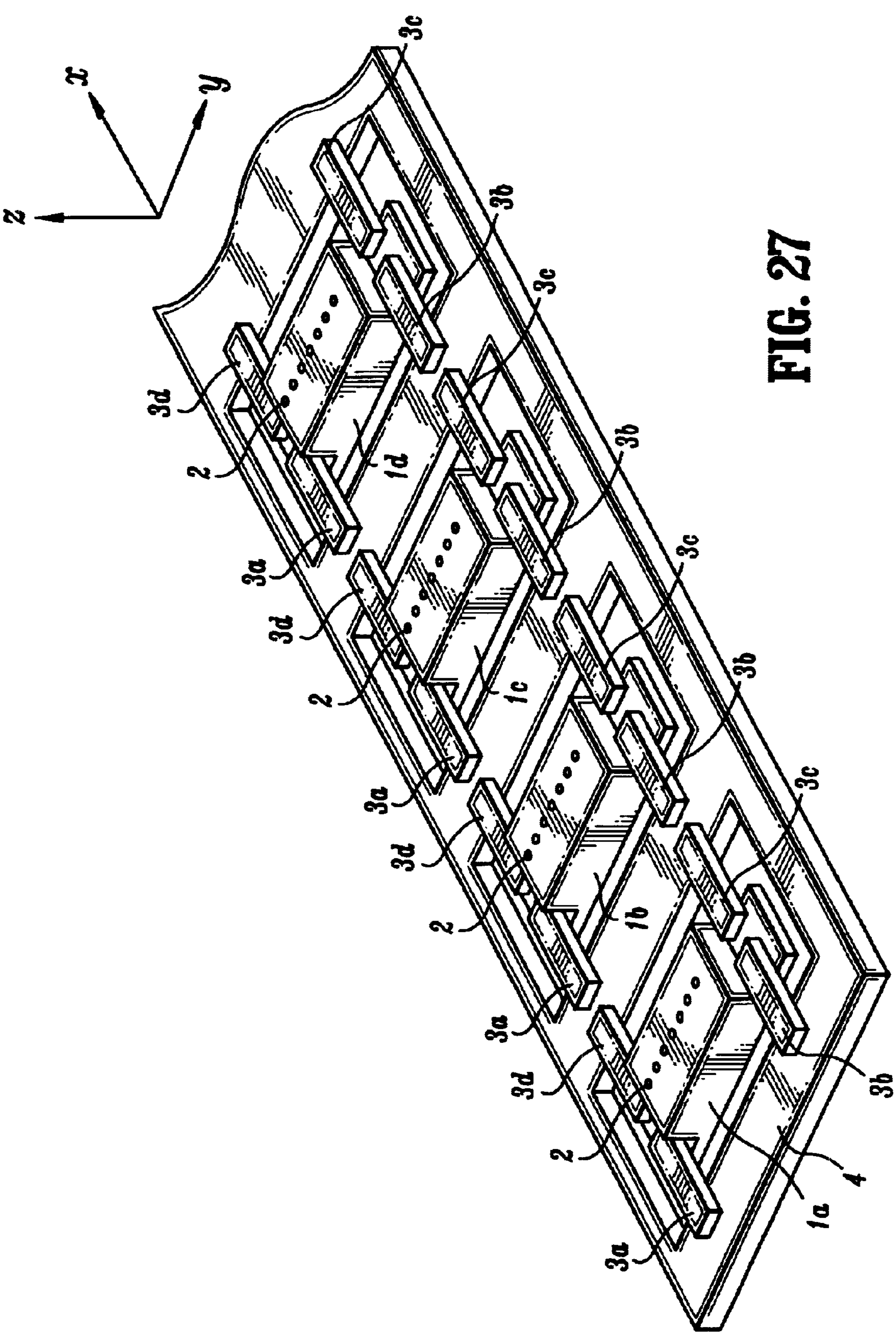
FIG. 27 shows a fifth embodiment of the present invention.
Figure 28:
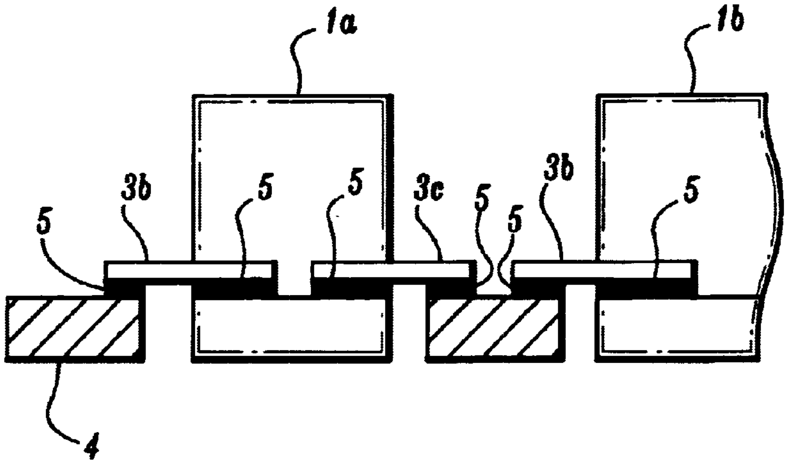
FIG. 28 is a fragmentary front view of the fifth embodiment.
Figure 29:
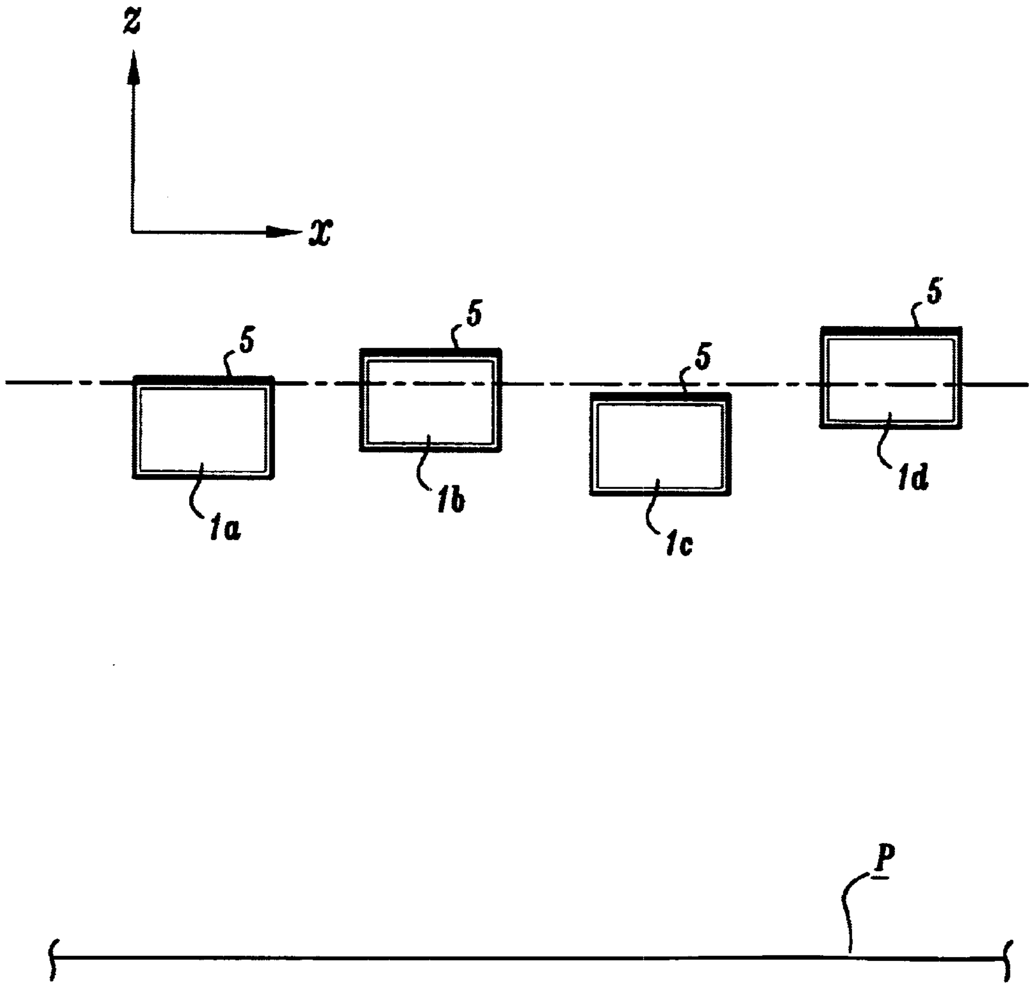
FIG. 29 shows ink jet head included in the fifth embodiment and deviated from a reference position.

FIGS. 27–29 show a fifth embodiment of the present invention. As shown in FIGS. 27 and 28, decahedral heads 1*a*–1*d* are respectively filled with cyan ink, magenta ink, yellow ink, and black ink. The heads 1*a*–1*d* each ejects ink drops via a plurality of ejection ports 2. The heads 1*a*–1*d* each is mounted on a head holder 4 via four intermediate members 3*a*–3*d*. The intermediate members 3*a*–3*d* are fixed to the heads 1*a*–1*d* by UV ray curable adhesive 5 and also fixed to the head holder 4 by the adhesive 5. The intermediate members 3*a*–3*d* are formed of a material transparent for UV rays. The heads 1*a*–1*d* are arranged in an array in the main scanning direction X perpendicular to the subscanning direction Y in which the paper P (see FIG. 29) is conveyed.

In this embodiment, too, the heads 1*a*–1*d*, intermediate members 3*a*–3*d* and head holder 4 are constructed into a four-head unit. The four-head unit is mounted on a printer body which is mounted on a facsimile apparatus, copier or similar machine. The four-head unit is movable in the main scanning direction X.

The interfaces of the intermediate members 3*a*–3*d* to which the adhesive 5 is applied is included in a scanning plane X-Y defined by the main scanning direction X and subscanning direction Y of the four-head unit. Alternatively, the above interfaces may lie a plane parallel to the scanning plane X-Y.

The principle of control over the ejection of ink drops particular to this embodiment is as follows. In a printer, the four-head unit is moved in the direction X while ink drops are ejected from the heads 1*a*–1*d*. At the same time, the paper P is moved in the direction Y. As a result, an image can be formed over the entire paper P. When the relative position between the heads 1*a*–1*d* is deviated due to the shrinkage of the adhesive 5, lines printed on the paper P by the ink drops ejected from the heads 1*a*–1*d* are deviated from a preselected position, lowering printing accuracy.

The adhesion interfaces of the intermediate members 3*a*–3*d* are included in the scanning plane X-Y of the four-head unit, as stated above. Therefore, as shown in FIG. 29, the positional deviation or displacement of the heads 1*a*–1*d* ascribable to the shrinkage of the adhesive 5 is limited to the plane perpendicular to the scanning plane X-Y. Why the embodiment limits the deviation to the scanning plane X-Y is as follows. The distance which an ink drop flies from any one of the heads 1*a*–1*d* varies in accordance with the shrinkage of the adhesive 5 on a line connecting the ejection point (port 2) and the hitting point (paper P). In addition, the hitting points of the ink drops ejected from the four-head unit are preselected on the basis of the interval between the start of movement of the four-head unit and the ejection of ink drops. Under these conditions, if the deviations of the hitting points of ink drops ejected from the heads 1*a*–1*d* when the four-head unit is moved at a preselected rate are measured beforehand, and if the ejection timing of the individual head is selected on the basis of the measured deviations and moving rate, then the four-head unit can be electrically controlled such that the ink drops from the heads 1*a*–1*d* each reaches a preselected position.

Specifically, as shown in FIG. 29, assume that the head 1*a* is held in a preselected reference position with respect to the distance between the ejection ports 2 and the paper P. Then, the ejection timing is delayed for the head 1*c* whose distance is short or advanced for the heads 1*b* and 1*d* whose distances are excessive. With this control, it is possible to cause the ink drops from the heads 1*a*–1*d* to hit expected positions.

As stated above, the adhesion interfaces of the intermediate members 3*a*–3*d* are included in the scanning plane X-Y of the four-head unit, so that the displacements of the heads 1*a*–1*d* ascribable to the shrinkage of the adhesive 5 can be corrected by electrical control. The embodiment therefore maintains the ink ejection positions, which is the final required characteristic, accurate and prevents the yield from decreasing.

If desired, the four-head unit may be replaced with a three-head unit loaded with cyan ink, magenta ink and yellow ink, or a two-head unit loaded with only two of cyan ink, magenta ink and yellow ink. That is, the illustrative embodiment is practicable so long as the head unit has two or more heads.

6th Embodiment

This embodiment pertains to control over the ejection of ink drops from the ink jet head unit described with reference to FIGS. 10–12. As shown in FIGS. 10–12, the heads 11*a*–11*d* are arranged in an array in the main scanning direction X perpendicular to the subscanning direction Y in which a paper is conveyed. The interfaces of the intermediate members 13*a*–13*d* to which the adhesive 15 is applied are included in the X-Y plane with respect to one end of the members 13*a*–13*d* and heads 12*a*–11*d* and included in the Z-Y plane substantially perpendicular to the X-Y plane with respect to the other end of the members 13*a*–13*d* and head holder 14. If desired, the Z-Y plane may be replaced with a plane parallel to the Z-Y plane.

The principle of control over the ejection of ink drops particular to this embodiment is as follows. In a printer, the four-head unit is moved in the direction X while ink drops are ejected from the heads 11*a*–11*d*. At the same time, the paper is moved in the direction Y. As a result, an image can be formed over the entire paper. When the relative position between the heads 11*a*–11*d* is deviated due to the shrinkage of the adhesive 5, lines printed on the paper by the ink drops ejected from the heads 11*a*–11*d* are deviated from a preselected position, lowering printing accuracy.

Figure 30:
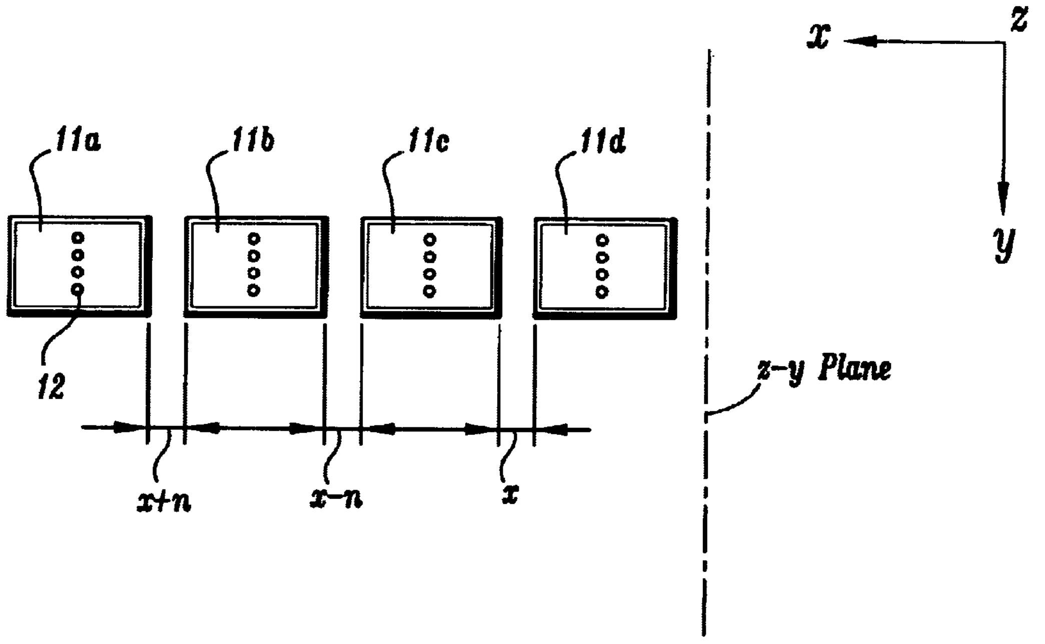
FIG. 30 shows the positional deviation of ink jet heads included in an ink jet head assembly representative of a sixth embodiment of the present invention.

The interfaces of the intermediate members 13*a*–13*d* to which the adhesive 15 is applied are included in the X-Y plane with respect to one end of the members 13*a*–13*d* and heads 12*a*–11*d* and included in the Z-Y plane substantially perpendicular to the X-Y plane with respect to the other end of the members 13*a*–13*d* and head holder 14, as stated above. Therefore, the displacement of the heads 11*a*–11*d* ascribable to the shrinkage of the adhesive 15 occurs not only in the plane perpendicular to the scanning plane X-Y, as shown in FIG. 29, but also in the main scanning direction X, as shown in FIG. 30. In the specific condition shown in FIG. 30, the distance x-n between the heads 11*a* and 11*b* and the distance x-n between the head 11*b* and 11*c* are deviated from a preselected distance or pitch x.

Why the embodiment limits the displacement to the above two planes is as follows. Assume that relative position between the heads 11*a*–11*d* is deviated in the main scanning direction X due to the shrinkage of the adhesive 15. Then, if the interval between the start of movement of the individual head and the ejection of an ink drop from the head is corrected by electrical control on the basis of the deviation, the ink drop can hit a preselected position.

Figure 31:
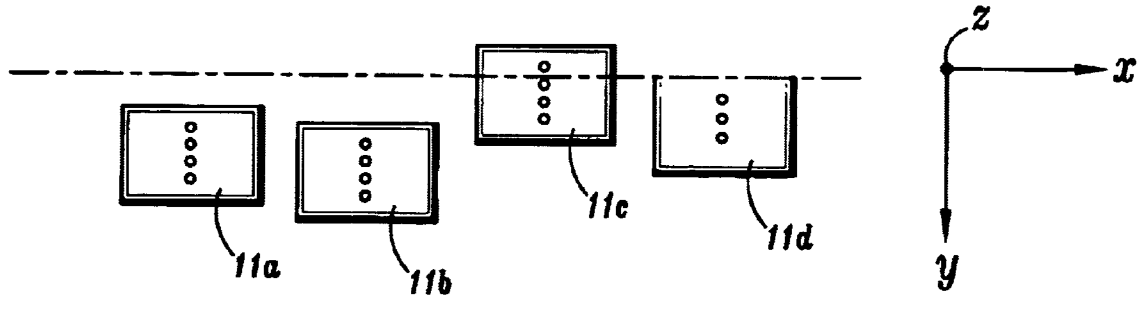
FIG. 31 shows the positional deviation of ink jet heads which prevents ejection control from being executed.

By contrast, assume that the adhesion interfaces of the intermediate members 13*a*–13*d* are included in the Z-X plane substantially perpendicular to the subscanning direction Y with respect to the scanning plane X-Y. Then, as shown in FIG. 31, the displacement of the heads 11*a*–11*d* due to the shrinkage of the adhesive 15 occurs in the subscanning direction Y. In this case, because ink drops to be ejected from the individual head are determined by the positions of the ejection ports 12 designated by an image signal, the positions of the ports 12 for ejecting ink drops are deviated themselves due to the deviation of the head in the subscanning direction Y, despite the electrical control over the timings. The resulting lines printed on the paper are deviated in the subscanning direction.

The illustrative embodiment delays, as in the specific case shown in FIG. 29, the ejection timing of the head 11*c* whose distance is short or advances the ejection timings of the heads 11*b* and 11*d* whose distances are excessive. In addition, this embodiment matches the ejection timings of the heads 11*a*–11*d* such that when the heads 11*a*–11*d* are moved in the main scanning direction X at a preselected rate, ink drops are ejected at a preselected reference position.

As stated above, the adhesion interfaces of the intermediate members 13*a*–13*d* are included in the scanning plane of the four-head unit and in the Z-Y plane substantially perpendicular to the main scanning direction X, so that the displacement of the heads 11*a*–11*d* in two directions and ascribable to the shrinkage of the adhesive 5 can be corrected by electrical control. The embodiment therefore maintains the ink ejection positions, which is the final required characteristic, accurate and prevents the yield from decreasing.

Figure 14:
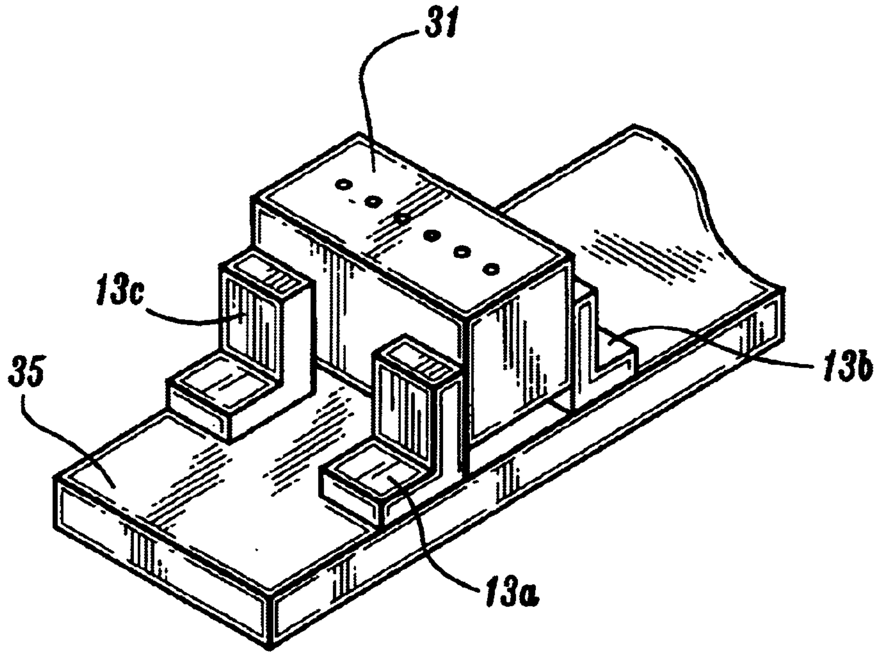
FIGS. 14–17 are perspective views showing modifications of the first embodiment.

If desired, the decahedral heads 11*a*–11*d* may be replaced with the cubic heads 31 and 32 shown in FIGS. 14 and 15.

7th Embodiment

This embodiment pertains to the ink jet head unit shown in FIGS. 18–20 and control over the ejection of ink drops therefrom. As shown in FIGS. 18–20, the adhering surface or interface 53*b* of the intermediate member 53 is included in the scanning plane X-Y of the four-head unit defined by the main scanning direction X and subscanning direction Y. The other adhering surface or interface 53*a* is included in the Z-Y plane substantially perpendicular to the main scanning direction X. With this configuration, it is also possible to control the ejection of ink drops in the same manner as in the above embodiment. Again, the intermediate member 53 may be replaced with the two intermediate members 61 and 62 shown in FIG. 20.

As described above, the fifth to seventh embodiments have the following advantages.

(1) The adhesion interfaces of intermediate members are included in the scanning plane of a four-head unit, so that the displacement of heads ascribable to the shrinkage of adhesive can be corrected by electrical control. This maintains the ink ejection positions, which is the final required characteristic, accurate and prevents the yield from decreasing.

(2) The adhesion interfaces of the intermediate members are included in the scanning plane of the four-head unit and in a plane substantially perpendicular to the main scanning direction with respect to the scanning plane, so that the displacement of the heads in two directions and ascribable to the shrinkage of the adhesive can be corrected by electrical control. This is also successful to maintain the ink ejection positions accurate and to prevent the yield from decreasing.

(3) Even when the relative position between the heads is deviated, the ink ejection positions are maintained accurate, and the yield is prevented from decreasing.

8th Embodiment

Figure 32:
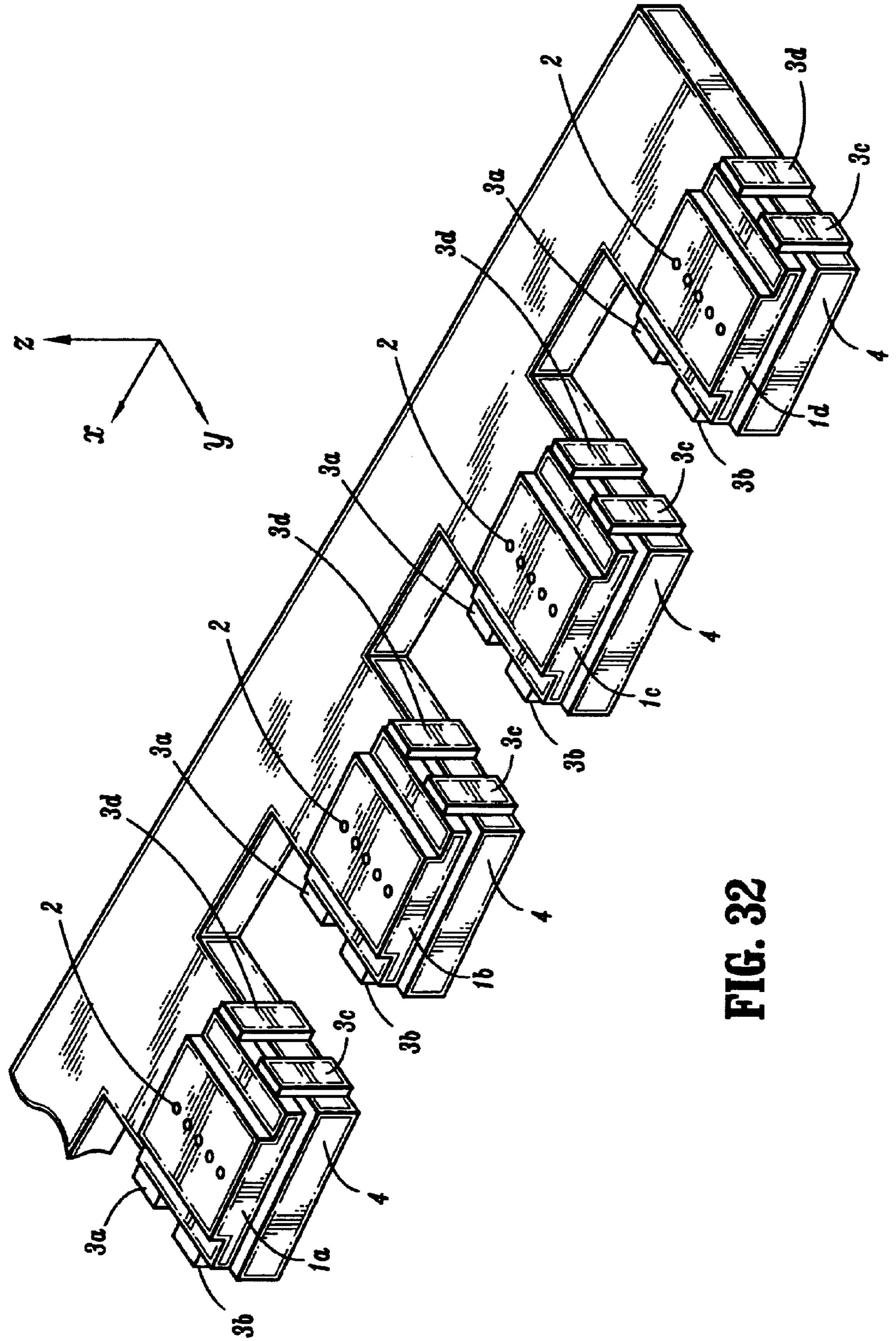
FIG. 32 shows an eighth embodiment of the present invention.
Figure 33:
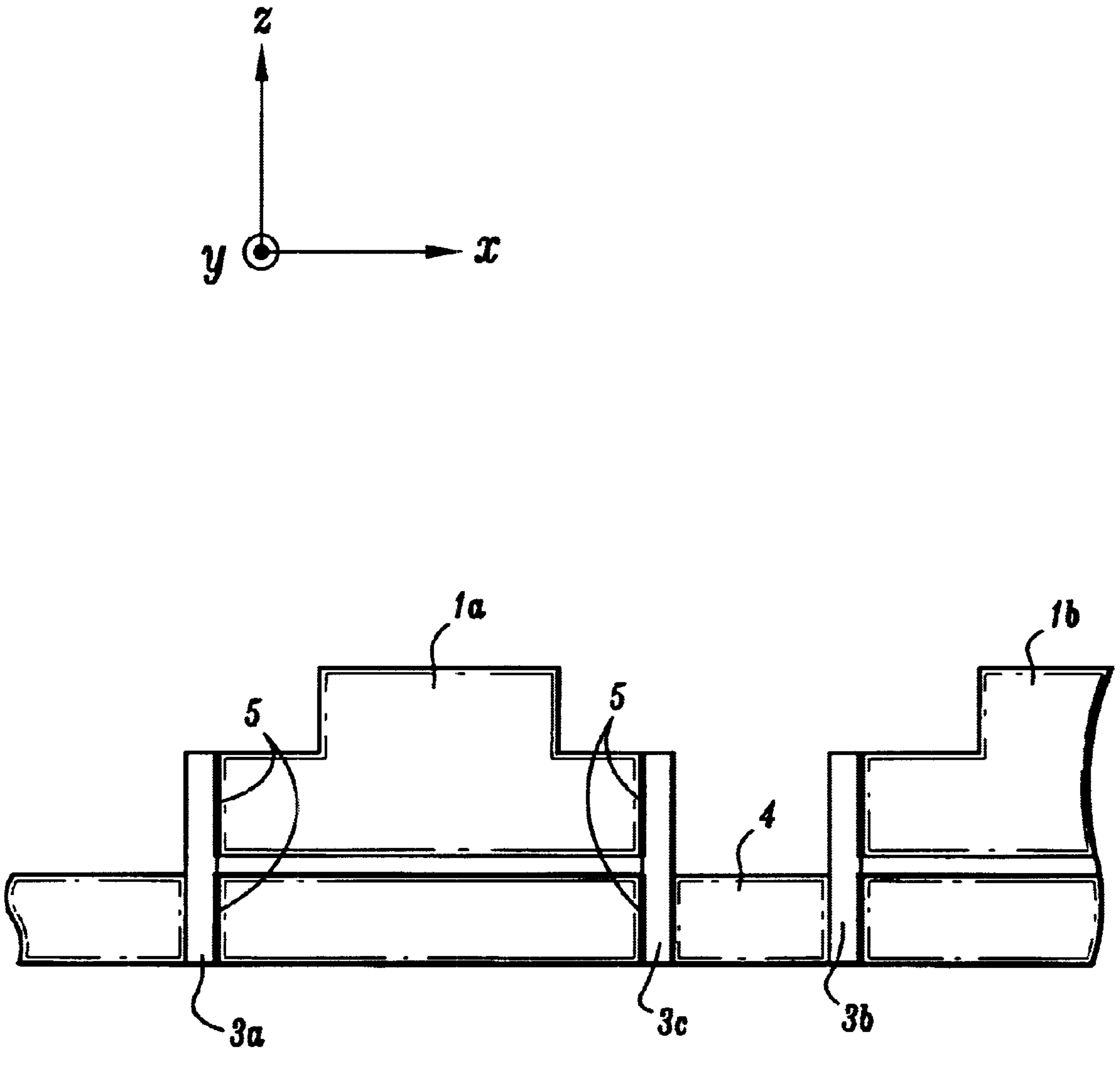
FIG. 33 is a fragmentary plan view of the eighth embodiment.
Figure 34:
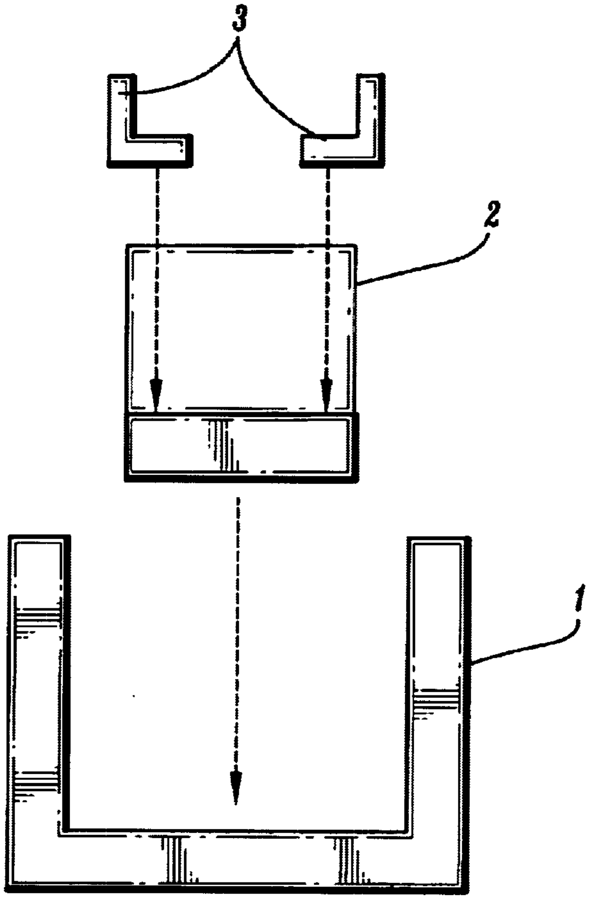
FIG. 34 is an exploded view showing an eleventh embodiment of the present invention.
Figure 35:
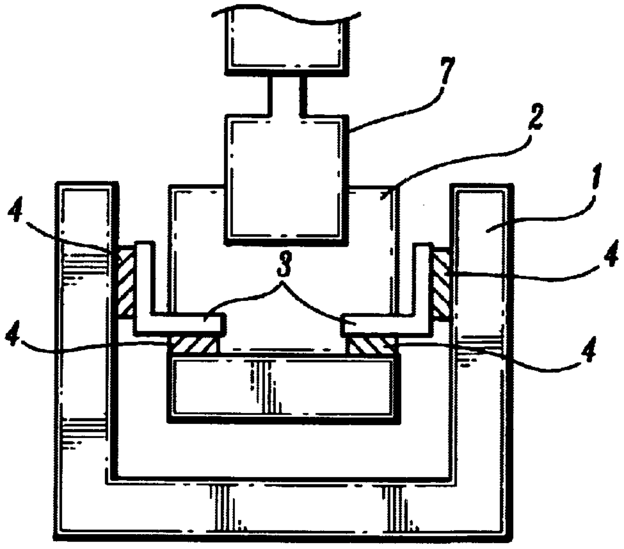
FIG. 35 is a front view of the eleventh embodiment.
Figure 36:
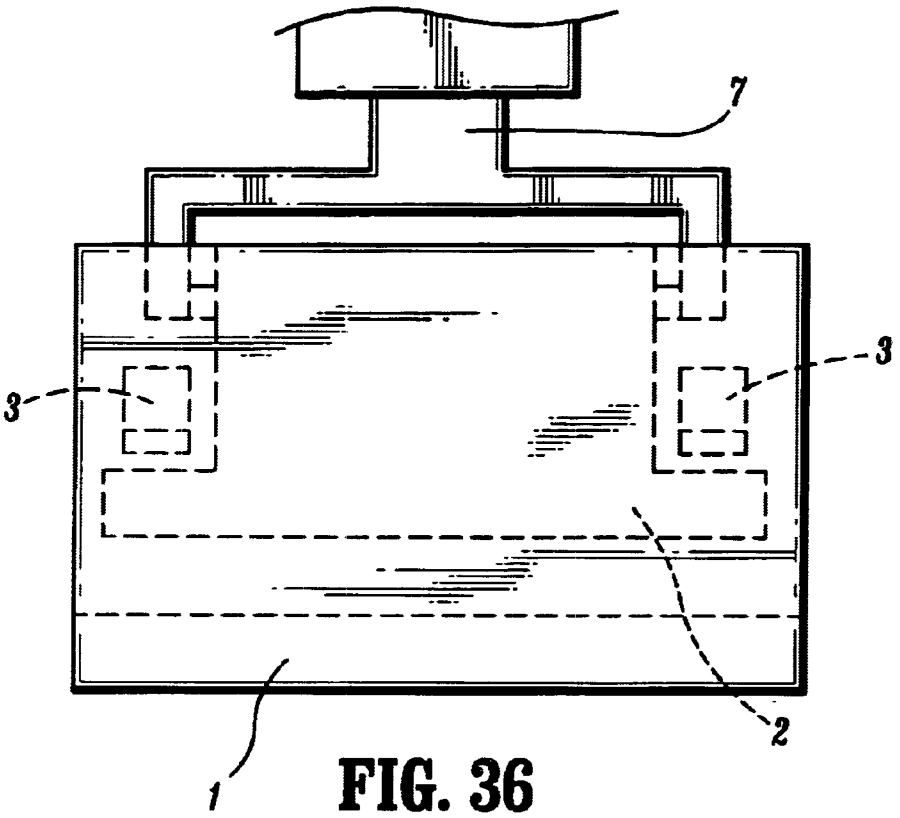
FIG. 36 is a side elevation of the eleventh embodiment.
Figure 37:
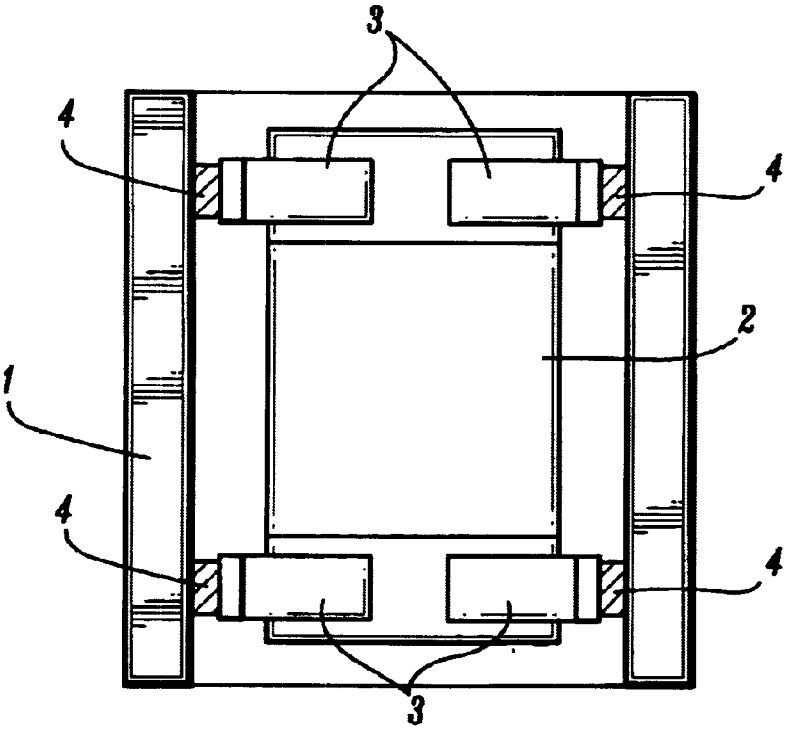
FIG. 37 is a front view of the eleventh embodiment.

Referring to FIGS. 32 and 33, an eighth embodiment of the present invention will be described. As shown, the decahedral ink jet heads 1*a*–1*d* are respectively filled with cyan ink, magenta ink, yellow ink, and black ink. The heads 1*a*–1*d* each ejects ink drops via a plurality of ejection ports 2. The heads 1*a*–1*d* are arranged in an array in the main scanning direction X perpendicular to the subscanning direction Y in which a paper, not shown, is conveyed.

The heads 1*a*–1*d* each is mounted on the head holder 4 via the four intermediate members 3*a*–3*d*. The intermediate members 3*a*–3*d* are fixed to the heads 1*a*–1*d* by the UV ray curable adhesive 15 and also fixed to the head holder 4 by the adhesive 15. The intermediate members 3*a*–3*d* are formed of a material transparent for UV rays.

The heads 1*a*–1*d*, intermediate members 3*a*–3*d* and head holder 4 are constructed into a four-head unit. The four-head unit is mounted on a printer body which is mounted on a facsimile apparatus, copier or similar machine. The four-head unit is movable in the main scanning direction X.

The interfaces of the intermediate members 3*a*–3*d* to which the adhesive 5 is applied are included in a plane Z-Y substantially perpendicular to the main scanning direction X with respect to the scanning plane of the four-head unit. If desired, the plane Z-Y may be replaced with a plane parallel to the plane Z-Y.

The principle of control over the ejection of ink drops particular to this embodiment is as follows. In a printer, the four-head unit is moved in the direction X while ink drops are ejected from the heads 1a–1d. At the same time, a paper is moved in the direction Y. As a result, an image can be formed over the entire paper. When the relative position between the heads 1a–1d is deviated due to the shrinkage of the adhesive 5, lines printed on the paper by the ink drops ejected from the heads 1a–1d are deviated from a preselected position, lowering printing accuracy.

The adhesion interfaces of the intermediate members 3a–3d are included in the plane Z-Y substantially perpendicular to the main direction X with respect to the scanning plane X-Y of the four-head unit, as stated above. Therefore, as shown in FIG. 30, the positional deviation or displacement of the heads 1a–1d ascribable to the shrinkage of the adhesive 5 is limited to the the main scanning direction X. In the specific condition shown in FIG. 30, the distance x-n between the heads 1a and 1b and the distance x-n between the heads 1b and 1c are deviated from a preselected distance or pitch x.

Why the embodiment limits the displacement to the above plane is as follows. Assume that relative position between the heads 1a–1d is deviated in the main scanning direction X due to the shrinkage of the adhesive 15. Then, if the interval between the start of movement of the individual head and the ejection of an ink drop from the head is corrected by electrical control on the basis of the deviation, the ink drop can hit a preselected position.

By contrast, assume that the adhesion interfaces of the intermediate members 13a–13d are included in the Z-X plane substantially perpendicular to the main scanning direction X. Then, as shown in FIG. 31, the displacement of the heads 1a–1d due to the shrinkage of the adhesive 5 occurs in the subscanning direction Y. In this case, because ink drops to be ejected from the individual head are determined by the positions of the ejection ports 2 designated by an image signal, the positions of the ports 2 for ejecting ink drops are deviated themselves due to the deviation of the head in the subscanning direction Y, despite the electrical control over the timings. The resulting lines printed on the paper are deviated in the subscanning direction.

The illustrative embodiment matches the ejection timings of the heads 1a–1d such that when the heads 1a–1d are moved in the main scanning direction X at a preselected rate, ink drops are ejected at a preselected reference position.

As stated above, the adhesion interfaces of the intermediate members 3a–3d are included in the Z-Y plane substantially perpendicular to the main scanning direction X with respect to the scanning plane X-Y of the heads 1a–1d, so that the displacement of the heads 1a–1d ascribable to the shrinkage of the adhesive 5 can be corrected by electrical control. The embodiment therefore maintains the ink ejection positions, which is the final required characteristic, accurate and prevents the yield from decreasing.

If desired, the four-head unit may be replaced with a three-head unit loaded with cyan ink, magenta ink and yellow ink, or a two-head unit loaded with only two of cyan ink, magenta ink and yellow ink. That is, the illustrative embodiment is practicable so long as the head unit has two or more heads.

9th Embodiment

This embodiment pertains to the ink jet head unit shown in FIGS. 10–12 and control over the ejection of ink drops therefrom. As shown in FIGS. 10–12, the heads 11a–11d are arranged in an array in the main scanning direction X perpendicular to the subscanning direction in which a paper is conveyed. In this embodiment, the interfaces of the intermediate members 13a–13d to which the adhesive 5 is applied are included in the scanning plane X-Y defined by the main scanning direction X and subscanning direction Y of the four-head unit with respect to one end of the members 13a–13d and the heads 11a–11d and included in the plane Z-Y substantially perpendicular to the main scanning direction X with respect to the other end of the members 13a–13d and head holder 14. If desired, the plane X-Y may be replaced with a plane parallel to the plane X-Y.

Control to be effected when the interfaces of the intermediate members 13a–13d are included in the scanning plane X-Y is as follows. As shown in FIG. 29, the displacement of the heads 11a–11d in the scanning plane X-Y and ascribable to the shrinkage of the adhesive 15 is limited to the plane perpendicular to the plane X-Y. The distance which an ink drop flies from any one of the heads 1a–1d varies in accordance with the shrinkage of the adhesive 15 on a line connecting the ejection point (port 12) and the hitting point (paper P). In addition, the hitting points of the ink drops ejected from the four-head unit are preselected on the basis of the interval between the start of movement of the four-head unit and the ejection of ink drops. Under these conditions, if the deviations of the hitting points of ink drops ejected from the heads 11a–11d when the four-head unit is moved at a preselected rate are measured beforehand, and if the ejection timing of the individual head is selected on the basis of the measured deviations and scanning rate, then the four-head unit can be electrically controlled such that the ink drops from the heads 1a–1d each reaches a preselected position.

Specifically, as shown in FIG. 29, assume that the head 11a is held in a preselected reference position with respect to the distance between the ejection ports 12 and the paper P. Then, the ejection timing is delayed for the head 11c whose distance is short or advanced for the heads 11b and 11d whose distances are excessive. This control, when combined with the control described in relation to the eighth embodiment, causes the ink drops from the heads 11a–11d to hit expected positions.

As stated above, the adhesion interfaces of the intermediate members 13a–13d are included in the main scanning plane X-Y of the four-head unit and included in the plane Z-Y substantially perpendicular to the main scanning direction X, so that the displacement of the heads 11a–11d ascribable to the shrinkage of the adhesive 15 can be corrected by electrical control. The embodiment therefore maintains the ink ejection positions, which is the final required characteristic, accurate by correcting the displacement of the heads 11a–11d in two directions and prevents the yield from decreasing.

If desired, the decahedral heads 11a–11d may be replaced with the cubic heads 31–32 shown in FIGS. 14–15.

10th Embodiment

This embodiment pertains to the ink jet head unit shown in FIGS. 18–20 and control over the ejection of ink drops therefrom. As shown, the adhering surface or interface 53b of the intermediate member 53 is included in the scanning plane X-Y with respect to the head holder 52. The other adhering surface 53a is included in the plane Z-Y substantially perpendicular to the main scanning direction X with respect to the head 51. With this configuration, it is possible to achieve the advantages described in relation to the above embodiment by executing the same ejection control. Again, the intermediate member 53 may be replaced with the two intermediate members 61 and 62 shown in FIG. 20.

As stated above, the eighth to tenth embodiments achieve the following advantages.

(1) The adhesion interfaces of intermediate members are included in a plane perpendicular to the main scanning direction with respect to the scanning plane of ink jet heads, so that the displacement of the heads ascribable to the shrinkage of adhesive can be corrected by electrical control. This maintains the ink ejection positions, which is the final required characteristic, accurate and prevents the yield from decreasing.

(2) The adhesion interfaces of the intermediate members are included in the plane substantially perpendicular to the main scanning direction with respect to the scanning plane of the heads and in the scanning plane, so that the displacement of the heads in two directions and ascribable to the shrinkage of the adhesive can be corrected by electrical control. This is also successful to maintain the ink ejection positions accurate and to prevent the yield from decreasing.

(3) Even when the relative position between the heads is deviated, the ink ejection positions is maintained accurate, and the yield is prevented from decreasing.

11th Embodiment

Referring to FIGS. 34–37, an eleventh embodiment of the present invention will be described. As shown, the embodiment includes a head holder or frame 1 to be mounted to an ink jet printer, an ink jet head 2, and an intermediate member 3. A UV ray curable adhesive 4 is applied to the adhering surfaces of the intermediate member 3 and head holder 1 and those of the intermediate member 3 and head 2. The intermediate member 3 is held between the head 2 and the head holder 1 by the adhesive 4.

Figure 38:
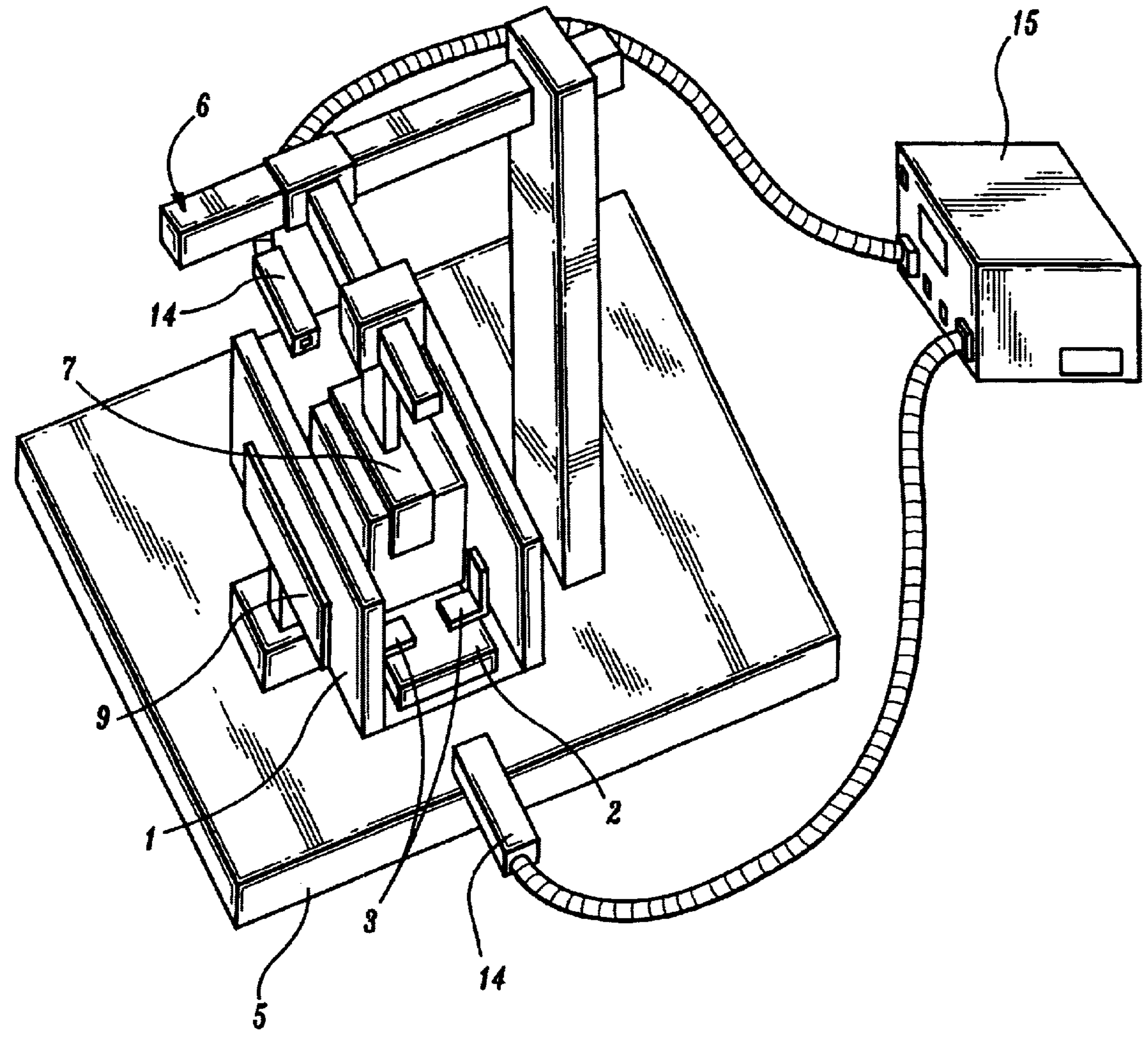
FIG. 38 is a perspective view showing an apparatus for mounting an ink jet head assembly representative of the eleventh embodiment.
Figure 39:
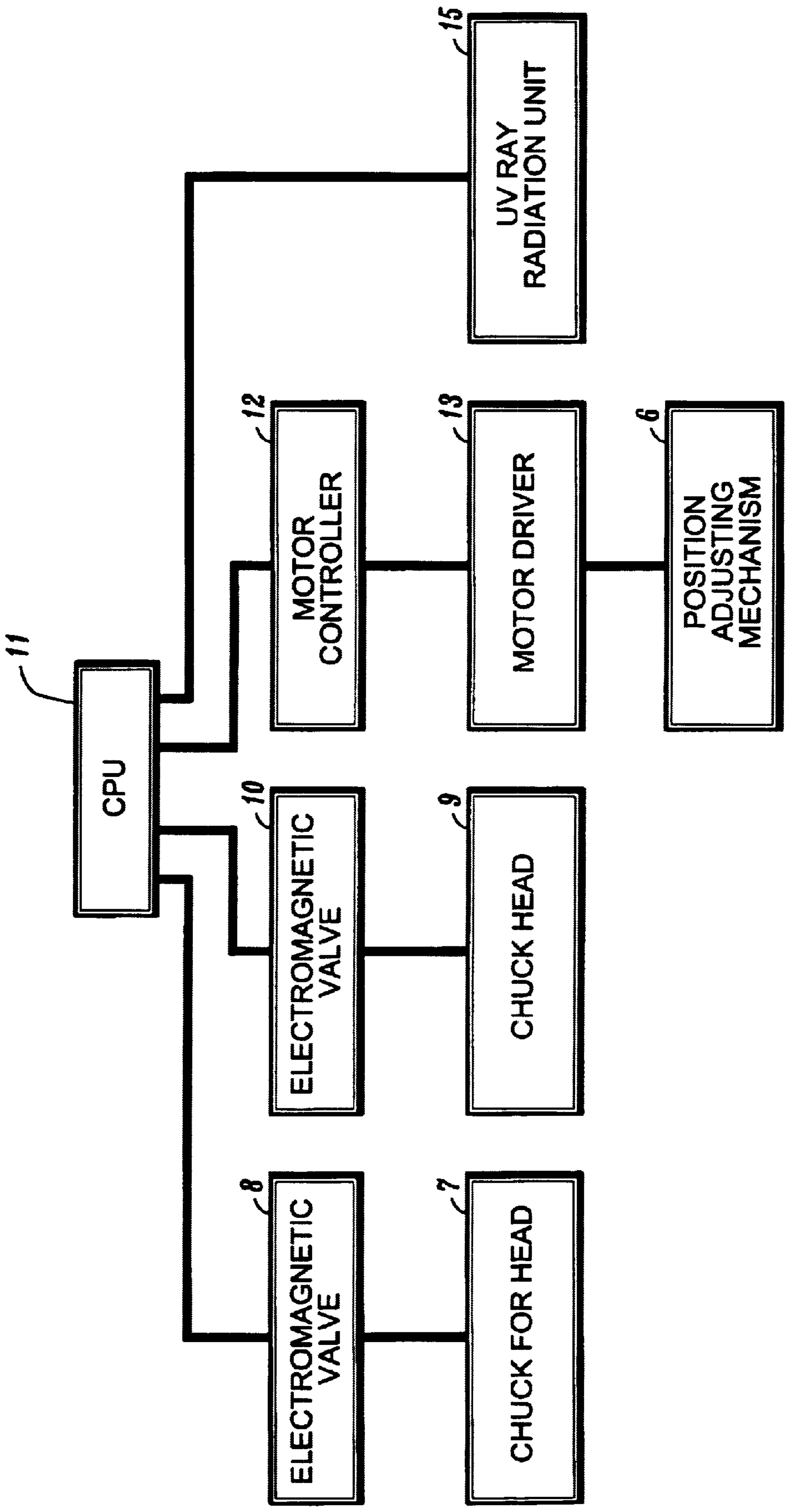
FIG. 39 is a block diagram schematically showing the apparatus of FIG. 38.

FIGS. 38 and 39 show an apparatus for mounting the head 2 to the head holder 1. As shown, the apparatus includes a board 5. A position adjusting mechanism 6 is mounted on the top of the board 4 and includes a robot arm, a motor, and a ball screw. The mechanism 6 is driven by a motor, not shown.

A chuck 7 is mounted on the free end of the position adjusting mechanism 6. The mechanism 6 is movable in directions X, Y and Z and directions α, β and γ about the X, Y and Z axes, respectively, while holding any the head 2 with the chuck 7. The chuck 7 selectively chucks the head 2 or releases it on the basis of the ON/OFF control of an electromagnetic valve 8.

A chuck 9 is also mounted on the board 5 and driven by an electromagnetic valve 10. The chuck 9 selectively chucks the head holder 1 or releases it in accordance with the ON/OFF control of the electromagnetic valve 10.

A CPU (Central Processing Unit) 11 sends command signals to the electromagnetic valves 8 and 10 for controlling them. Also, the CPU 11 sends a command signal to a motor controller 12. In response, the motor controller 12 causes the position adjusting mechanism 6 to move to a preselected target position via a motor driver 13.

A pair of light guides 14 are positioned in the vicinity of the chuck 9. A UV ray radiation unit 15 emits UV rays by being ON/OFF controlled by the CPU 11. The UV rays are guided by the light guides 14 in order to illuminate the adhesive 4.

A position adjusting mechanism, not shown, similar to the mechanism 6 and a chuck, not shown, similar to the chuck 7 are assigned to the intermediate members 3. This mechanism is also movable in the directions X, Y and Z and directions α, β and γ while holding the intermediate members 3 with the chuck.

Figure 40:
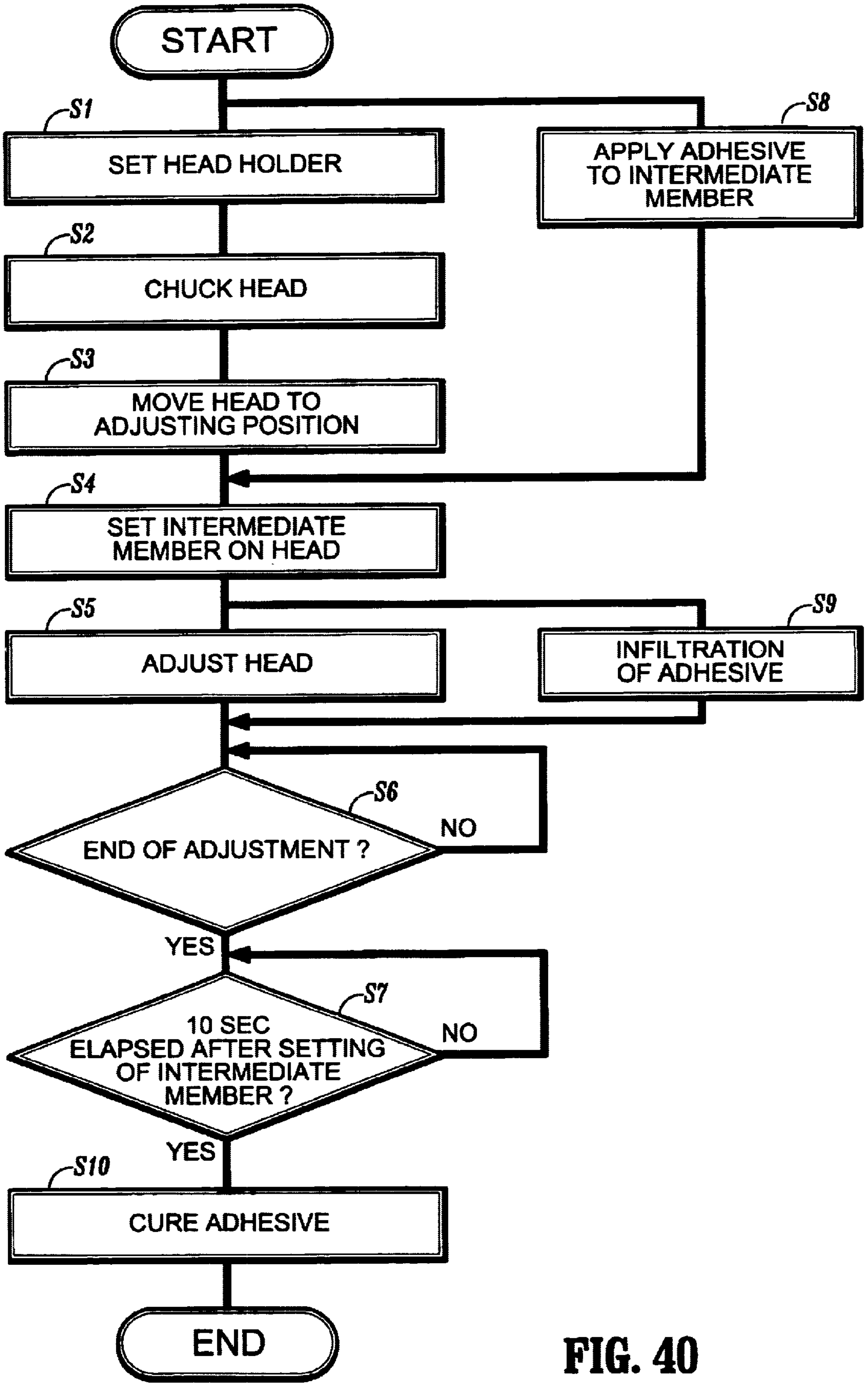
FIG. 40 is a flow chart demonstrating the operation of the apparatus shown in FIG. 38.
Figure 41A:
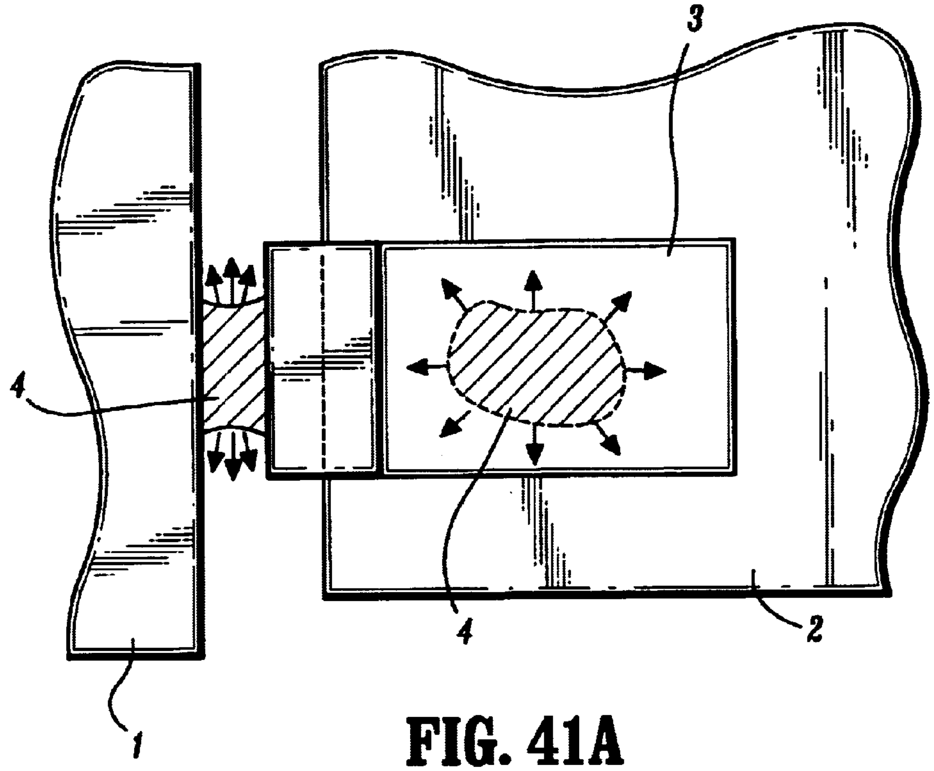
FIGS. 41A and 41B show how a head is mounted to a head holder in the eleventh embodiment.
Figure 41B:
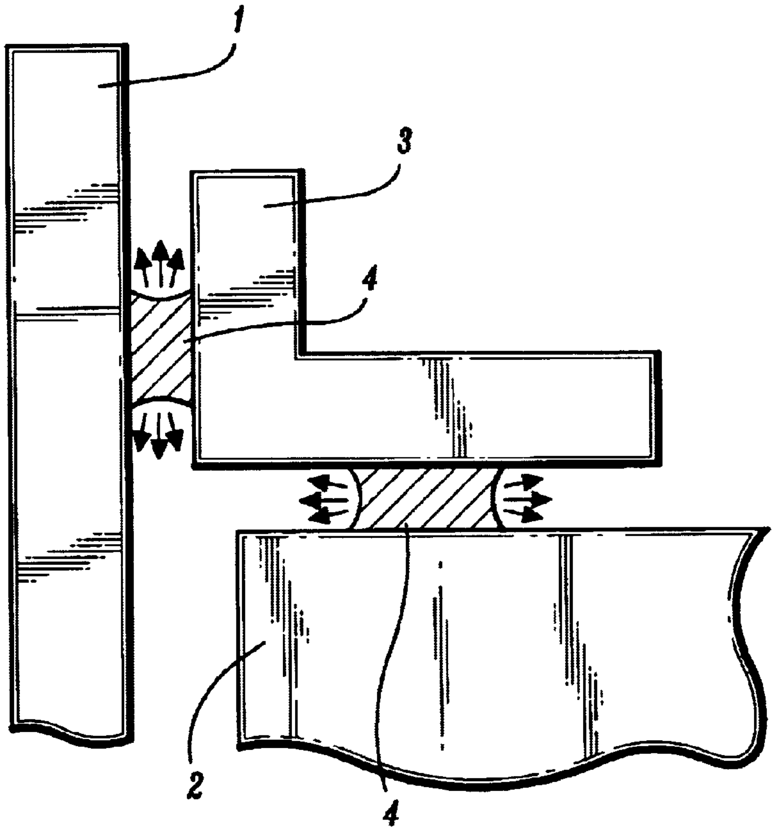

A procedure for mounting the head 2 to the head holder 1 will be described with reference to FIG. 40. First, the electromagnetic valve 10 is turned on to cause the chuck 9 to chuck the head holder 1 (step S1). Then, the adhesive 4 is applied to the intermediate members 3 (step S2). Subsequently, the electromagnetic valve 8 is turned on to cause the chuck 9 to chuck the head 2 (step S2). The position adjusting mechanism 6 moves the chuck 7 in order to move the head 2 to an adhering position above the head holder 1 (step S3). Then, the intermediate members 3 with the adhesive 3 are positioned between the head holder 1 and the head 2 (step S4). Subsequently, the head 2 is brought to a preselected position relative to the head holder 1 (step S5). In this condition, the adhesive 4 is caused to infiltrate into the adhering surfaces of the head 1 and intermediate members 3 and those of the head 2 and intermediate members 3 (step S9). At this instant, the adhesive 4 expands radially due to surface tension acting between it and the intermediate members 3, head 2 and head holder 1, the weight of the adhesive 4, the weight of the intermediate members 3, and the wettability of the adhesive 4, as indicated by arrows in FIGS. 41A and 41B.

Whether or not the head 2 has been fully adjusted in position is determined (step S6). If the answer of the step S6 is YES, whether or not 10 seconds have elapsed since the end of head adjustment is determined (step S7). If the answer of the step S7 is YES, it is determined that the adhesive 4 has spread evenly between the head holder 1 and the intermediate members 3 and between the head 2 and the intermediate members 3. Then, UV rays are radiated via the light guides 14 so as to cure the adhesive 4 (step S10). As a result the head 2 is fixed to the head holder 1 via the intermediate members 3.

As stated above, the illustrative embodiment positions the intermediate members 3 with the adhesive 4 between the head 2 and the head holder 1, locates the head 2 at a preselected position relative to the head holder 1, and then radiates UV rays toward the adhesive 4 so as to fix the head 2 to the head holder 1 via the intermediate members 3.

Therefore, the adhesive can infiltrate evenly into the adhering surfaces of the intermediate members 3 and head 2 and those of the members 3 and head holder 1 due to surface tension acting between it and the intermediate members 3, head 2 and head holder 1, the weight of the adhesive 4, the weight of the intermediate members 3, and the wettability of the adhesive 4. This allows the adhesive 4 to be regulated to a preselected thickness with ease and thereby allows the head 2 to be mounted to the head holder 1 with desired accuracy when the adhesive 4 is cured.

12th Embodiment

Figure 42:
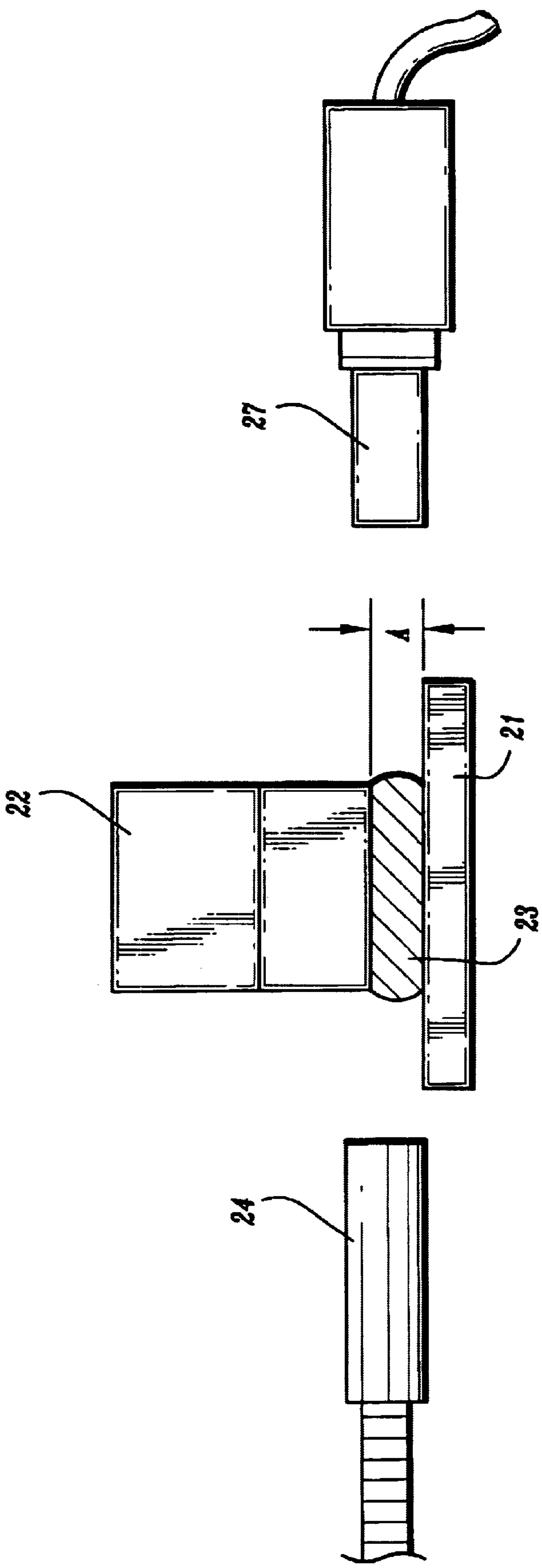
FIG. 42 is a front view showing a twelfth embodiment of the present invention.
Figure 43:
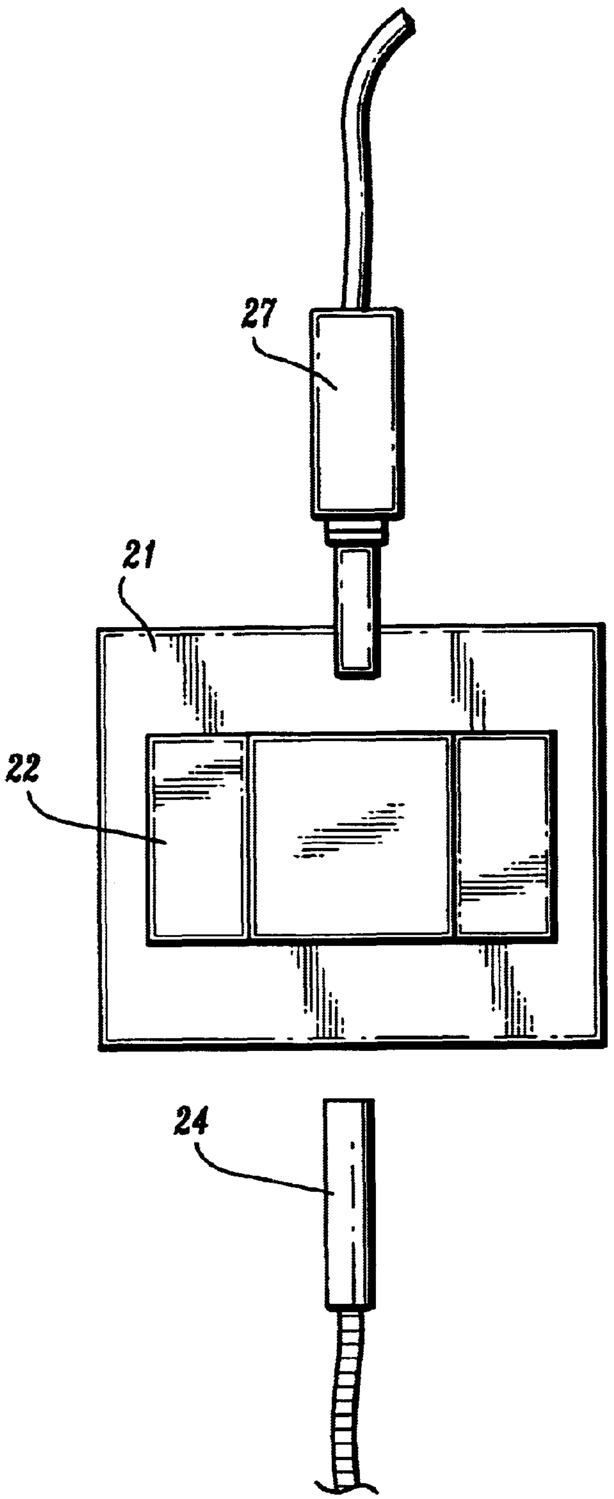
FIG. 43 is a top plan view of the twelfth embodiment.
Figure 44:
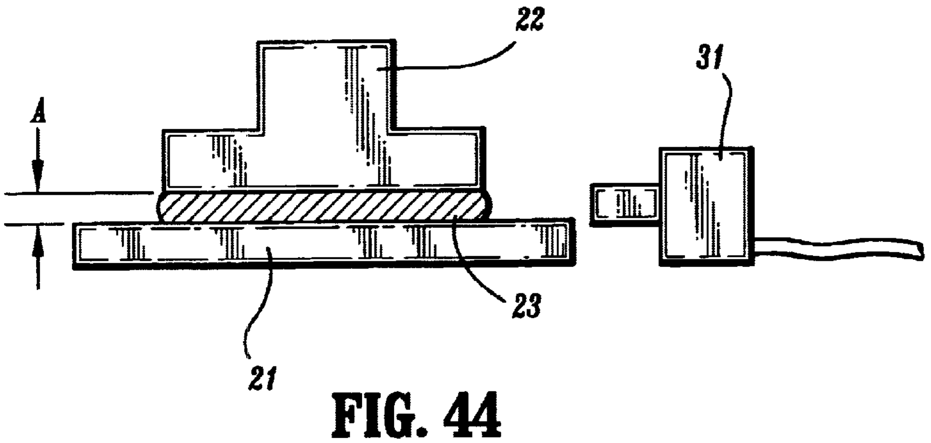
FIG. 44 is a side elevation of the twelfth embodiment.

Reference will be made to FIGS. 42–44 for describing a twelfth embodiment of the present invention. There are shown in FIGS. 42–44 a head holder or frame 21 to be mounted to an ink jet printer and an intermediate member 22. The head holder 21 may be replaced with an ink jet head. Adhesive 23 is applied to the adhering surfaces of the intermediate member 22 and head holder 21 in order to fix the former to the latter. While this embodiment is applied to n ink jet head unit having the intermediate member 22 between the head holder 21 and an ink jet head, only a method of fixing the head holder 21 and member 22 by use of the adhesive 23 will be described because this embodiment is essentially similar to the eleventh embodiment.

Figure 45:
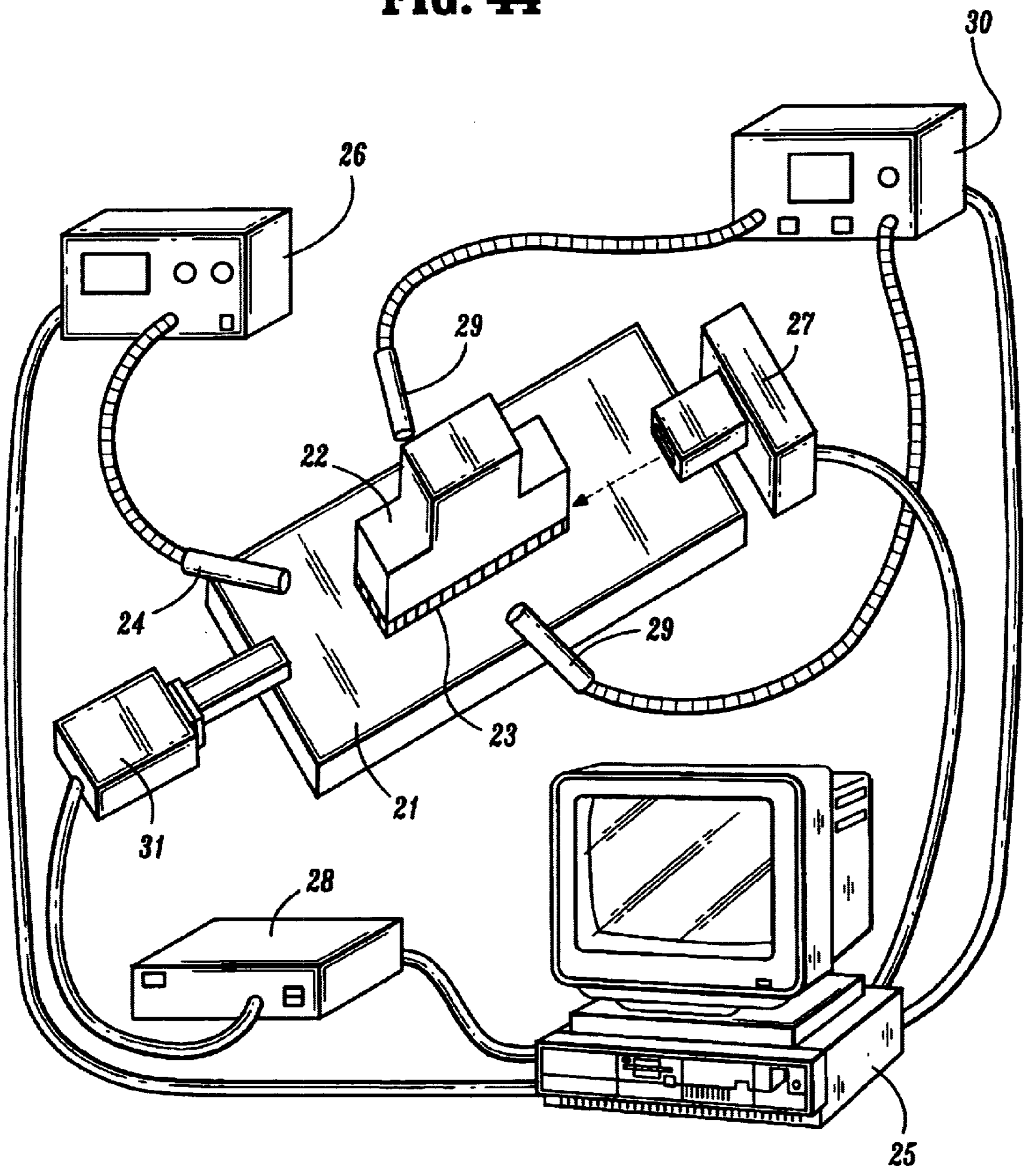
FIG. 45 is a perspective view of an apparatus for mounting an ink jet head assembly representative of the twelfth embodiment.
Figure 46:
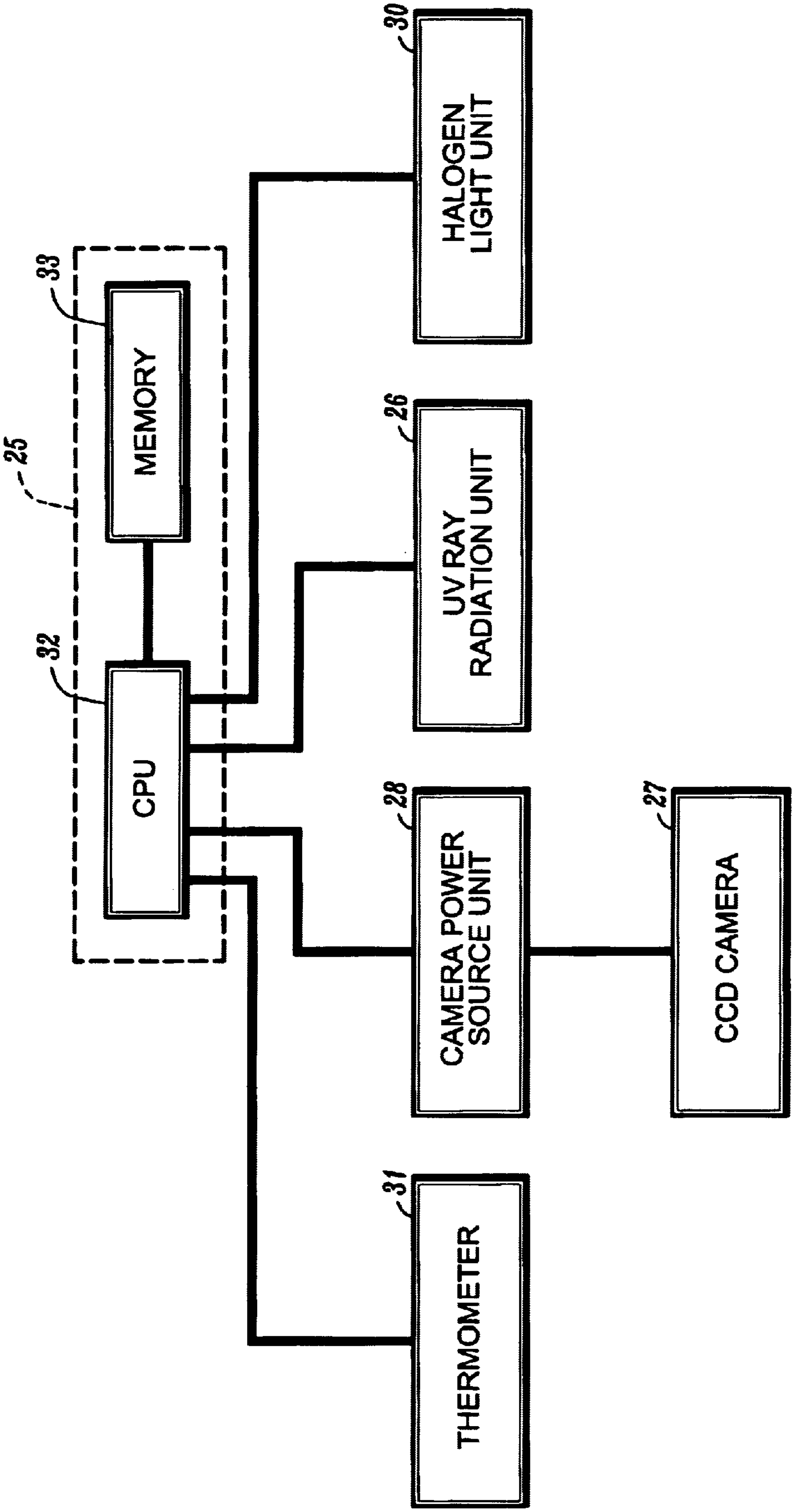
FIG. 46 is a block diagram schematically showing the apparatus of FIG. 45.

FIGS. 45 and 46 show an apparatus for mounting the intermediate member 22 to the head holder 21. In the illustrative embodiment, the head holder 21 is chucked by a chuck having the same configuration as in the eleventh embodiment. The intermediate member 22 is positioned above the head holder 21 by a position adjusting mechanism also having the same configuration as in the eleventh embodiment.

A pair of light guides 24 are located in the vicinity of the chuck assigned to the head holder 21. A UV ray radiation unit 26 selectively radiates UV rays toward the adhesive 23 via the light guides 24 in response to a signal output from a controller 25. A CCD camera 27 adjoins the chuck assigned to the head holder 21 in order to shoot the adhesive 23. The camera 27 is driven by a camera power source unit 28 which is, in turn, driven by the output signal of the controller 25. An image picked up by the camera 27 is sent to the controller 25.

A halogen lamp 29 is positioned in the vicinity of the camera 27. When the camera 27 shoots the adhesive 23, a halogen illumination unit 30 causes the halogen lamp 29 to emit light in response to the output signal of the controller 25, thereby illuminating the adhesive 23. A thermometer 31 is positioned in the vicinity of the chuck assigned to the head holder 21 in order to measure the temperature of the adhesive 23 without contacting it. The output of the thermometer 31 is also sent to the controller 25.

The controller 25 includes a CPU 32 and a memory 33. The memory 33 stores a table map listing the amounts of UV rays and radiation times in correspondence to the temperatures and thicknesses of the adhesive 23. When the CPU 32 receives the temperature of the adhesive from the thermometer 31 and the thickness of the adhesive 23 from the camera 27, the CPU 32 reads the light amount data and illumination time data corresponding to the received in formation out of the memory 33. Then, the CPU 32 drives the UV ray radiation unit 26 on the basis of the above data so as to control the amount and duration of UV rays to be emitted via the light guide 24.

Figure 47:
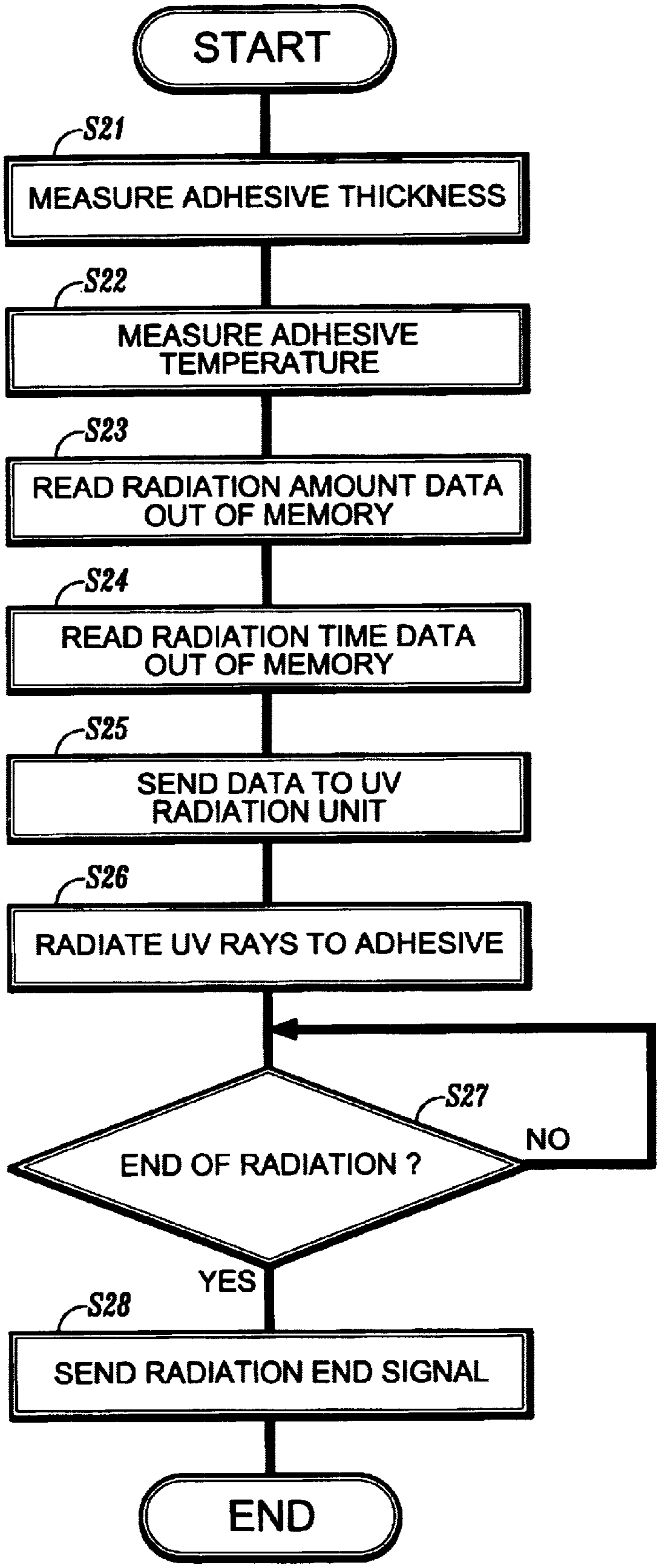
FIG. 47 is a flowchart demonstrating the operation of the apparatus shown in FIG. 45.

FIG. 47 is a flowchart demonstrating a procedure for mounting the intermediate member 22 to the head holder 21. The following description will concentrate on steps distinguishing the twelfth embodiment from the eleventh embodiment. As shown, assume that the intermediate member 22 has been adjusted to its preselected position. Then, before 10 seconds elapse, the camera 27 shoots the thickness of the adhesive 23 while the thermometer 31 measures the temperature of the adhesive 23 (steps S21 and S22). The thickness and temperature of the adhesive 23 are sent to the controller 25.

The controller 25 reads, based on the thickness and temperature of the adhesive 23, particular light amount data and illumination time data (steps S23 and S24) and sends these data to the UV ray radiation unit 26 (step S25). In response, the radiation unit 26 radiates UV rays toward the adhesive 23 by the amount and for the duration indicated by the controller 25 (step 26). On the elapse of the illumination time (YES, step S27), the controller 25 sends a radiation end signal to the radiation unit 26. In response, the radiation unit 26 ends the radiation. (step S28).

As stated above, this embodiment stores the amounts and durations of UV radiation in the memory 33 in correspondence to the temperatures and thicknesses of the adhesive 23, measures the temperature and thickness of the adhesive 23 at the time of curing of the adhesive 23, reads the amount and duration of UV radiation matching with the temperature and thickness out of the memory 33, and radiates UV rays toward the adhesive 23 on the basis of the above amount and duration. This protects the intermediate member 22, head holder 21 and adhesive 23 from excessive radiation energy which would change the colors of and deteriorate such structural elements or would cause the adhesive 23 to set excessively and aggravate the displacement of the head. Therefore, the displacement of a head is prevented from being aggravated.

Further, there can be obviated an excessive radiation time and therefore an increase in the period of time necessary for the intermediate member 22 to be mounted. In addition, extra costs for constructing, e.g., a clean room and using accurate parts are not necessary which would increase the production cost.

As stated above, the eleventh and twelfth embodiments have the following advantages.

(1) Before an ink jet head is positioned relative to a head holder, intermediate members applied with adhesive are positioned between the head and the head holder. Therefore, the adhesive can infiltrate evenly into the adhering surfaces of the intermediate members and head and those of the intermediate members and head holder due to surface tension acting between it and the intermediate members, head and head holder, the weight of the adhesive, the weight of the intermediate members, and the wettability of the adhesive (2) Therefore, the adhesive 4 is successfully regulated to a preselected thickness with ease, so that the head can be mounted to the head holder with desired accuracy when the adhesive is cured.

(3) UV rays can be radiated under optimal conditions matching with the thickness of the adhesive. This protects the intermediate member, head holder and adhesive from excessive radiation energy which would change the colors of and deteriorate such structural elements or would cause the adhesive to set excessively and aggravate the displacement of the head. Therefore, the displacement of a head is prevented from being aggravated.

(4) There can be obviated an excessive radiation time and therefore an increase in the period of time necessary for the intermediate member to be mounted.

(5) Extra costs for constructing, e.g., a clean room and using accurate parts are not necessary which would increase the production cost.

13th Embodiment

Figure 48A:
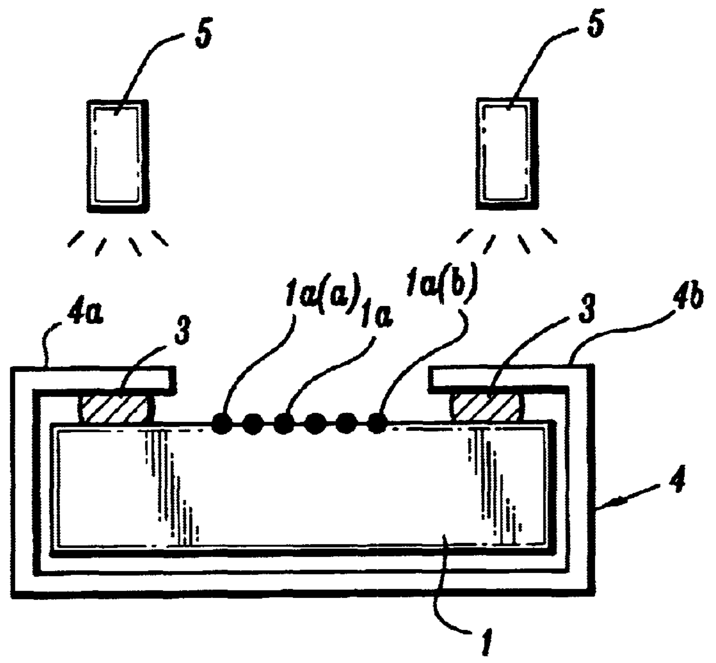
FIG. 48A is a side elevation showing a thirteenth embodiment of the present invention.
Figure 48B:
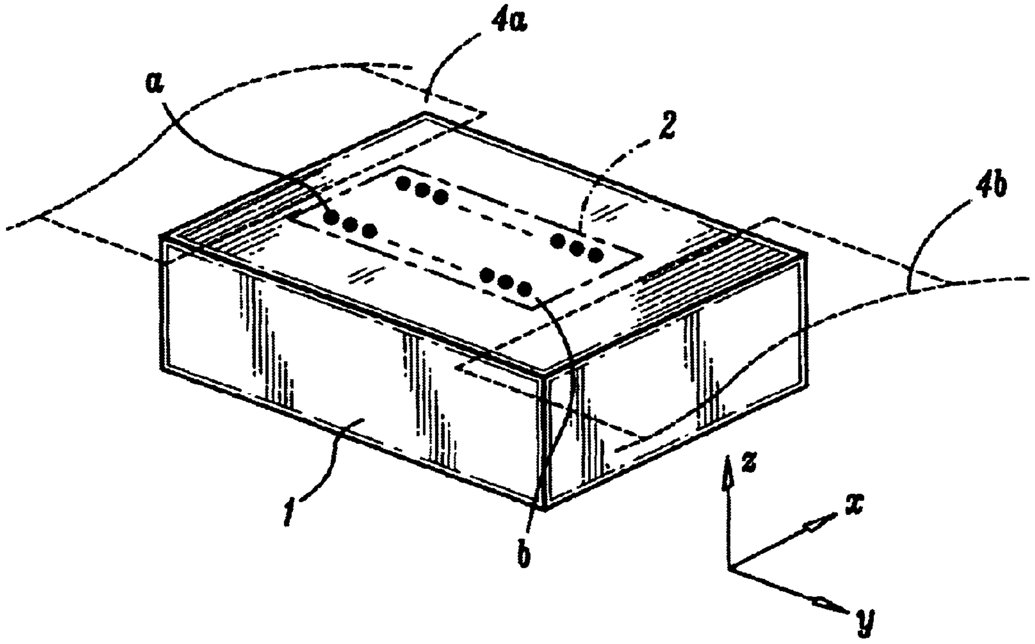
FIG. 48B is a fragmentary perspective view of the thirteenth embodiment.

A thirteenth embodiment of the present invention will be described with reference to FIGS. 48A and 48B. As shown, an ink jet head 1 includes an ejection surface 2 formed with a plurality of ejection ports la. The head 1 is fixed to a head holder 4 by a UV ray curable adhesive 3. The head holder 4 includes two adhering portions 4*a* and 4*b* positioned at both sides of the ejection surface 2. The head holder 4 is formed of a material transparent for UV rays.

The adhering portions 4*a* and 4*b* are positioned such that the distance between them and the ejection surface 2 in the perpendicular direction is smallest, but the distance between them and the ejection ports 1*a* in the same direction as the surface 2 is greatest. In the illustrative embodiment, after the adhesive 3 has been applied to the adhering portions 4*a* and 4*b*, the head 1 is mounted to the adhering portions 4*a* and 4*b*. Subsequently, the adhesive 3 is cured by UV rays radiated from the above light guides 5. As a result, the head 1 is fixed to the head holder 4 which is transparent for UV rays.

Figure 49A:
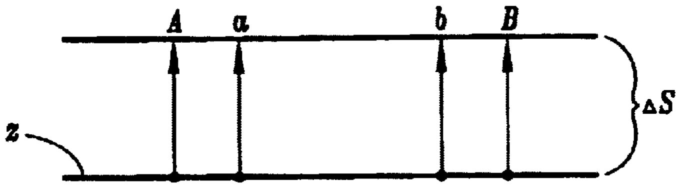
FIG. 49A shows the ideal position of a nozzle surface included in the thirteenth embodiment and free from an inclination ascribable to a scatter occurred in adhesive.
Figure 49B:
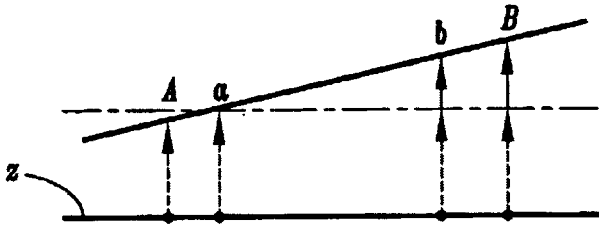
FIGS. 49B, 49C, 49D each shows a particular inclination of the nozzle surface ascribable to a scatter in the adhesive.
Figure 49C:
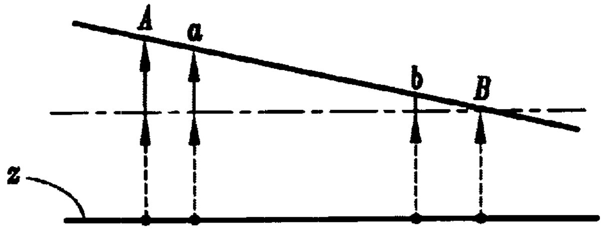
Figure 49D:
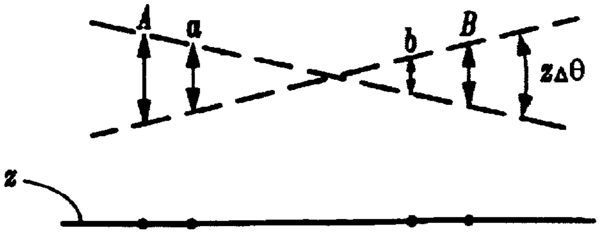

Specifically, as shown in FIG. 49A, assume that the adhesive portions 4*a* and 4*b* are respectively represented by A and B, and that the ejection ports 1*a* at both ends are respectively represented by a and b. Then, so long as the adhesive 3 shrinks evenly with respect to the ejection surface 2, the head 1 moves in parallel from a reference plane Z toward the adhering portions 4*a* and 4*b* by an amount of $\Delta S$. However, as shown in FIG. 49B or 49C, when the shrinkage of the adhesive 3 with respect to the ejection surface 2 has a difference of $\Delta z$, the head 1 rotates in one direction away from the adhering portion B or A. As a result, as shown in FIG. 49D, the head 1 is inclined by an angle of $\Delta\theta$.

To minimize the deviation of the hitting points of ink ascribable to the above inclination, this embodiment positions the adhering portions 4*a* and 4*b* such that the distance between them and the ejection surface 2 in the perpendicular direction is smallest, but the distance between them and the ejection ports 1*a* in the same direction as the surface 2 is greatest. This characteristic feature will be described more specifically in relation to comparative examples.

Figure 50:
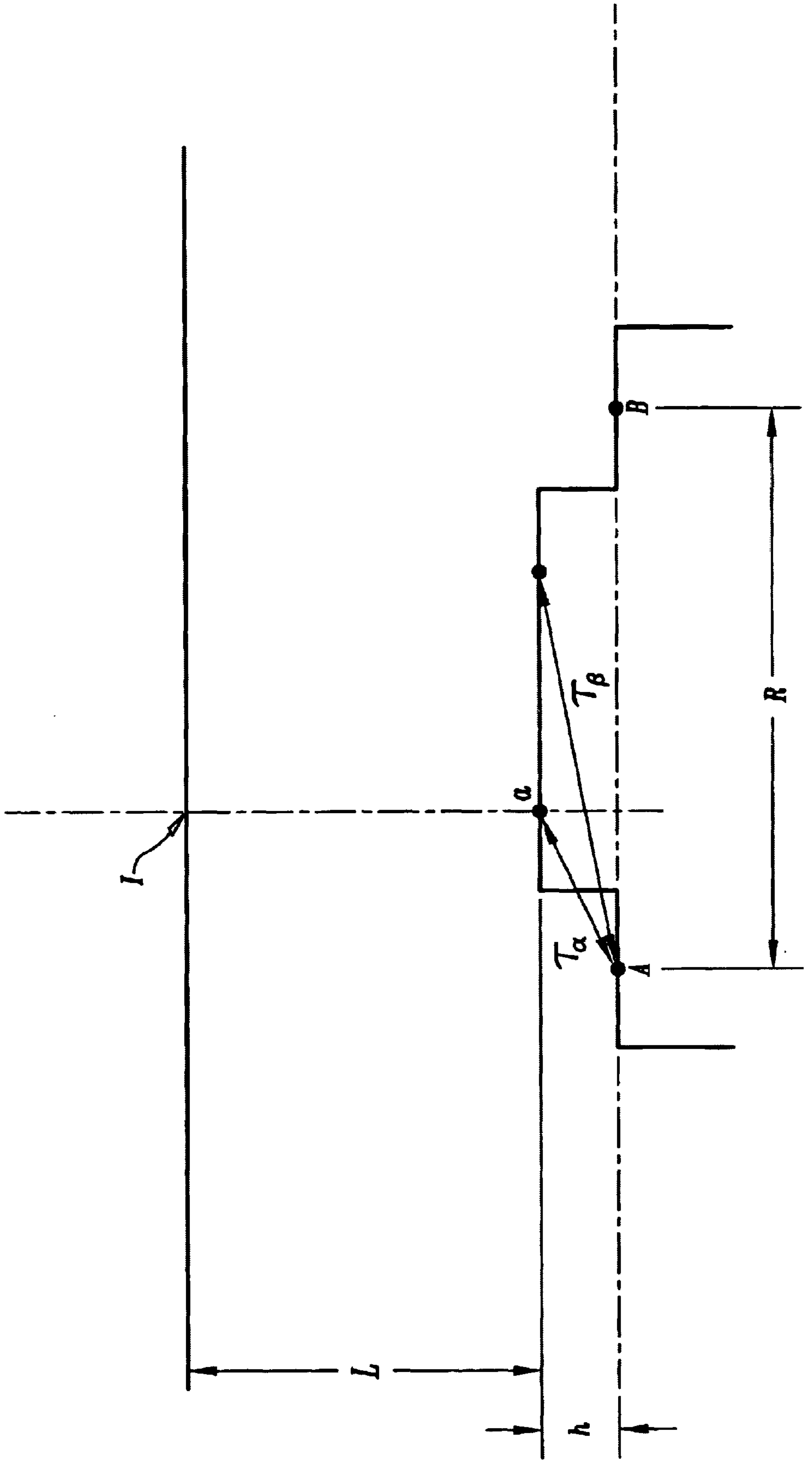
FIG. 50 shows a relation between a head and a hitting point particular to the thirteenth embodiment.

FIG. 50 is a diagram modeling the head 1. There are shown in FIG. 50 a distance h between each of the adhering portions A and B and the ejection surface 2 in the perpendicular direction, a distance L between each of the ejection ports a and b and a deal position I which an ink drop ejected from the port a or b should hit, a distance R between the adhering portions A and B, a distance $r_a$ between the adhering portion A and the ejection port a, and a distance $r_b$ between the adhering portion B and the ejection port b.

Figure 51A:
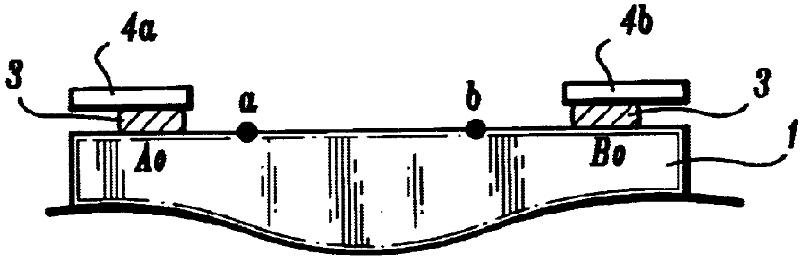
FIGS. 51A–51C each shows adhering surfaces located at a particular position relative to the ejection surface of the head included in the thirteenth embodiment.
Figure 51B:
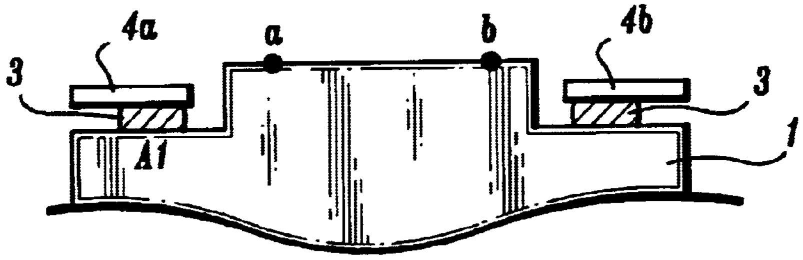
Figure 51C:
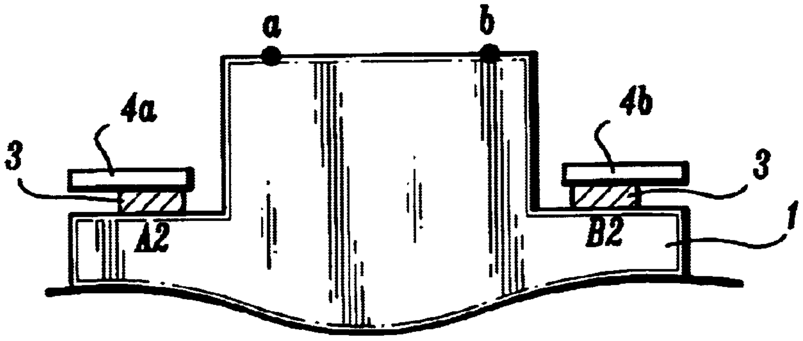

First, reference will be made to FIGS. 51A–51C and 52 for describing a difference in the ejection position, i.e., the positions of the ejection ports ascribable to a difference in adhering position. As shown in FIG. 51A, let the adhering portions 4*a* and 4*b* be represented by $A_0$ and $B_0$. FIG. 51B shows a condition wherein the distance Z between the adhering portions 4*a* and 4*b* and the ejection surface 2 in the perpendicular direction is greater than in the case shown in FIG. 5A; the adhering portions are represented by $A_1$ and $B_1$. FIG. 51C shows another condition wherein the distance Z is even greater than in the case shown in FIG. 51B; the adhering portions are represented by $A_2$ and $B_2$.

Figure 52:
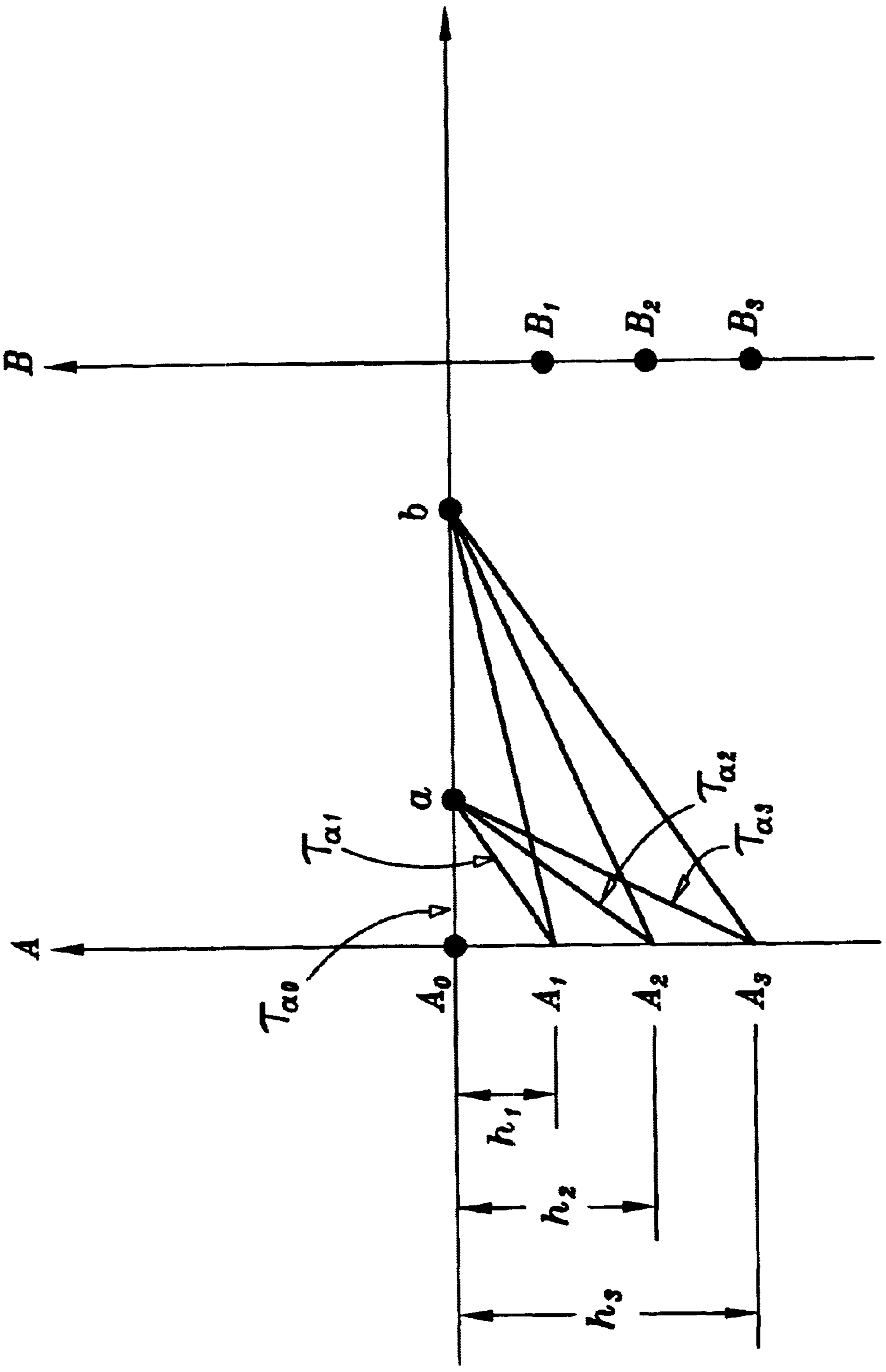
FIG. 52 shows a radius component derived from the position of the adhering surfaces relative to the ejection surface of the head.

As shown in FIG. 52, assume that the distance h between the adhering portion A and the ejection surface 2 in the perpendicular direction sequentially increases, as represented by a distance $r_{a0}$ between the port $\alpha$ and the adhering portion $A_0$, a distance $r_{a1}$ between the port $\alpha$ and the adhering portion $A_1$, a distance $r_{a2}$ between the port $\alpha$ and an adhering portion $A_2$, and a distance $r_{a3}$ between the port $\alpha$ and an adhering portion $A_3$ ($r_{a0}<r_{a1}<r_{a2}<r_{a3}$). Then, when the head is inclined by the angle of $\Delta\theta$ mentioned earlier, the deviation of the port $\alpha$ sequentially varies as represented by $r_{a0}\cdot\Delta\theta<r_{a1}\cdot\Delta\theta<r_{a2}\cdot<r_{a3}\cdot\Delta\theta$. In this case, among $r_a\cdot\Delta\theta$, $r\cdot\Delta\theta\cdot/r_a=h\cdot\Delta\theta$ which is the tangential direction of the paper actually affects the hitting point. That is, the deviation sequentially increases as represented by $h_1\cdot\Delta\theta<h_2\cdot\Delta\theta<h_3\cdot\Delta\theta$.

Figure 53A:
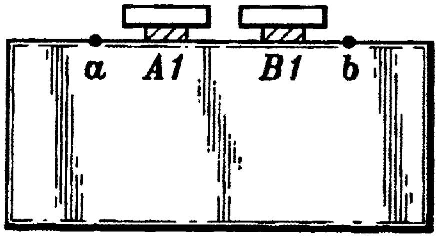
FIG. 53A shows adhering surfaces lying in the ejection surface of the head.
Figure 53B:
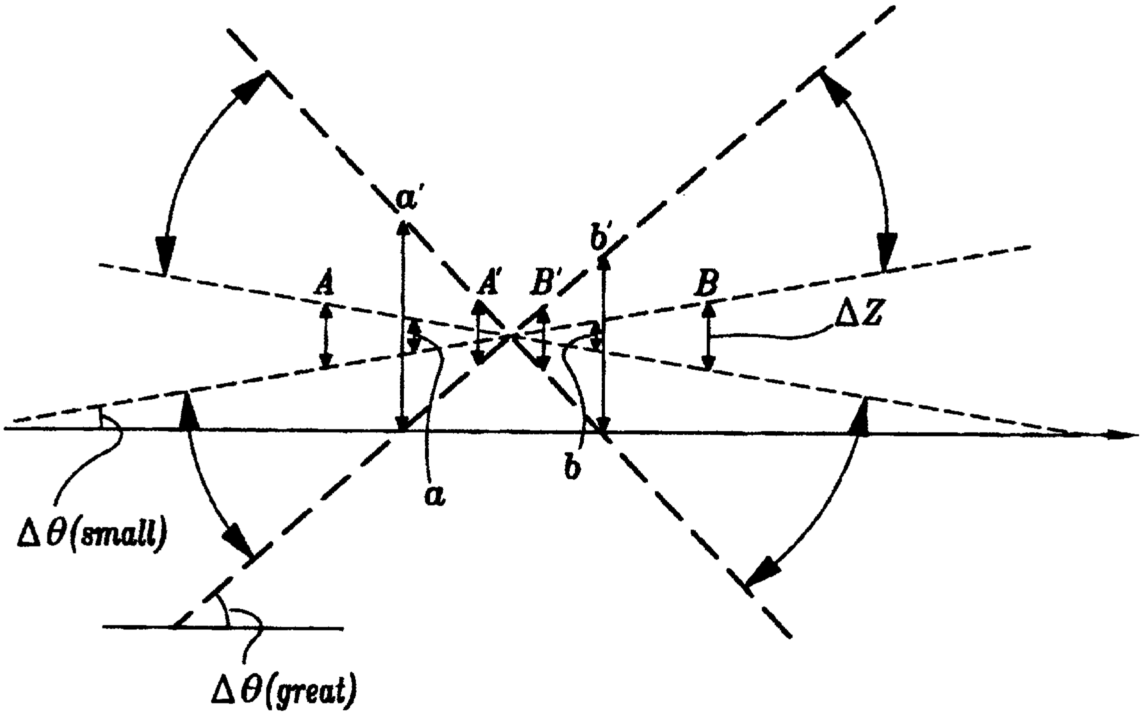
FIG. 53B shows an angle component.

Next, a difference in an ejection angle component ascribable to a difference in hitting point will be discussed with reference to FIGS. 53A, 53B and 54. FIG. 53A shows a condition wherein the adhering portions 4*a* and 4B, respectively represented by $A_1$ and $B_1$, lie between the ejection ports a and b on the ejection surface 2. In this case, as shown in FIG. 53B, the inclination $\Delta\theta$ of the head 1 is noticeable. On the other hand, when the adhering portions $A_0$ and $B_0$ are set at positions where the distance in the same direction as the ejection surface 2 increases, the inclination $\Delta\theta$ decreases.

Figure 54:
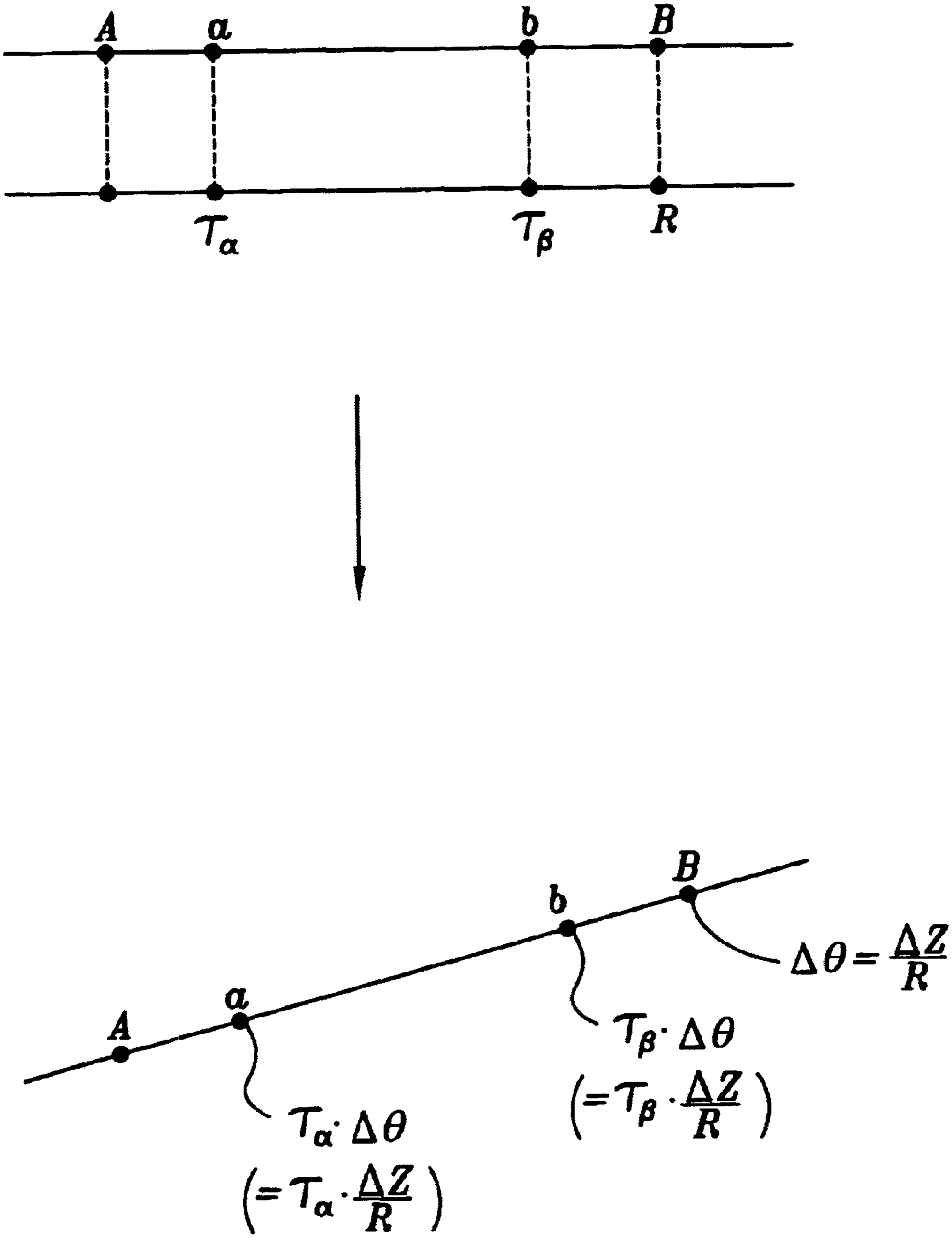
FIG. 54 is a diagram for describing the angle component of the thirteenth embodiment.

As shown in FIG. 54, assume that the distance between the adhering portions A and B is R, that the distance between the adhering portion A and the port $\alpha$ is $r_a$, and that the distance between the portion A and the port b is $r_b$. Then, the inclination of the head occurring about the adhering portion A due to the scatter in the shrinkage of the adhesive is $\Delta\theta=\Delta Z/R$. Therefore, the inclination depends on the distance R. In this case, the deviation of the hitting point and dependent on the ejection angle is $L\cdot\Delta\theta$'2 $L\cdot\Delta Z/R$ (see FIG. 55).

Figure 55:
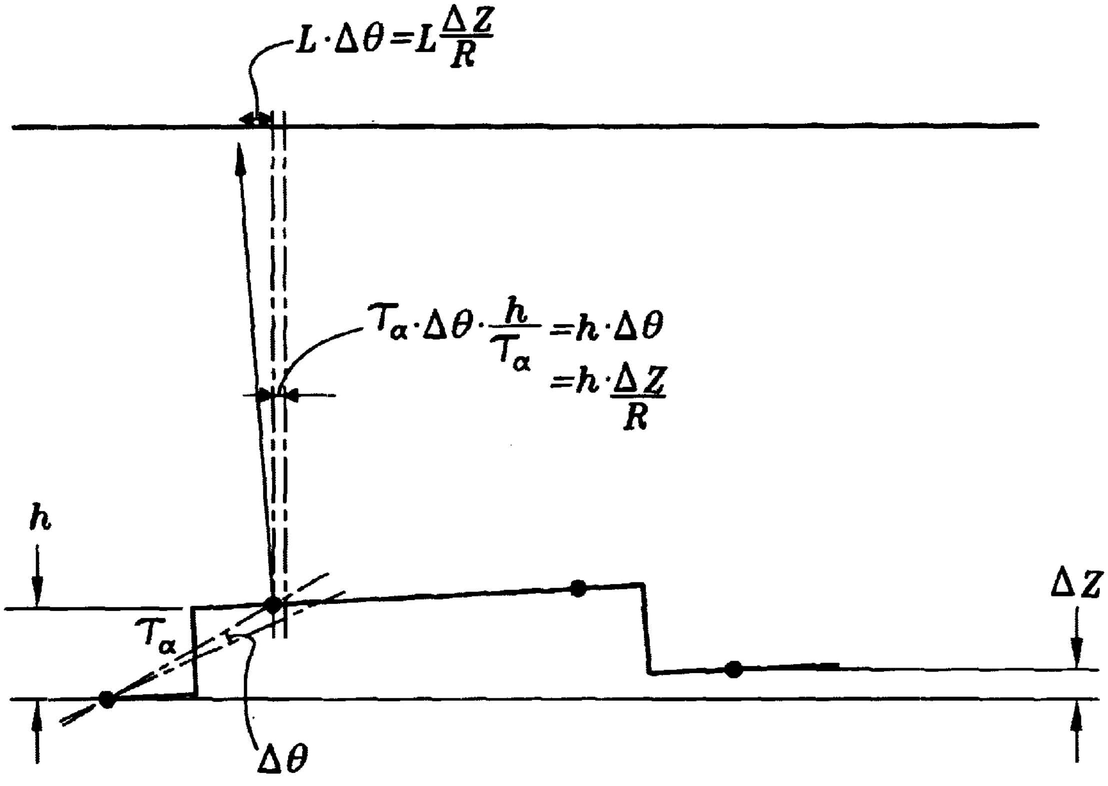
FIG. 55 shows the deviation of a hitting point ascribable to the inclination of the head included in the thirteenth embodiment.

To summarize the above, as shown in FIG. 55, the deviation of the point which an ink drop ejected from the port a hits is the sum of $L\cdot\Delta Z/R$ and $h\cdot\Delta\theta=h\cdot\Delta Z/R$. It will be seen that reducing h or increasing R is successful to reduce the deviation of the hitting point I.

It is therefore possible to reduce, when a scatter occurs in the adhesive 3 at the adhering portions 4*a* and 4*b*, the resulting fine displacement ascribable to the rotation of the head 1, i.e., the angular movement of the ejection ports, thereby guaranteeing accurate ejection positions which is the final required characteristic. In addition, the yield of the ink jet head mounting structure is prevented from lowering.

Figure 56A:
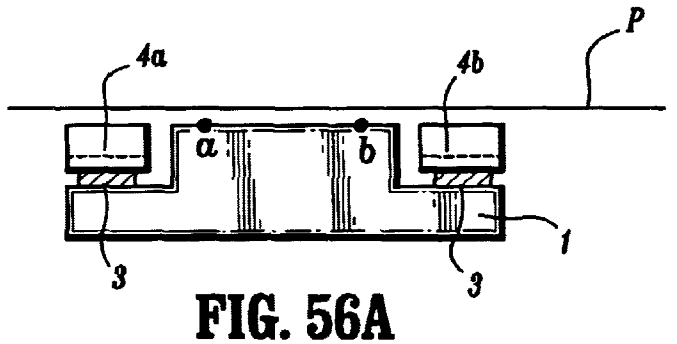
FIG. 56A is a front view showing a modification of the thirteenth embodiment.
Figure 56B:
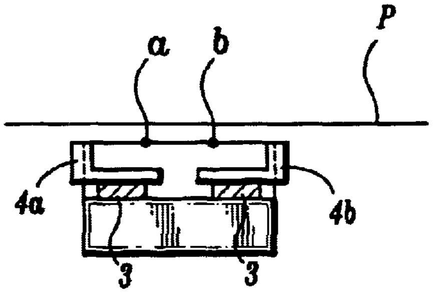
FIG. 56B is a side elevation of the modification shown in FIG. 56A.
Figure 57A:
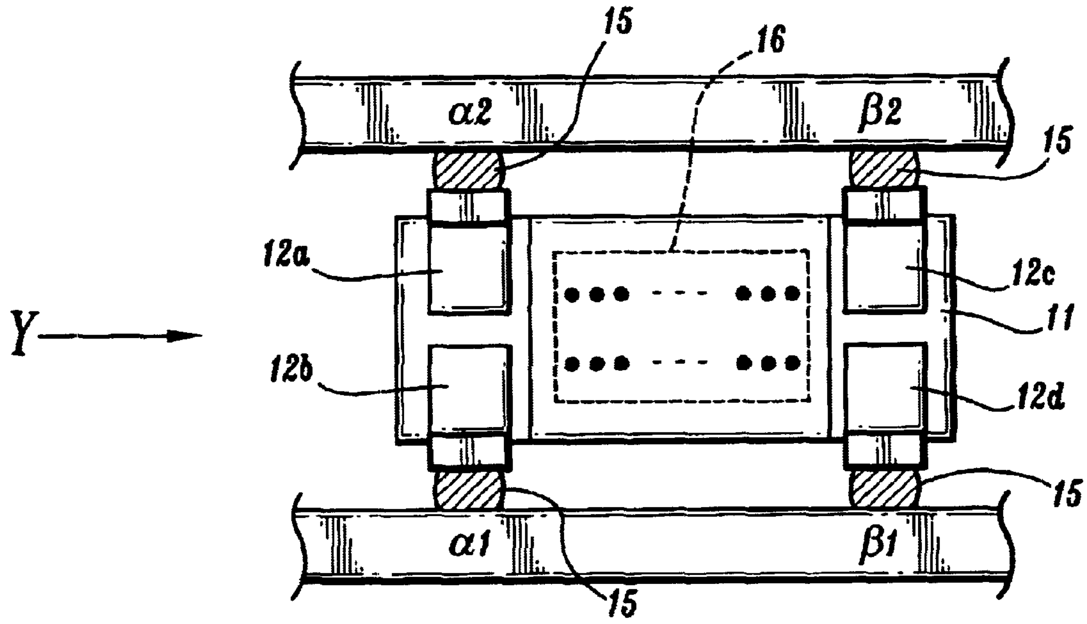
FIG. 57A is a top plan view showing a fourteenth embodiment of the present invention.
Figure 57B:
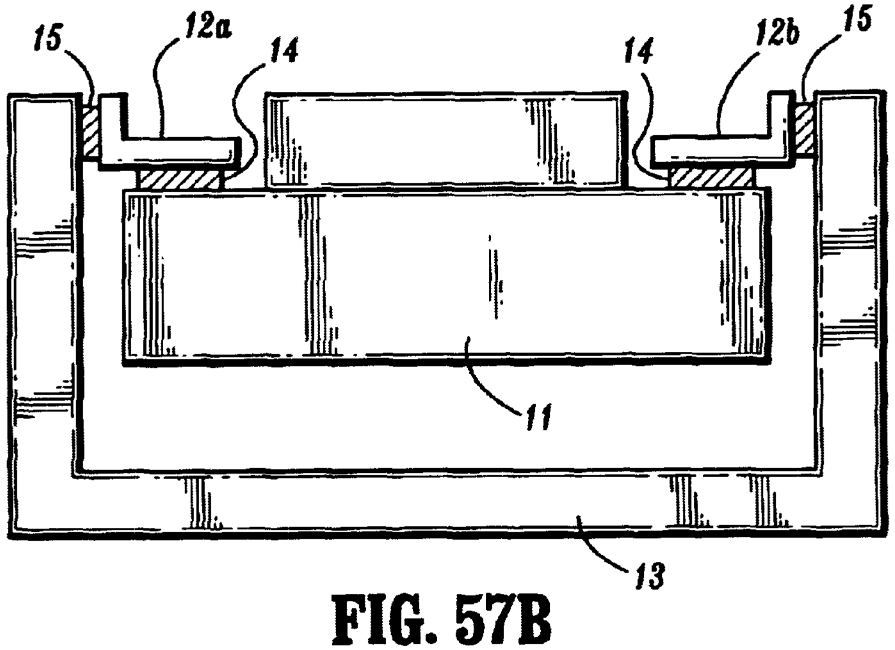
FIG. 57B is a view as seen in a direction Y of FIG. 57A.

In the illustrative embodiment, the adhering portions 4*a* and 4*b* are shown as lying in substantially the same plane as the ejection surface 2. However, it may occur that the surfaces to which the adhesive 3 should be applied are limited or that the distance between the paper P and the ejection surface 2 is limited (it should naturally be as small as possible). In such a case, as shown in FIG. 56A or 56B, the ejection surface 2 may be provided with a stepped configuration in order to position the adhering surfaces 4*a* and 4*b* below the surface 2.

14th Embodiment

Referring to FIGS. 57A, 57B, 58, and 59, a fourteenth embodiment of the present invention is shown and includes an ink jet head 11. As shown, the head 11 is mounted to a head holder 13 via four generally L-shaped intermediate members 12*a*–12*d*. The intermediate members 12*a*–12*d* are fixed to the head 11 by UV ray curable adhesive 14 and also fixed to the head holder 13 by the adhesive 15. The intermediate members 12*a*–12*d* are formed of a material transparent for UV rays.

The surface of each of the intermediate members 12*a*–12*d* to be adhered to the head 11 is positioned such that its distance from an ejection surface 16 included in the bead 11 in the perpendicular direction is smallest, but its distance from ejection ports in the same direction as the ejection surface 16 is greatest. With this configuration, it is also possible to achieve the advantages described in relation to the thirteenth embodiment.

The intermediate members 12*a*–12*d* intervening between the head 11 and the head holder 13 provides the following additional advantage. Ink drops ejected from the ejection ports of the head 11 should hit a preselected position with utmost accuracy. The head 11 should therefore be adjusted in all of the directions X, Y and Z. It follows that clearances must be provided between the head holder 13 and the head 11. In this sense, the intermediate members 12*a*–12*b* play the role of auxiliary fixing means and allow the head 11 and head holder 13 to be fixed to each other with the intermediary thereof. Consequently, the head 11 can be fixed to the head holder 13 with desired accuracy. This allows the relative hitting accuracy of ink drop to be enhanced. Particularly, in a four-head unit having four heads each being filled with one of cyan ink, magenta ink, yellow ink and black ink, the relative position between the heads can be determined with accuracy.

Figure 58:
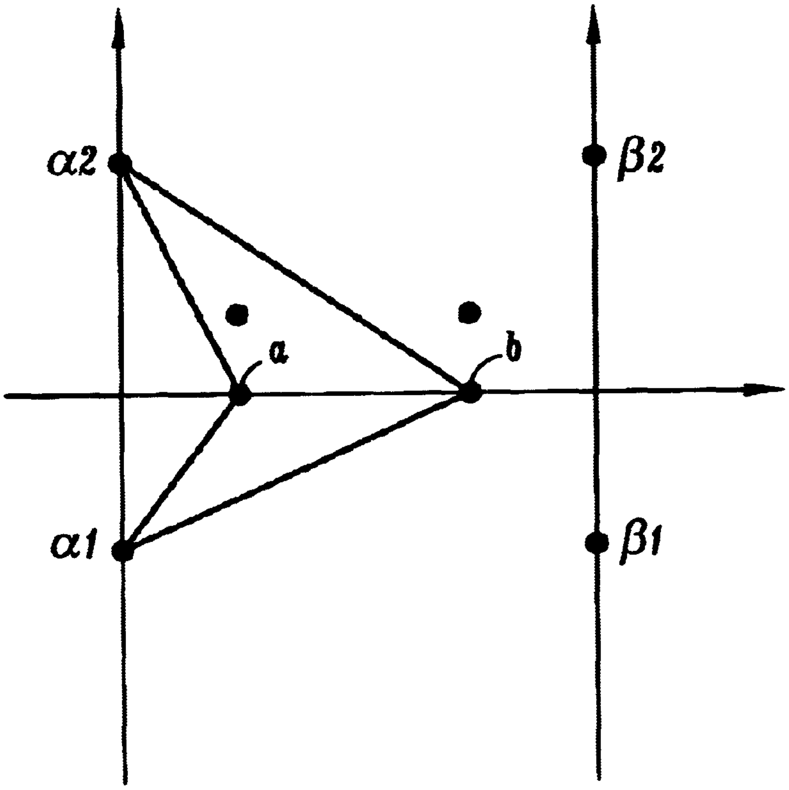
FIG. 58 shows the inclination of a head included in the fourteenth embodiment relative to a head holder.
Figure 59:
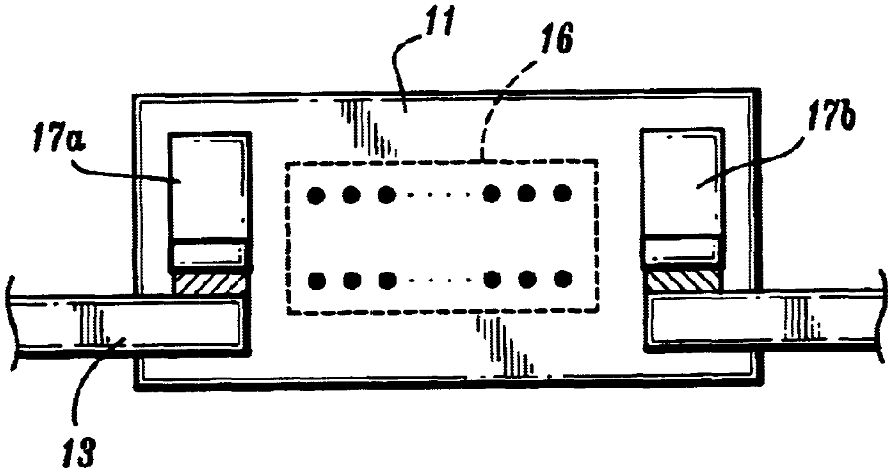
FIG. 59 shows a modification of the fourteenth embodiment.

In the illustrative embodiment, adhering surfaces $\alpha_1$, $\alpha_2$, $\beta_1$ and $\beta_2$ included in the intermediate members 12*a*–12*d*, respectively, and associated with the head holder 13 are remote from the ejection surface 16. As a result, as shown in FIG. 58, the ports a and b and adhering surfaces $\alpha_1$, $\alpha_2$, $\beta_1$ and $\beta_2$ are remote from each other, increasing the inclination of the head 11. In light of this, as shown in FIG. 59, the adhering surfaces of intermediate members 17*a* and 17*b* associated with the head holder 13 should ideally be located in the vicinity of the ejection surface 16. In practice, however, the configuration shown in FIG. 59 would increase the distance between the ejection surface 16 and the paper.

In summary, the thirteenth and fourteenth embodiments achieve the following advantages.

(1) Adhering surfaces are positioned at the smallest distance from the ejection surface of an ink jet head in the direction perpendicular to the ejection surface. This successfully reduces the radius component (radial length) of the head ascribable to the shrinkage of adhesive.

(2) The adhering surfaces are positioned at the greatest distance from ejection ports in the same direction as the ejection surface. This successfully reduces the angle component (inclination) of the head ascribable to the shrinkage of the adhesive.

(3) It is therefore possible to reduce, when a scatter occurs in the adhesive at the adhering portions, the resulting fine displacement ascribable to the rotation of the head, i.e., the angular movement of the ejection ports, thereby guaranteeing accurate ejection positions which is the final required characteristic. In addition, the yield of the ink jet head mounting structure is prevented from lowering.

Various modifications will become possible for those skilled in the art after receiving the teachings of the present disclosure without departing from the scope thereof.

This application claims priority to the following Japanese Patent Application Nos. 9-55645 filed Mar. 11, 1997, 9-193440 filed July 18, 1997, 9-193441 filed Jul. 18, 1997, 9-193442, filed Jul. 18, 1997, 9-193443 filed Jul. 18, 1997, 9-193444 filed Jul. 18, 1997 and 9-230154 filed Aug. 27, 1997 each of which is incorporated herein by reference.

What is claimed is:

1. A method of fixing to a base an ejection device for ejecting a substance by, toward a desired object, comprising:

locating said ejection device at a preselected position relative to said base;

positioning a fixing device including a first and a second adhering surface, each of the first and second adhering surface having been applied with adhesive beforehand, such that said first and second adhering surfaces respectively face a mounting surface of said ejection device and a fixing surface of said base;

bringing the adhesive into contact with said mounting surface and said fixing surface; and curing the adhesive.

2. A method as claimed in claim 1, further comprising the step of moving, after said ejection device has been fixed in place, a next ejection device to a preselected position relative to said lease by using said ejection device fixed as a reference, and fixing said next ejection device to said base via adhesive and another fixing device.

3. A method as claimed in claim 1, further comprising the step of causing, before curing the adhesive, said ejection device to perform a second movement to thereby render a thickness of the adhesive between said fixing device and said ejection device substantially uniform.

4. A method of producing an ink jet head assembly including an ink jet head for ejecting ink drops via ejection ports, and a head holder on which said ink jet head is mounted via an intermediate member, said intermediate member being fixed to said ink jet head and said head holder by adhesive, said method comprising:

chucking said ink jet head, said intermediate member and said head holder, applying the adhesive to adhering surfaces of at least one of said ink jet head, said intermediate member and said head holder, and moving each of said ink jet head, said intermediate member and said head holder to a respective initial adhering position;

adjusting each of said ink jet head, said intermediate member and said head holder brought to the initial adhering positions to a respective final adhering position;

releasing said intermediate member brought to the final adhering position;

curing the adhesive; and releasing said ink jet head after curing of the adhesive.

5. An apparatus for producing an ink jet head assembly including a plurality of ink jet heads, said apparatus comprising:

head moving means capable of selectively chucking or releasing an ink jet head, for moving said ink jet head to an adhering position and adjusting a position of said ink jet head;

intermediate member moving means capable of selectively chucking or releasing an intermediate member, for moving said intermediate member to the adhering position and adjusting a position of said intermediate member;

head holder moving means capable of selectively chucking or releasing a head holder, for moving said head holder to the adhering position and adjusting a position of said head holder;

applying means for applying adhesive to adhering surfaces of one of said ink jet head, said intermediate member, and said head holder;

curing means for curing the adhesive;

first sensing means for determining that said ink jet head, said intermediate member and said head holder have been positioned at the adhering position after application of the adhesive;

first releasing means for releasing said intermediate member moving means from said intermediate member in response to information received from said first sensing means;

second sensing means for determining that said curing means has cured the adhesive; and second releasing means for releasing said head holder moving means from said head holder in response to information received from said second sensing means.

6. A method of mounting at least one ink jet head to a head holder via an intermediate member, said method comprising:

positioning, after UV ray curable adhesive has been applied to adhering surfaces of said intermediate member, said intermediate member between said ink jet head and said head holder;

locating said ink jet head at a preselected position relative to said head holder; and radiating UV rays to the adhesive to thereby fix said ink jet head to said head holder via said intermediate member.

7. A method as claimed in claim 2, further comprising the steps of:

storing amounts and durations of UV ray radiation in a memory beforehand in correspondence to temperatures and thicknesses of the adhesive;

measuring a temperature and a thickness of the adhesive when the UV rays are radiated to the adhesive;

reading an amount and a duration of UV ray radiation corresponding to the temperature and thickness measured out of said memory; and radiating UV rays to the adhesive on the basis of the temperature and the duration read out of said memory.

8. An apparatus for producing an ink jet head assembly including a plurality of ink jet heads, said apparatus comprising:

head moving device for selectively chucking and releasing an ink jet head, and moving said ink jet head to an adhering position and adjusting a position of said ink jet head;

an intermediate member moving device for selectively chucking or releasing an intermediate member, and moving said intermediate member to the adhering position and adjusting a position of said intermediate member;

a head holder moving device for selectively chucking or releasing a head holder, and moving said head holder to the adhering position and adjusting a position of said head holder;

an adhesive applying device for applying adhesive to adhering surfaces of at least one of said ink jet head, said intermediate member, and said head holder;

a curing device for curing the adhesive;

a first sensing device for determining that said ink jet head, said intermediate member and said head holder have been positioned at the adhering position after application of the adhesive, wherein said intermediate member is released from said intermediate member moving device in response to information received from said first sensing device; and a second sensing, device for determining that said curing device has cured the adhesive, wherein said head holder is released from said head holder moving device in response to information received from said second sensing device.

* * * * *